United States Patent

Kresch et al.

[11] Patent Number: 6,125,212
[45] Date of Patent: Sep. 26, 2000

[54] EXPLICIT DST-BASED FILTER OPERATING IN THE DCT DOMAIN

[75] Inventors: Renato Kresch; Neri Merhav, both of Haifa, Israel

[73] Assignee: Hewlett-Packard Company, Palo Alto, Calif.

[21] Appl. No.: 09/069,306

[22] Filed: Apr. 29, 1998

[51] Int. Cl.[7] ................................................. G06K 9/00
[52] U.S. Cl. ................................. 382/250; 382/248
[58] Field of Search ........................... 382/232, 233, 382/234, 235, 236, 237, 238, 239, 240, 241, 242, 243, 244, 245, 246, 247, 248, 249, 250, 251, 252, 253; 381/34, 36; 348/403, 404, 405, 406, 407; 358/426, 427, 428, 429, 430, 431, 432

[56] References Cited

U.S. PATENT DOCUMENTS

| | | | |
|---|---|---|---|
| 4,991,213 | 2/1991 | Wilson | 381/34 |
| 5,168,375 | 12/1992 | Reisch et al. | 358/432 |
| 5,216,516 | 6/1993 | Tanaka et al. | 358/426 |
| 5,297,236 | 3/1994 | Antill et al. | 395/212 |
| 5,394,473 | 2/1995 | Davidson | 381/36 |
| 5,408,274 | 4/1995 | Chang et al. | 348/700 |
| 5,479,562 | 12/1995 | Fielder et al. | 395/238 |
| 5,491,776 | 2/1996 | Dangi | 395/11 |
| 5,796,434 | 8/1998 | Lempel | 348/403 |
| 5,845,015 | 12/1998 | Martucci | 382/250 |
| 5,974,181 | 10/1999 | Prieto | 382/232 |

OTHER PUBLICATIONS

W. H. Chen and S. C. Fralick, "Image Enhancement using Cosine Transform Filtering," Image Sci. Math. Symp., Monterey, CA, Nov. 1976.
K. N. Ngan and R. J. Clarke, "Lowpass Filtering in the Cosine Transform Domain," Int. Conf. On Commun., Seattle, WA, pp. 37.7.1–37.7.5, Jun. 1980.
B. Chitprasert and K. R. Rao, Discrete Cosine Transform Filtering, Signal Processing, vol. 19, pp. 233–245, 1990.
J. B. Lee and B. G. Lee, "Transform Domain Filtering based on Pipelining Structure," IEEE Trans. On Signal Processing, vol. SP–10, No. 8, pp. 2061–2064, Aug. 1992.

(List continued on next page.)

*Primary Examiner*—Bijan Tadayon
*Assistant Examiner*—Amir Alavi

[57] ABSTRACT

An explicit DST-based filter that comprises a trigonometric transform module, first and second transform coefficient processors (TCPs), an inverse trigonometric transform module and first and second summing arrangements. The trigonometric transform module applies a trigonometric transform to blocks of DCT coefficients related to input blocks of DCT coefficients to generate corresponding input blocks of transform coefficients of a second type ("second coefficients"). The first TCP includes matrix multipliers that generate a multiplied block of DCT coefficients and a multiplied block of second coefficients by multiplying, by diagonal multiplying matrices, intermediate blocks of DCT coefficients derived from the input blocks of DCT coefficients. The second TCP includes matrix multipliers that generate at a multiplied block of DCT coefficients and a multiplied block of second coefficients by multiplying, by diagonal multiplying matrices, intermediate blocks of second coefficients derived from the input blocks of second coefficients. The first summing arrangement sums the multiplied blocks of DCT coefficients to generate a first final block of DCT coefficients, and sums the multiplied blocks of second coefficients to generate a first final block of second coefficients. The inverse trigonometric transform module applies an inverse trigonometric transform to the first final block of second coefficients to generate a second final block of DCT coefficients. The second summing arrangement sums the first and second final blocks of DCT coefficients to generate a block of DCT coefficients constituting a block of a filtered information signal.

37 Claims, 11 Drawing Sheets

OTHER PUBLICATIONS

S. F. Chang and D. G. Messerschmitt, "Manipulation and Compositing of MC–DCT Compressed Video," IEEE J. Selected Areas in Communications, vol. 13, No. 1, pp. 1–11, Jan. 1995.

A. Neri, G. Russo, and P. Talone, "Inter–block Filtering and Downsampling in DCT Domain," Signal Processing: Image Communications, vol. 6, pp. 303–317, 1994.

K. R. Rao and P. Yip, Discrete Cosine Transform: Algorithms, Advantages, Applications, Academic Press, 1990, Chapter 2.

Y. Arai, T. Agui, and M. Makajima, "A Fast DCT–SQ Scheme for Images," Trans. Of the IEICE, E 71(11):1095, Nov. 1998.

S. A. Martucci, "Symmetric Convolution and Discrete Sine and Cosine Transforms", SP–42 IEEE Trans. Of Signal Processing, pp. 1038–1051, May 1994.

W. B. Pennebaker and J. L. Mitchell, JPEG Still Image Data Compression Standard, Van Nostrand Reinhold, 1993, Chapter 4.

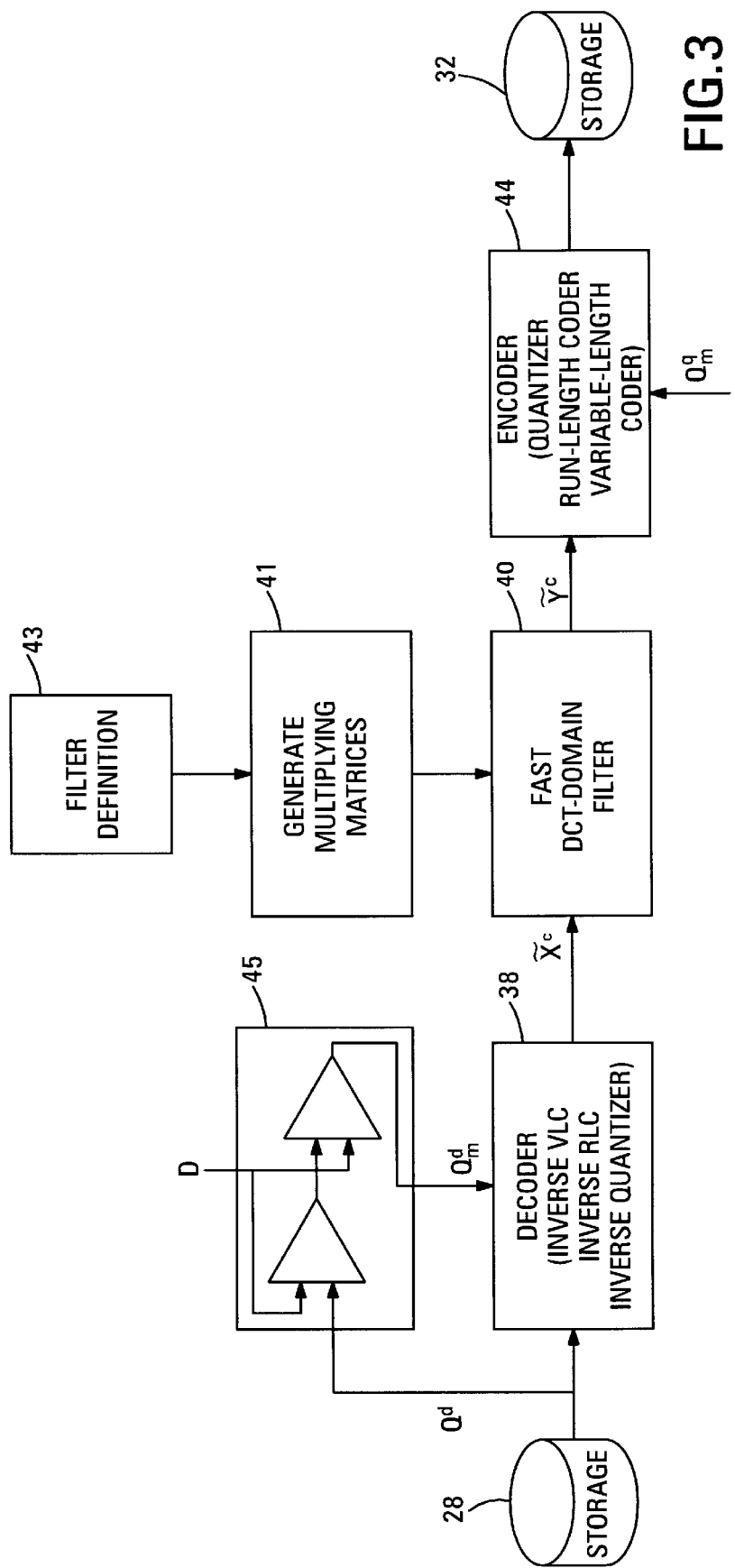

EXPLICIT DST-BASED FILTER OPERATING IN THE DCT DOMAIN

FIELD OF THE INVENTION

The invention relates generally to an apparatus and computer software for processing picture signals, and more particularly to an apparatus and computer software operating in the discrete cosine transform (DCT) domain for performing spatial filtering on compressed signals representing still and moving pictures.

BACKGROUND OF THE INVENTION

In the following description, references to picture signals will be understood to encompass information signals that represent still or moving pictures. Conventionally, spatial filtering is applied to picture signals in the spatial domain. The term spatial filtering as used in this disclosure refers to any operation performed by means of a linear convolution between an information signal and a linear convolution kernel.

In recent years, a number of efficient ways of compressing picture signals have been developed, and reductions in the cost of computers and digital signal processors have brought practical implementations of such compression schemes with the budgets of both the consumer and the professions. Compressing the picture signal reduces the amount of storage capacity required to store the picture signal or reduces the transmission bandwidth required to transmit the picture signal. A spatial filter designed to filter picture signals in the spatial domain will not produce the desired results when applied directly to compressed picture signals. A different approach is required to apply spatial filtering to compressed picture signals.

One approach is to expand the compressed picture signal to the spatial domain, apply the spatial filtering in the spatial domain using a conventional spatial domain filter, and re-compress the filtered picture signal. This approach will be called the straightforward approach. A flow chart of the straightforward approach is shown in FIG. 1. Initially, a compressed picture signal representing a still or moving picture is stored on a disk 12. Alternatively, the picture signal may be received via a communication link or some other means. The picture signal is compressed using one of any number of industry standard compression schemes, for example, JPEG, MPEG, H.261 or H.263. Many of the standard compression schemes use an orthogonal transform, such as a discrete cosine transform (DCT), to convert the blocks of picture data constituting the picture signal from the spatial domain to the frequency domain. The resulting blocks of DCT coefficients have substantially fewer DCT coefficients of a significant magnitude than the number of elements of significant magnitude in the original blocks of picture data. This is especially true when the original block of picture data represents part of the picture lacking in spatial detail. Consequently, orthogonally transforming the blocks of picture data and quantizing the resulting transform coefficients compresses the picture data, since fewer bits are required to represent the quantized DCT coefficients than are required to represent the original picture data.

Applying a DCT to two-dimensional 8×8 blocks of picture data converts the block $\{x(n,m)\}$ in the spatial domain into a corresponding matrix of DCT coefficients $\{X(k,l)\}$ in the frequency domain according to the following equation:

$$X(k, l) = \frac{c(k)}{2} \frac{c(l)}{2} \left[ \sum_{n=0}^{7} \sum_{m=0}^{7} x(n, m) \cos\left(\frac{(2n+1)k\pi}{16}\right) \cos\left(\frac{(2m+1)l\pi}{16}\right) \right]$$

where $c(k)=1/\sqrt{2}$ for $k=0$, and $c(k)=1$ for $k>0$.

Conventional approaches to applying spatial filtering to a picture signal do not operate on the compressed picture signal, i.e., on the blocks of DCT coefficients. Instead, the blocks of DCT coefficients are transformed from the frequency domain back to the spatial domain in step 14. If the compression scheme uses a discrete cosine transform, the expansion scheme uses an inverse discrete cosine transform defined by the following equation:

$$x(n, m) = \sum_{k=0}^{7} \sum_{l=0}^{7} \frac{c(k)}{2} \frac{c(l)}{2} X(k, l) \cos\left(\frac{(2n+1)k\pi}{16}\right) \cos\left(\frac{(2m+1)l\pi}{16}\right)$$

Once the compressed picture signal has been returned to the spatial domain, the conventional spatial filtering techniques indicated in block 16 can be used to apply the desired spatial filtering to the picture signal. The filtered picture signal is then re-compressed, as indicated in block 18. If, after compression, the filtered picture signal is to be compatible with the original compressed picture signal, the filtered picture signal should be re-compressed using the same compression scheme as was used to generate the original compressed picture signal. The compressed filtered picture signal is stored back on the disk 20, or may be transmitted elsewhere without storing it. Although the disks 12 and 20 are shown as separate devices, they can in fact be one and the same.

The problem with the straightforward approach is that it is computationally intensive. As described above, the compressed picture signal must be expanded, spatially filtered, and then re-compressed each time spatial filtering is applied. Savings in the computational resources required to perform such spatial filtering would be achieved if the spatial filtering could be performed on the compressed picture signal, i.e., if the spatial filtering could be performed on the blocks of DCT coefficients constituting the compressed picture signal. This would allow the expansion and re-compression processing performed by blocks 14 and 18, respectively, to be eliminated. This approach would only be desirable, however, if performing the spatial filtering in the DCT domain required fewer computational resources than those required by the conventional approach.

Past work on spatial filtering in the DCT domain has largely concentrated on convolution-multiplication properties (CMP's) of the DCT, and by analogy to the well-known CMP of the discrete Fourier transform (DFT). In Image Enhancement Using Cosine Transform Filtering, IMAGE SCI. MATH. SYMP., Monterey, Calif., November 1976, W. H. Chen and S. C. Fralick showed that coefficient-by-coefficient multiplication in the DCT domain corresponds to circular convolution of three time domain (or spatial domain) sequences. One of these sequences is a fixed undesired sequence that can be eliminated by an appropriate modification of the DCT domain filter coefficients. In Low-Pass Filtering in the Cosine Transform Domain, INT. CONF. ON COMMUN., Seattle, Wash., pp. 37.7.1–37.7.5, June 1980, K. N. Ngan and R. J. Clark applied this property to low-pass filtering images. Others have simplified significantly the CMP of Chen and Fralick. For example, see B. Chitpraset and K. R. Rao, Discrete Cosine Transform Filtering, 19 SIGNAL PROCESSING, 233–245, (1990). Their method, however, is still applicable only to a particular type of convolution called symmetric convolution rather than the more desirable linear convolution. It is known that the above-mentioned symmetric convolution causes block edge artifacts. More recently, in Symmetric Convolution and Discrete Sine and Cosine Transforms, SP-42 IEEE TRANS. ON SIGNAL PROCESSING, 1038–1051, (1994 May), S. A. Martucci described a complete set of symmetrical/ antisymmetrical convolution routines for a family of discrete trigonometrical transforms, including the DCT. Martucci's method can be modified to obtain a linear convolution by appropriate zero padding in the convolution domain. However, Martucci's approach cannot be used directly or efficiently in the above-mentioned DCT-domain spatial filtering applications since the DCT domain data are already given without prior zero padding in the spatial domain.

In Transform Domain Filtering Based on Pipelining Structure, SP-40 IEEE TRANS. ON SIGNAL PROCESSING, 2061–2064, (1992 August), J. B. Lee and B. G. Lee described an alternative to the CMP approach that uses a simple algebraic approach to derive a transform-domain linear convolution filter and that can be implemented using a pipeline hardware architecture. The Lee and Lee approach precomputes the product of the operator matrices corresponding to inverse DCT (IDCT), the convolution, and the DCT, and then uses this combined operator matrix directly in the DCT domain. In this, the contributions of neighboring DCT data blocks are incorporated in a way similar to that of the overlap and add (OLA) method. In Manipulation and Compositing of MC-DCT Compressed Video, 13 IEEE J. SELECTED AREAS IN COMMUNICATIONS, 1–11 (1995 January), S. F. Chang and D. G. Messerschmitt proposed a similar approach by using the distributive property of the DCT with respect to matrix multiplication. A more thorough study of this approach, in combination with down sampling, was described by Neri et al. in Inter-Block Filtering and Down Sampling in DCT Domain, 6 SIGNAL PROCESSING: IMAGE COMMUNICATION, 303–317, (1994). The problem with each of these approaches is that they are still relatively computationally intensive, which causes filtering in the DCT domain to be slow.

In U.S. patent application Ser. No. 08/612,513, filed on Mar. 6 1996, entitled A Fast Method and Apparatus for Filtering Compressed Images in the DCT Domain, and assigned to the assignee of the present application, one of the inventors of this application (Merhav) and V. Bhaskharan describe a spatial filter for picture signals that operates in the DCT domain. Matrices obtained by performing a double butterflying operation on the input blocks of DCT coefficients are multiplied by multiplying matrices. The multiplying matrices are obtained by applying a discrete cosine transform to the input kernel matrices and then performing a butterflying operation on the resulting DCT coefficients. This filter has the advantage of being less computationally intense than the approaches described above, especially when the blocks of DCT coefficients are "sparse." In this disclosure, blocks of DCT coefficients are defined as being sparse when most of the DCT coefficients in the block have a value of zero. The reduced computational intensity of the filter arises because the multiplying matrices derived from the input kernel matrices are relatively sparse. However, the characteristics of the filter disclosed by Merhav and Bhaskharan are defined by a noncausal-symmetric kernel only. Moreover, it would be desirable if the filter could be made to operate more quickly in relevant applications.

It should be noted that the term symmetric is generally used in the art to denote filter kernels that are symmetrical about the origin. Some of the filter kernels described in this disclosure are symmetrical about a point other than the origin, and will be identified by the term causal symmetric. Filter kernels that are symmetric in the conventional sense will be described in this disclosure as non-causal symmetric to distinguish them from causal symmetric filter kernels.

It would be advantageous for the filter characteristics of a spatial filter operating in the DCT domain to be defined by any type of kernel, causal or non-causal; symmetric or non-symmetric. It would also be advantageous if the number of computational operations required to perform the spatial filtering operation to be further reduced.

SUMMARY OF THE INVENTION

The invention provides an explicit DST-based filter that filters an information signal to generate a filtered information signal and that has characteristics defined by a linear convolution kernel. The information signal is composed of input blocks of discrete cosine transform (DCT) coefficients. The filtered information signal is composed of blocks of DCT coefficients. The filter comprises a trigonometric transform module, first and second transform coefficient processors, an inverse trigonometric transform module and first and second summing arrangements.

The trigonometric transform module applies a trigonometric transform to blocks of DCT coefficients related to the input blocks of DCT coefficients to generate corresponding input blocks of transform coefficients of a second type. The input blocks of transform coefficients of the second type are blocks of (a) mixed DST/DCT coefficients, (b) mixed DCT/ DST coefficients or (c) DST coefficients.

The first transform coefficient processor includes matrix multipliers that generate at least one multiplied block of DCT coefficients and at least one multiplied block of transform coefficients of the second type by multiplying, by diagonal multiplying matrices, intermediate blocks of DCT coefficients derived from the input blocks of DCT coefficients. The second transform coefficient processor includes matrix multipliers that generate at least one multiplied block of DCT coefficients and at least one multiplied block of transform coefficients of the second type by multiplying, by diagonal multiplying matrices, intermediate blocks of transform coefficients of the second type derived from the input blocks of transform coefficients of the second type.

The first summing arrangement sums the multiplied blocks of DCT coefficients generated by both the first and second transform coefficient processors to generate a first final block of DCT coefficients. The first summing arrangement also sums the multiplied blocks of transform coefficients of the second type generated by both the first and second transform coefficient processors to generate a first final block of transform coefficients of the second type. The inverse trigonometric transform module applies an inverse trigonometric transform to the first final block of transform coefficients of the second type to generate a second final block of DCT coefficients. The inverse trigonometric transform applied by the inverse trigonometric transform module is the inverse of the trigonometric transform applied by the trigonometric transform module.

The second summing arrangement sums the first and second final blocks of DCT coefficients to generate a block of DCT coefficients constituting a block of the filtered information signal.

The multiplying matrices may include real-type multiplying matrices and imaginary-type multiplying matrices respectively derived from the real component and the imaginary component of a discrete Fourier transform of a vector representing a filter kernel. The first transform coefficient processor generates the at least one multiplied block of DCT coefficients by multiplying by one of the real-type multiplying matrices and generates the at least one multiplied block of transform coefficients of the second type by multiplying by one of the imaginary-type multiplying matrices. The second transform coefficient processor generates the at least one of the multiplied block of transform coefficients of the second type by multiplying by one of the imaginary-type multiplying matrices and generates the at least one multiplied block of DCT coefficients by multiplying by one of the real-type multiplying matrices.

The first and second transform coefficient processors may additionally include a processing arrangement that derives the intermediate blocks of DCT coefficients and transform coefficients of the second type, respectively, from the input blocks of DCT coefficients and the input blocks of transform coefficients of the second type, respectively. The structure of the processing arrangement depends on the type of kernel defining the filter characteristics.

The filter may include a module that generates the diagonal multiplying matrices. This module includes a discrete Fourier transform module, a selection element, a matrix generator and matrix multipliers. The discrete Fourier transform module performs a discrete Fourier transform on a vector that exactly represents the linear convolution kernel to generate a set of real transform coefficients and a set of imaginary transform coefficients. The selection element selects subsets of the set of real transform coefficients to generate a first vector and a second vector, and selects subsets of the set of imaginary transform coefficients to generate a third vector and a fourth vector. The matrix generator generates first through fourth matrices having the first through fourth vectors, respectively, as their diagonal elements, and outputs the first and second matrices as a first pair of multiplication matrices for use by the first transform coefficient processor. The matrix multipliers multiply the third and fourth matrices by a matrix $\Theta$ and a transpose of the matrix $\Theta$ to generate fifth and sixth matrices, respectively, and output the fifth and sixth matrices as a second pair of multiplication matrices for use by the second transform coefficient processor.

When the filter is a two-dimensional filter whose characteristics are defined by a non-separable two-dimensional linear convolution kernel, the matrix multipliers of the first transform coefficient processor generate a multiplied block of DCT coefficients, a multiplied block of transform coefficients of the second type and a multiplied block of transform coefficients of a third type by multiplying, by diagonal multiplying matrices, intermediate blocks of DCT coefficients derived from the input blocks of DCT coefficients. The matrix multipliers of the second transform coefficient processor generate a multiplied block of DCT coefficients, a multiplied block of transform coefficients of the second type, and a multiplied block of transform coefficients of the third type by multiplying, by diagonal multiplying matrices, intermediate blocks of transform coefficients of the second type derived from the input blocks of transform coefficients of the second type. The trigonometric transform module and the inverse trigonometric transform modules are, respectively, a first trigonometric transform module and a first inverse trigonometric transform module that respectively apply a trigonometric transform of a first type and an inverse trigonometric transform of the first type.

The filter additionally comprises a second trigonometric transform module, a third transform coefficient processor and a second inverse trigonometric transform module. The second trigonometric transform module applies a trigonometric transform of a second type to the input blocks of DCT coefficients to generate corresponding input blocks of transform coefficients of the third type. The input blocks of transform coefficients of the third type are blocks of (a) mixed DST/DCT coefficients, (b) mixed DCT/DST coefficients or (c) DST coefficients.

The third transform coefficient processor includes matrix multipliers that generate a multiplied block of DCT coefficients, a multiplied block of transform coefficients of the second type and a multiplied block of transform coefficients of the third type by multiplying, by diagonal multiplying matrices, intermediate blocks of transform coefficients of the third type derived from the input blocks of transform coefficients of the third type. The first summing arrangement sums the multiplied blocks of DCT coefficients generated by the first, second and third transform coefficient processors to generate a first final block of DCT coefficients, sums the multiplied blocks of transform coefficients of the second type generated by the first, second and third transform coefficient processors to generate a first final block of transform coefficients of the second type, and sums the multiplied blocks of transform coefficients of the third type generated by the first, second and third transform coefficient processors to generate a first final block of transform coefficients of the third type. The second inverse trigonometric transform module applies an inverse trigonometric transform of the second type to the first final block of transform coefficients of the third type to generate a third final block of DCT coefficients. The second summing arrangement sums the first, second and third final blocks of DCT coefficients to generate a block of DCT coefficients constituting a block of the filtered information signal.

The filter may additionally comprise a dequantizing table modifying module and a de-quantizer. The modifying module generates a modified dequantizing table by pre- and post-multiplying, by a diagonal matrix D, the quantizing table that defines the quantization of the input blocks of DCT coefficients. The de-quantizer de-quantizes the input blocks of DCT coefficients using the modified dequantizing table to provide corresponding blocks of modified DCT coefficients in lieu of the input blocks of DCT coefficients.

The invention also provides a processing arrangement for applying a modified cosine-sine or sine-cosine transform to the transform coefficients in a sub-block of a block of transform coefficients. The sub-block coincides with one row or one column of the block. The processing arrangement comprises a serial arrangement of an order reversing module and a transform engine. The transform engine includes a preprocessing section and a matrix multiplier. The preprocessing section comprises a serial arrangement of a re-ordering portion an outer summing portion an inner summing portion. The re-ordering portion changes the order of ones of the transform coefficients in the sub-block. The outer summing portion includes pairs of first summing modules that perform butterfly operations between pairs of the transform coefficients in the sub-block of transform coefficients output by the re-ordering portion. The inner summing portion includes pairs of second summing modules that perform butterfly operations between pairs of the transform coefficients in the sub-block of transform coefficients output by the outer summing portion. The matrix multiplier multiplies the transform coefficients in the sub-block of transform coefficients output by the preprocessing section by the matrix G.

Finally, the invention provides a computer-readable medium encoded with a computer program that instructs a computer to perform an explicit DST-based filtering operation in response to a linear convolution kernel. In the filtering operation, blocks of DCT coefficients related to the input blocks of DCT coefficients constituting an input information signal are forwardly trigonometrically transformed to generate corresponding input blocks of transform coefficients of a second type. The input blocks of transform coefficients of the second type are blocks of (a) mixed DST/DCT coefficients, (b) mixed DCT/DST coefficients or (c) DST coefficients.

Intermediate blocks of DCT coefficients derived from the input blocks of DCT coefficients are matrix multiplied by first diagonal multiplying matrices to generate at least one multiplied block of DCT coefficients and at least one multiplied block of transform coefficients of a second type. Intermediate blocks of transform coefficients of the second type derived from the input blocks of transform coefficients of the second type are matrix multiplied by second diagonal multiplying matrices to generate at least one multiplied block of DCT coefficients and at least one multiplied block of transform coefficients of the second type.

The multiplied blocks of DCT coefficients are summed to generate a first final block of DCT coefficients, and the multiplied blocks of transform coefficients of the second type are summed to generate a first final block of transform coefficients of the second type. The first final block of transform coefficients of the second type is inversely trigonometrically transformed to generate a second final block of DCT coefficients. The first and second final blocks of DCT coefficients are then summed to generate a block of DCT coefficients constituting one block of a filtered output information signal.

BRIEF DESCRIPTION OF THE DRAWINGS

FIG. 3 is a block diagram of an embodiment of the image/video editor of the system shown in FIG. 2 in which the embodiments of the explicit DST-based filter according to the invention can reside.

FIG. 4 shows the arrangement in the spatial domain of the blocks of DCT coefficients surrounding the current block X of DCT coefficients processed by the explicit DST-based filter according to the invention.

DETAILED DESCRIPTION OF THE INVENTION

Figure 1:
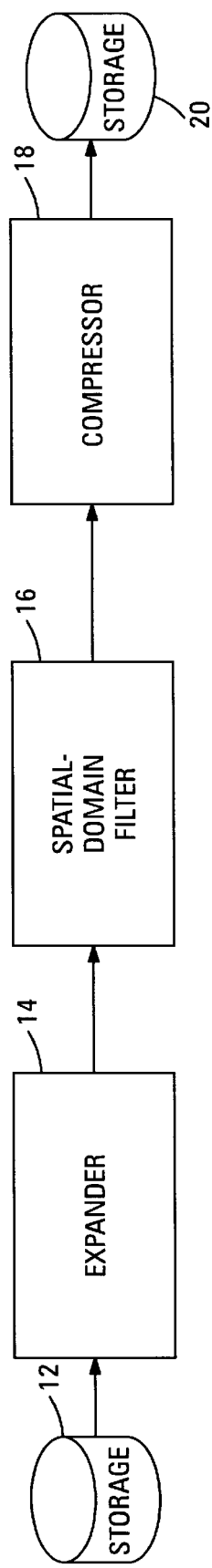
FIG. 1 is a block diagram of the straightforward approach to spatial filtering.

In a patent application filed simultaneously with this patent application and entitled Implicit DST-Based Filter Operating in the DCT Domain, the inventors disclose a filter for compressed picture signals that performs spatial filtering using an implicit DST-based spatial filter that operates on a compressed picture signal and that avoids having to compute a block of discrete sine transform (DST) coefficients from each block of discrete cosine transform (DCT) coefficients constituting the picture signal. The implicit DST-based filter is highly efficient in the typical case in which the blocks of DCT coefficients constituting the compressed picture signal are sparse. In this disclosure, a block of DCT coefficients is defined as being "sparse" when most of the DCT coefficients in the block have a value of zero. However, when the blocks of DCT coefficients are not sparse, or when the sparseness of the DCT coefficients is unknown, it is computationally more efficient to derive blocks of DST coefficients from the DCT coefficients constituting the picture signal.

The invention disclosed herein provides an explicit DST-based spatial filter that operates on a compressed picture signal and that is highly efficient when the blocks of DCT coefficients constituting the compressed picture signal are not sparse, or the sparseness of the blocks of DCT coefficients is unknown.

It has been recognized that it would be desirable to perform fast spatial convolution in the DCT domain in a manner similar to the known way in which fast spatial convolution is done in the discrete Fourier domain (DFT domain). Convolution in the spatial domain in equivalent to an element-by-element multiplication in the DFT domain. This property is called the convolution-multiplication property (CMP). Element-by-element multiplication is a very fast operation that can be expressed in matrix form by the multiplication of a vector representing the signal to be filtered by a diagonal matrix representing the filter kernel transformed into the appropriate domain. Thus, as in DFT-domain filtering, it is desirable to perform spatial filtering in the DCT domain using diagonal multiplying matrices. Doing this involves devising a CMP that can be implemented efficiently in the DCT domain.

The DCT-domain CMPs disclosed by Martucci, by Chen and Fralick, and by Chitpraset and Rao, all referred to above, do not allow filtering by linear convolution or by kernels that are not noncausal symmetric. Such CMPs assume that the filter characteristics are defined only by symmetric or antisymmetric kernels, and perform only symmetric or antisymmetric convolution. They are unable to perform linear convolution unless the blocks of spatial domain data constituting the picture signal in the spatial domain are zero padded prior to the picture signal being compressed. In the course of the spatial domain picture signal being compressed, the blocks of zero-padded spatial domain data are subject to a discrete cosine transform (DCT). This makes the CMPs disclosed by Martucci, Chen & Fralick and Chitpraset unsuitable for applications in which a pre-existing compressed picture signal is to be filtered, and the blocks of spatial domain data constituting the spatial domain signal were not subject to zero padding before the spatial domain signal was compressed.

The filters described herein perform linear convolution in the DCT domain using multiplication by diagonal matrices only, and do not require a special input signal in which zero padding was added to the spatial domain data before the orthogonal transform. The characteristics of the filters described in this disclosure can be defined by symmetric and non-symmetric, causal and non-causal kernels. The filters described in this disclosure use a fast, highly-efficient processing structure to perform cosine-to-sine and sine-to-cosine transforms that derive blocks of discrete sine transform (DST) coefficients from the blocks of DCT coefficients constituting the compressed picture signal. The blocks of DCT coefficients and DST coefficients are subject to linear convolution implemented by the processing structure according to the invention which combines four of Martucci's CMPs relating to symmetric convolution in a way that enables these CMPs to perform the desired linear convolution.

Before the explicit DST-based filter according to the invention is described in more detail, a system in which the filter according to the invention can reside will be described with reference to FIG. 2. A preprocessed picture signal 24, which may represent a single, still picture, or may represent a series of pictures, i.e., a motion picture, is compressed by the compression engine 26 according to an appropriate DCT-based compression scheme, e.g., JPEG, MPEG, H.261 or H.263. The picture represented by the picture signal could be a still picture produced by a photoprocessing shop, for example. The compressed picture signal includes blocks of DCT coefficients. The system includes the disk 28 on which the compressed picture signal is stored. The compressed picture signal representing the still picture is stored on the disk 28 to allow the owner of the picture to edit the picture using the image/video editor 30. The image/video editor 30 includes an explicit DST-based filter according to the invention (not shown in FIG. 2) that operates on the compressed picture signal stored on the disk 28 to produce a filtered picture signal, that is also composed of blocks of DCT coefficients. The filtered picture signal generated by the image/video editor is stored on the disk 32. The image/video editor 30 can include plural filters according to the invention, each of which has a predefined filter characteristic, and can allow the user to specify which one or more of these filters is desired. Although the disk 32 is shown separately from the disk 28, they can, in fact, be different parts of the same physical disk.

The photoprocessing shop can read the filtered picture signal from the disk 32 and can expand the filtered picture signal using the expansion engine 34 to produce the filtered picture signal 36 for display on a computer monitor, or for printing, for example.

Figure 2:
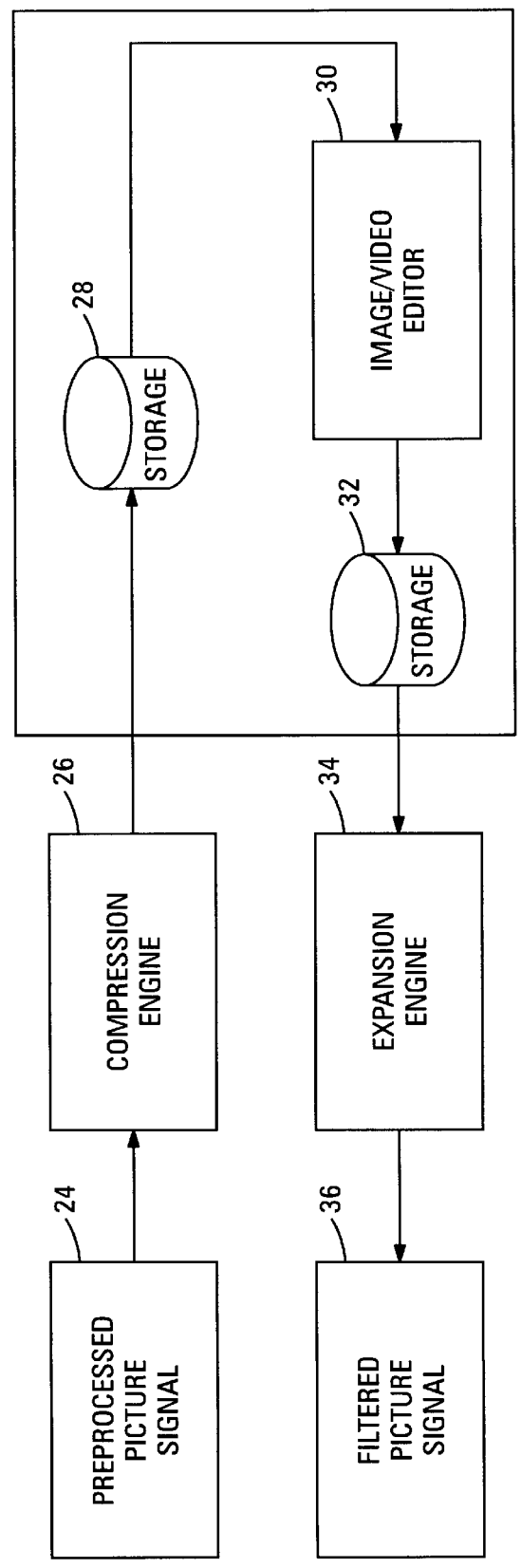
FIG. 2 is a block diagram of an example of a system in which an explicit DST-based filter according to the invention can reside.

FIG. 3 shows a more detailed block diagram of an embodiment of a image/video editor that may be used as the image/video editor 30 shown in FIG. 2. The compressed picture signal representing the picture is read out from the disk 28 and fed to the decoder 38. The decoder uses known decoding techniques to reverse the variable-length coding, run-length coding and quantizing that was applied to the DCT coefficients in each block of DCT coefficients when the original picture signal was compressed to generate the compressed picture signal stored on the disk 28. The inverse quantizing operation performed by the decoder uses the modified quantizing table $Q_m{}^d$ derived from the quantizing table $Q^d$ stored in the picture headers of the compressed picture signal. Alternatively, depending on the state of a flag bit stored in the picture headers of the compressed picture signal, the modified quantizing table may be derived from a standard quantizing table stored in the image/video editor 30, or may itself be stored in the image/video editor. Modifying the quantizing table in this way simplifies the processing performed by the explicit DST-based filter 40 on the blocks of DCT coefficients constituting the compressed picture signal.

The decoder 38 produces blocks of DCT coefficients and feeds these blocks to the explicit DST-based filter 40 in slice order.

The arrangement in the spatial domain of the blocks of DCT coefficients surrounding the current block $\tilde{X}^c$ of DCT coefficients is shown in FIG. 4. Each of the blocks of DCT coefficients shown in FIG. 4 (e.g., the block $\tilde{X}_{SE}{}^c$) is composed of 64 DCT coefficients arranged as an 8×8 matrix. However, the number of DCT coefficients in the blocks is not critical: the blocks of DCT coefficients can be composed of a different number of DCT coefficients.

Each block of DCT coefficients is denoted by a subscript, e.g., SE, indicating the compass heading of the block relative to the current block $\tilde{X}^c$. The tilde (~) over the symbol (e.g., X) denoting the block indicates that the DCT coefficients in the block have been inversely quantized using the modified quantizing table $Q_m{}^d$, as described above. The superscript c indicates that the blocks are blocks of DCT coefficients. The explicit DST-based filter 40 subjects blocks of DCT coefficients to a column-modified cosine-sine transform that results in blocks of mixed DST/DCT coefficients indicated by the superscript sc. Similarly, the explicit DST-based filter 40 subjects blocks of DCT coefficients to a row-modified cosine-sine transform that results in blocks of mixed DCT/DST coefficients indicated by the superscript cs.

To generate the filtered block $\tilde{Y}^c$ of DCT coefficients corresponding to the current block $\tilde{X}^c$ of DCT coefficients, blocks of DCT coefficients are passed from the decoder 38 to the filter 40, preferably in raster scan order. The embodiments of the explicit DST-based filter that will be described below with reference to FIGS. 5, 7 and 8 must receive the nine blocks of DCT coefficients surrounding and including the current block $\tilde{X}^c$ to generate the filtered block $\tilde{Y}^c$ of DCT coefficients corresponding to the current block $\tilde{X}^c$. These embodiments do not generate the filtered block $\tilde{Y}^c$ until they have received the block $\tilde{X}_{SE}{}^c$ below and to the right of the current block $\tilde{X}^c$. The embodiments of the explicit DST-based filter that will be described below with reference to FIGS. 9 and 10 must receive the four blocks of DCT coefficients vertically and horizontally preceding and including the current block $\tilde{X}^c$ to generate the filtered block $\tilde{Y}^c$ of DCT coefficients corresponding to the current block $\tilde{X}^c$. These embodiments do not generate the filtered block $\tilde{Y}^c$ until they have received the current block $\tilde{X}^c$.

The explicit DST-based filter 40 has an input for receiving the block of DCT coefficients, and may include the additional input through which it can receive the multiplying matrices that it requires to perform the filtering. In the embodiment shown in FIG. 3, the multiplying matrices are pre-calculated by the multiplying matrix generating module 41 in response to a definition of the filter characteristics supplied by the filter definition module 43. The filter 40 may have a single, fixed characteristic or one of multiple, fixed characteristics selected by a user (not shown), or may have a variable characteristic defined by the user. If the filter has a single, fixed characteristic, the modules 41 and 43 may be omitted, and multiplying matrices may be pre-calculated and embodied as hardware in the filter 40, or stored in a suitable non-volatile memory within or outside the filter. For example, one of the disks 28 and 32 may be used to store the multiplying matrices. If the filter 40 has a one of multiple, fixed characteristics, the multiplying matrix calculation module 41 may be omitted, and the multiplying matrices may be pre-calculated and embodied as hardware in the filter 40, or stored in a suitable non-volatile memory within or outside the filter, such as one of the disks 28 and 32, and may be selected by the filter definition module in response to a user input. As a further alternative, the kernel or kernels defining the filter characteristic or characteristics may be stored, and the multiplying matrices generated from the kernel or kernels prior to the filter 40 performing its filtering operations.

The explicit DST-based filter 40 generates the output block $\tilde{Y}^c$ that is an 8×8 block of filtered DCT coefficients. The output block $\tilde{Y}^c$ is supplied to the encoder 44. The way in which the explicit DST-based filter 40 operates on the blocks of DCT coefficients received from the decoder 38 to generate the output block $\tilde{Y}^c$ of filtered DCT coefficients corresponding to the current block $\tilde{X}^c$ of DCT coefficients will be described in detail below.

The encoder 44 subjects the filtered DCT coefficients in each output block to quantizing, run-length coding and variable-length coding using known techniques. The DCT coefficients are quantized using the modified quantizing table $Q_m^q$. The modified quantizing table is derived either from the quantizing table stored in the picture headers of the compressed picture signal, or from a standard quantizing table. The compressed picture signal output by the encoder 44 is then stored on the disk 32. As described above, the disks 28 and 32 need not be separate devices.

The quantizing table modifying module 45 is connected to receive the compressed picture signal read out from the disk 28, and extracts the quantizing table $Q^d$ from the compressed picture signal. Alternatively, a standard quantizing table may be stored in the image/video editor 30, and the quantizing table modifying module may extract a flag bit from the compressed picture signal indicating that the stored standard quantizing table is to be used. In this disclosure, a reference to the quantizing table extracted from the compressed picture signal will be understood to encompass a stored standard quantizing table. The quantizing table modifying module 45 pre-multiplies the quantizing table extracted from the compressed picture signal by the diagonal matrix D and post-multiplies the result of this multiplication by the diagonal matrix D to generate the modified quantizing table $Q_m^d$.

The modified quantizing table $Q_m^q$ used by the encoder 44 is generated by pre- and post-multiplying the quantizing table extracted from the compressed picture signal by $D^{-1}$, the inverse of the diagonal matrix D.

All embodiments of the explicit DST-based filter 40 and the multiplying matrix generating module 41 described in this disclosure can be constructed using dedicated hardware such as adders and matrix multipliers. In a preferred embodiment, the filter 40 and the multiplying matrix generating module 41 are embodied in a computer program executed by a microprocessor and suitable auxiliary elements such as random-access memory (not shown). Alternatively, the computer program may be executed using a suitable digital signal processor (DSP). In the preferred embodiment of the filter, a computer or DSP including an explicit DST-based filter program implements all of the processes necessary to implement the filter, including fetching, decoding, filtering, encoding and storing. This disclosure provides sufficient information for a person of ordinary skill in the art to use a high-level (e.g., C or C++) or low-level programming language to write a suitable program implementing the explicit DST-based filter and multiplying matrix generating module according to the invention. Accordingly, the program listing itself is omitted. The program implementing the explicit DST-based filter and the multiplying matrix generating module could be conveyed to the computer or DSP on which it is to run by embodying the program in a suitable computer-readable medium, such as, but not limited to, a set of floppy disks, a CD-ROM, a DVD-ROM, magnetic tape, or a flash memory or other type of non-volatile memory, or could be transmitted to such computer or DSP by a suitable data link.

A first embodiment 100 of the explicit DST-based filter 40 will be described first with reference to FIG. 5. This embodiment is suitable for use with any type of kernel defining the characteristics of the filter, i.e., causal or noncausal, symmetric or non-symmetric. The filter 100 is composed of the vertical processing module 101 and the horizontal processing module 103. The vertical processing module processes corresponding ones of the block $\tilde{X}_{SE}^c$ of DCT coefficients in three successive slices of the compressed picture signal to generate the block $\tilde{Z}_E^c$ of processed DCT coefficients corresponding to the current block $\tilde{X}^c$.

The vertical processing module 101 passes successive blocks $\tilde{Z}_E^c$ of processed DCT coefficients to the horizontal processing module 103. The horizontal processing module, which is structurally similar to the vertical processing module, processes three successive blocks $\tilde{X}_E^c$ of processed DCT coefficients to generate the output block $\tilde{Y}^c$ of filtered DCT coefficients corresponding to the current block $\tilde{X}^c$ of DCT coefficients.

The vertical processing module 101 will be described first. The horizontal processing module 103 is structurally similar. Elements of the horizontal processing module corresponding to elements of the vertical processing module are indicated by the same reference numeral with 1 added. Differences between the horizontal processing module and the vertical processing module will be described below.

The vertical processing module is composed of the DCT coefficient processor 105, the mixed DST/DCT coefficient processor 107, the column modified cosine-sine transform (CMCST) module 109, the column modified sine-cosine transform (CMSCT) module 111 and the summing modules 113, 115 and 117. The structure of the mixed DST/DCT coefficient processor is identical to that of the DCT coefficient processor except for the sense of some of the summing modules. In addition, the multiplying matrices used in the matrix multipliers differ, as will be described below. Corresponding elements of the DCT coefficient processor and the mixed DST/DCT coefficient processor are indicted by the same reference numeral with the letters C and S, respectively, added.

The DCT coefficient processor 105 will now be described. For each current block $\tilde{X}^c$ of DCT coefficients constituting current picture, the vertical processing module receives corresponding block $\tilde{X}_{SE}^c$ of DCT coefficients from the decoder 38 via the input path 119, and feeds this block to the serially-arranged delay modules 121C and 123C. The delay modules 121C and 123C each delay each block of DCT coefficients by a time $D_V$ corresponding to the time required for the DCT coefficient processor to receive via the input path 119 the blocks of DCT coefficients constituting one slice of the compressed picture signal. Consequently, when the block $\tilde{X}_{SE}^c$ of DCT coefficients corresponding to the current block $\tilde{X}^c$ is received by the vertical processing module, the block of DCT coefficients output by the delay module 121 C is the block $\tilde{X}_E^c$, and the block of DCT coefficients output by the delay module 123C is the block $\tilde{X}_{NE}^c$.

The delay modules 121C and 123C may each be realized in a practical apparatus by providing sufficient memory to store the DCT coefficients constituting one slice of the compressed picture signal. The blocks of DCT coefficients received at the input of the delay module are stored in the memory. Every time interval $D_H$, where $D_H$ is the time interval between successive blocks being received at the input of the delay module, the memory feeds the oldest block stored in the memory to the output of the delay module, and fills the vacated memory space with the block received at the input of the delay module. The oldest block has been stored in the memory for the time $D_V$. The remaining blocks, equal in number to the number of blocks in a slice minus one, remain stored in the memory.

Each block $\tilde{X}_{SE}^c$ of DCT coefficients received via the input path 119 is also fed to the sign reverser 125C which performs an even-row sign reversing operation to generate a first sign-reversed block of DCT coefficients. The even-row sign-reversing operation is accomplished simply by reversing the sign of all the elements in the even rows of the block $\tilde{X}_{SE}^c$ of DCT coefficients.

The block $\tilde{X}_{NE}^c$ of DCT coefficients output by the delay module 123C is fed to the sign reverser 127C, which generates a second sign-reversed block of DCT coefficients by reversing the sign of all the elements in the even rows of the block $\tilde{X}_{NE}^c$ to subject the block $\tilde{X}_{NE}^c$ to an even-row sign reversing operation.

The first sign-reversed block of DCT coefficients and the block $\tilde{X}_E^c$ of DCT coefficients output by the delay module 121C are fed to the summing module 129C. This summing module performs a summing operation in which the first sign-reversed block is added to the block $\tilde{X}_E^c$ to generate a first intermediate block of DCT coefficients. The second sign-reversed block of DCT coefficients and the block $\tilde{X}_E^c$ of DCT coefficients output by the delay module 121 are fed to the summing module 131 C. This summing module performs a summing operation in which the second sign-reversed block is added to the block $\tilde{X}_E^c$ to generate a second intermediate block of DCT coefficients.

The first intermediate block of DCT coefficients is fed to the matrix multiplier 133C which pre-multiplies it by the multiplying matrix $\tilde{V}_{I,1}^-$ to generate a first multiplied block of mixed DST/DCT coefficients. The first intermediate block of DCT coefficients is also fed to the matrix multiplier 135C which pre-multiplies it by the multiplying matrix $\tilde{V}_{R,0}^-$ to generate a second multiplied block of DCT coefficients. The second intermediate block of DCT coefficients is fed to the matrix multiplier 137C which pre-multiplies it by the multiplying matrix $\tilde{V}_{I,1}^+$ to generate a third multiplied block of mixed DST/DCT coefficients, respectively. The second intermediate block of DCT coefficients is also fed to the matrix multiplier 139C which pre-multiplies it by the multiplying matrix $\tilde{V}_{R,0}^+$ to generate an fourth multiplied block of DCT coefficients.

The way in which the multiplying matrices are derived from the filter kernel will be described below with reference to FIG. 11. FIG. 5 shows the terminal 102 through which the multiplying matrices are received from the multiplying matrix generating module 41 (FIG. 3) for distribution to the matrix multipliers via the bus 104. However, as described above, the multiplying matrices may alternatively be stored in the filter 100.

The CMCST module 109 subjects each block $\tilde{X}_{SE}^c$ of DCT coefficients received via the input path 119 to a column modified cosine-sine transform to generate a corresponding block $\tilde{X}_{SE}^{sc}$ of mixed DST/DCT coefficients. The processing performed by the CMCST module will be described below with reference to FIGS. 6A–6C.

As noted above, the mixed DST/DCT coefficient processor 107 is structurally similar to the DCT coefficient processor 105 and so only the differences will be described.

In the summing operation performed by the summing module 129S, the first sign-reversed block of mixed DST/DCT coefficients is subtracted from the block $\tilde{X}_E^{sc}$ of mixed DST/DCT coefficients to generate a first intermediate block of mixed DST/DCT coefficients. In the summing operation performed by the summing module 131S, the second sign-reversed block of mixed DST/DCT coefficients is subtracted from the block $\tilde{X}_E^{sc}$ of mixed DST/DCT coefficients to generate a second intermediate block of mixed DST/DCT coefficients.

The functions of the sign-reverser 125S and the summing module 129S can be merged in single summing module in which the odd rows of the block $\tilde{X}_{SE}^{sc}$ of mixed DST/DCT coefficients and of the block $\tilde{X}_E^{sc}$ of mixed DST/DCT coefficients are subtracted, and the even rows of the block $\tilde{X}_E^{sc}$ of mixed DST/DCT coefficients and the block $\tilde{X}_E^{sc}$ of mixed DST/DCT coefficients are added to generate the first intermediate block of mixed DST/DCT coefficients. The functions of the sign reverser 127S and the summing module 131S can be similarly merged.

The matrix multiplier 133S pre-multiplies the first intermediate block of mixed DST/DCT coefficients by the multiplying matrix $\tilde{V}_{I,0}^-$ to generate a first multiplied block of DCT coefficients. The matrix multiplier 135S pre-multiplies the first intermediate block of mixed DST/DCT coefficients by the multiplying matrix $\tilde{V}_{R,1}^-$ to generate a second multiplied block of mixed DST/DCT coefficients, respectively. The matrix multiplier 137S pre-multiplies the second intermediate block of mixed DST/DCT coefficients by the multiplying matrix $\tilde{V}_{I,0}^+$ to generate a third multiplied block of DCT coefficients. The matrix multiplier 139S pre-multiplies the second intermediate block of mixed DST/DCT coefficients by the multiplying matrix $\tilde{V}_{R,1}{}^+$ to generate an fourth multiplied block of mixed DST/DCT coefficients.

The matrix multipliers 133C and 137C respectively feed the first and third multiplied blocks of mixed DST/DCT coefficients, and the matrix multipliers 135S and 139S feed the second and fourth multiplied blocks of mixed DST/DCT coefficients to the summing module 113. This summing module performs a summing operation in which the third multiplied block of mixed DST/DCT coefficients is subtracted from the sum of the other blocks of mixed DST/DCT coefficients to generate a first final block of mixed DST/DCT coefficients. The summing module 113 feeds the first final block of mixed DST/DCT coefficients to the CMSCT module 111.

The matrix multipliers 135C and 139C feed the second and fourth multiplied blocks of DCT coefficients, and the matrix multipliers 133S and 137S feed the first and third multiplied blocks of DCT coefficients to the summing module 115. This summing module performs a summing operation in which the first multiplied block of DCT coefficients is subtracted from the sum of the other three blocks of DCT coefficients to generate a second final block of DCT coefficients. The summing module 115 feeds the second final block of DCT coefficients to the summing module 117.

The CMSCT module 111 subjects each first final block of mixed DST/DCT coefficients to a column modified sine-cosine transform to generate a third final block of DCT coefficients. The processing performed by the CMSCT module will be described below with reference to FIGS. 6A–6C. The CMSCT module 111 feeds the third final block of DCT coefficients to the summing module 117.

The summing module 117 performs a summing operation on the second final blocks of DCT coefficients received from the summing module 115 and the second final blocks of DCT coefficients received from the CMSCT module 111 to generate the block $\tilde{Z}_E{}^c$ of DCT coefficients which constitutes the output of the vertical processing module 101. The vertical processing module feeds successive blocks $\tilde{Z}_E{}^c$ of DCT coefficients to the horizontal processing module 103 via the path 120.

The horizontal processing module 103 will now be described. As noted above, the horizontal processing module is structurally similar to the vertical processing module 101 and so only the differences will be described. The horizontal processing module operates on sets of three consecutive processed blocks of DCT coefficients $\tilde{Z}_E{}^c$ received from the vertical processing module 101 via the path 120.

The row-modified CST module 110 and the row-modified SCT module 112 respectively perform modified cosine-sine transforms and modified sine-cosine transforms on the rows of the blocks of DCT coefficients and mixed DCT/DST coefficients, respectively, in contrast to the column modified CST module 109 and the column modified SCT module 111 which perform modified transform operations on the columns of the blocks of DCT coefficients and mixed DST/DCT coefficients respectively.

The delay modules 122C and 124C each delay each block of DCT coefficients received via the path 120 by a time $D_H$ corresponding to the time between the vertical processing module 101 generating consecutive blocks $\tilde{Z}_E{}^c$ of DCT coefficients. Consequently, when the block $\tilde{Z}_E{}^c$ of DCT coefficients corresponding to the current block $\tilde{Z}^c$ is received by the horizontal processing module, the block output by the delay module 122C is the current block $\tilde{Z}^c$, and the block output by the delay module 124 is the block $\tilde{Z}_W{}^c$. The delay modules 122S and 124S have the same delay and generate the blocks $\tilde{Z}^{cs}$ and $\tilde{Z}_W{}^{cs}$ from the block $\tilde{Z}_E{}^{cs}$ of mixed DCT/DST coefficients generated by the row-modified CST module 110.

The delay modules 122C and 124C may each be realized in a practical apparatus by providing sufficient memory to store the DCT coefficients constituting one block of the compressed picture signal. The blocks of DCT coefficients received at the input of the delay module are stored in the memory. Every time interval $D_H$, the memory feeds the block stored in the memory to the output of the delay module, and fills the vacated memory space with the block received at the input of the delay module. The block has been stored in the memory for the time $D_H$.

The sign reversers 126C, 126S, 128C and 128S each subject the blocks $\tilde{Z}_E{}^c$, $\tilde{Z}_E{}^{cs}$, $\tilde{Z}_W{}^c$ and $\tilde{Z}_W{}^{cs}$, respectively, of transform coefficients to an even-column sign reversing operation which reverses the sign of all the elements in the even columns of the blocks of DCT coefficients.

Finally, the matrix multipliers 134C, 134S, 136C, 136S, 138C, 138S, 140C and 140S all post-multiply the first and second intermediate blocks of transform coefficients by the horizontal multiplying matrices $\tilde{H}_{I,1}{}^-$, $\tilde{H}_{R,0}{}^-$ $\tilde{H}_{I,1}{}^+$, $\tilde{H}^{+R,0}$ $\tilde{H}_{I,0}{}^-$, $\tilde{H}_{R,1}{}^-$, $\tilde{H}_{I,0}{}^+$ and $\tilde{H}_{R,1}{}^+$, respectively, to generate the first through fourth multiplied blocks of DCT coefficients and mixed DCT/DST coefficients. Note that the transposed forms of the horizontal multiplying matrices $\tilde{H}_{I,1}{}^-$, $\tilde{H}_{I,1}{}^+$, $\tilde{H}_{I,0}{}^-$ and $\tilde{H}_{I,0}{}^+$ are used in the matrix multiplying operations performed by the matrix multipliers 134C, 138C, 134S and 138C, respectively.

The filter 100 includes a number of serial arrangements of a sign reverser and a summing module, such as the serial arrangement of the sign-reverser 125C and the summing module 129C in the vertical processing module 101. Each serial arrangement can be regarded as having an input A corresponding to the input of the sign reverser, an input B corresponding to the input of the summing module to which the output of the sign reverser is not connected, and an output. The inputs A and B of the serial arrangement of the sign-reverser 125C and the summing module 129C are marked in FIG. 5. The functions of the sign reverser and the summing module in each of the serial arrangements can be merged into a modified summing module having inputs A and B and an output corresponding to the inputs A and B and the output of the serial arrangement. A modified summing module add the odd rows or columns of each block of the transform coefficients received via input A to the odd rows or columns, respectively, of the corresponding block of transform coefficients received via input B, and subtracts the even rows or columns of each block of the transform coefficients received via input A and the even rows or columns, respectively, of the corresponding block of transform coefficients received via input B. Details of the modified summing modules are set forth in Table 0, in which ODD COL A, for example, indicates the odd columns of the blocks of transform coefficients received via input A. Merging the functions of the sign reversers and the summing module increases the operational speed of the embodiment.

Figure 6A:
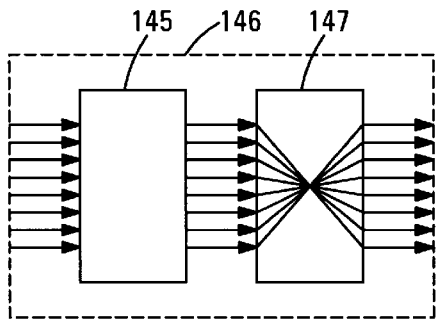
FIG. 6A is a block diagram of a processing module that can be used to implement the modified cosine-sine transform modules of the embodiments of the explicit DST-based filter according to the invention.
Figure 6B:
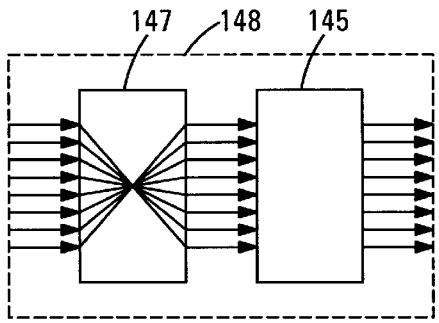
FIG. 6B is a block diagram of a processing module that can be used to implement the modified sine-cosine transform modules of the embodiments of the explicit DST-based filter according to the invention.
Figure 6C:
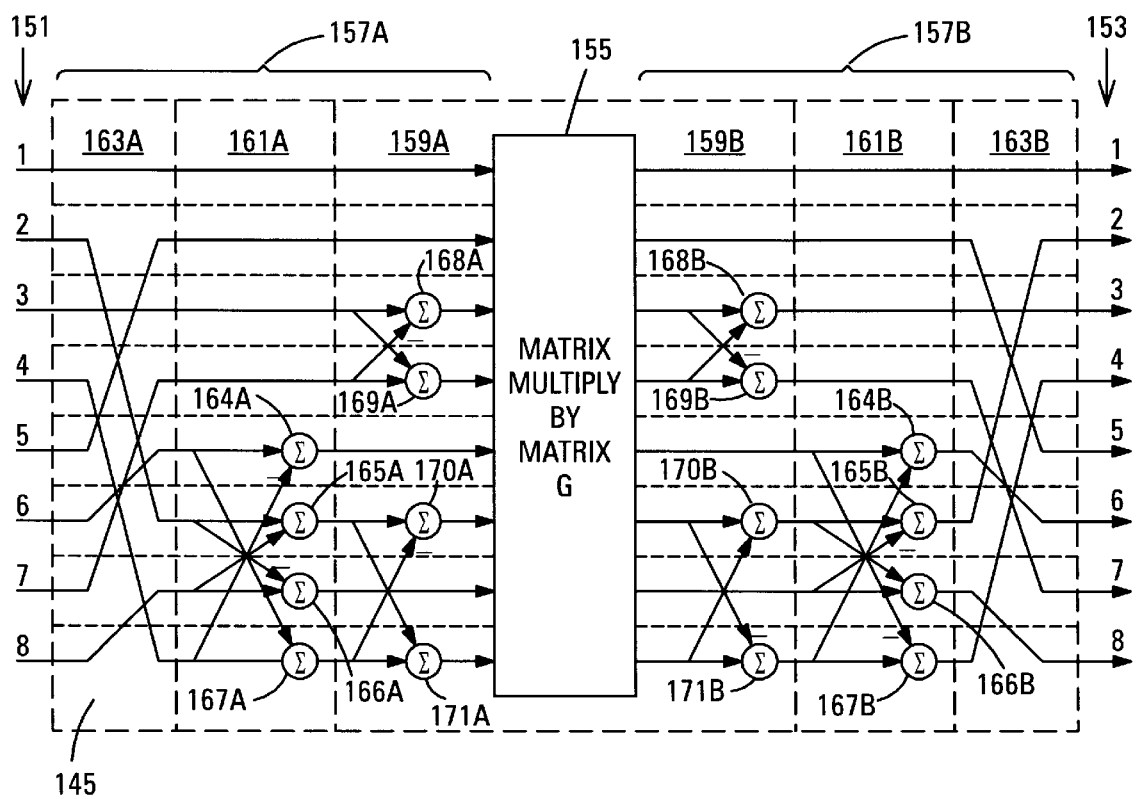
FIG. 6C is a block diagram of the cosine-sine transform core that forms part of the processing modules shown in FIGS. 6A and 6B.

The processing modules used to implement the modified cosine-sine transform (MCST) modules 109 and 110 and the modified sine-cosine transform (MSCT) modules 111 and 112 will now be described with reference to FIGS. 6A–6C. FIG. 6A shows an eight-point example of the processing module 146 that is used to implement the column-modified cosine-sine transform module 109 and FIG. 6B shows an eight-point example of the processing module 148 that is used to implement the column-modified sine-cosine module 111. These eight-point examples are for use when the blocks of transform coefficients are composed of 8×8 transform coefficients.

TABLE 0

| Sign Reverser | Summing Module | Addition Operation | | Subtraction Operation | |
|---|---|---|---|---|---|
| | | | | Subtract | From |
| 125C | 129C | ODD | ODD | EVEN | EVEN |
| 127C | 131C | ROW A | ROW B | ROW A | ROW B |
| 125S | 129S | EVEN | EVEN | ODD | ODD |
| 127S | 131S | ROW A | ROW B | ROW A | ROW B |
| 126C | 130C | ODD | ODD | EVEN | EVEN |
| 128C | 132C | COL A | COL B | COL A | COL B |
| 126S | 130S | EVEN | EVEN | ODD | ODD |
| 128S | 132S | COL A | COL B | COL A | COL B |

The CMCST module 109 is implemented by individually processing each column of the block of DCT coefficients received via the input line 119 using the MCST processing module 146 illustrated in FIG. 6A. The RMCST module 110 is implemented by individually processing each row of the block of DCT coefficients received via the input line 120 using the MCST processing module 146. The CMSCT module 111 is implemented by individually processing each column of the block of mixed DST/DCT coefficients received from the summing module 113 using the MSCT processing module 148 illustrated in FIG. 6B. The RMSCT module 112 is implemented by individually processing each row of the block of mixed DCT/DST coefficients received from the summing module 114 using the MSCT processing module 148 illustrated in FIG. 6B. Alternatively, each of the modules 109–112 may be implemented by providing n of the appropriate processing modules operating in parallel, where n is the number of rows or columns in each block of transform coefficients.

The processing modules 146 and 148 used to implement the MCST modules 109 and 110 and the MSCT modules 111 and 112 are each composed of the cosine-sine transform core 145 and the index reversal module 147, the former preceding the latter in the processing module 146 and the latter preceding the former in the processing module 148.

Figure 5:
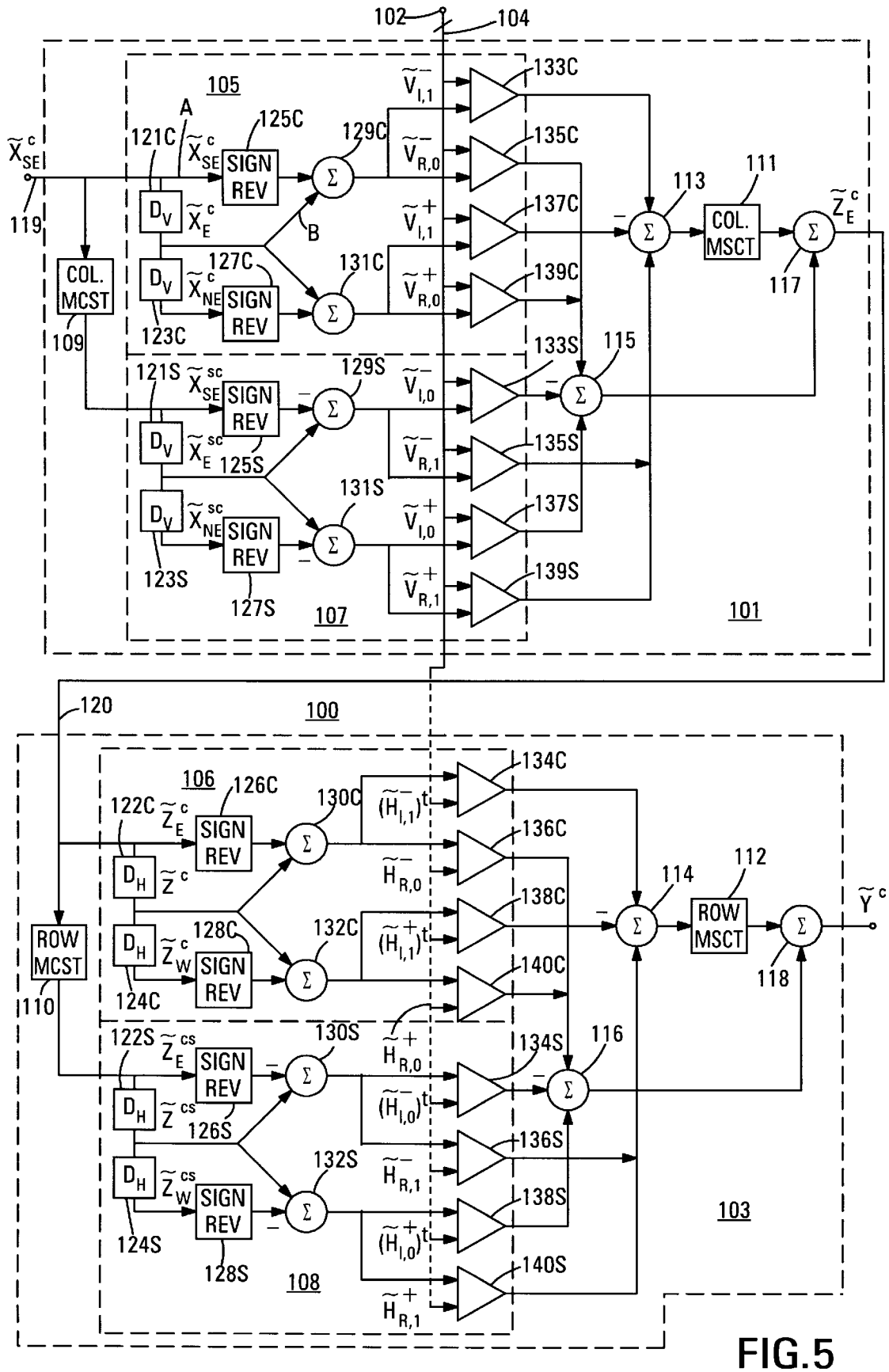
FIG. 5 is a block diagram of a first embodiment of the explicit DST-based filter according to the invention. In this embodiment, the characteristics of the filter may be defined by any type of kernel, i.e., causal or noncausal, symmetric or non-symmetric.

Referring first to FIG. 6A, the MCST processing module 146 has an eight-wide input through which it receives sub-blocks of eight DCT coefficients constituting the columns or rows of the blocks of DCT coefficients received via the input paths 119 or 120 (FIG. 5). When the MCST processing module is used to implement the column-modified CST module 109, each sub-block is one column of a block; when used to implement the row-modified CST module 110, each sub-block is one row of a block. Each sub-block of eight DCT coefficients is processed by the cosine-sine transform core 145, and the resulting processed transform coefficients pass to the index-reversal module 147 where the order of the transform coefficients $TC_n$ is reversed, i.e., $TC_1$ is exchanged with $TC_n$, $TC_2$ is exchanged with $TC_{n-1}$, etc., where n is the number of transform coefficients in each sub-block (eight in this example). The index-reversal module has an eight-wide output through which it outputs a sub-block of eight mixed transform coefficients. When the MCST processing module is used to implement the column-modified CST module 109, eight successive sub-blocks output by the MCST processing module constitute the columns of one block of mixed DST/DCT coefficients that will be processed by the mixed DST/DCT coefficient processor 107; when used to implement the row-modified CST module 110, eight successive sub-blocks output by the MCST processing module constitute the rows of one block of mixed DCT/DST coefficients that will be processed by the mixed DCT/DST coefficient processor 108.

Turning now to FIG. 6B, the MSCT processing module 148 has an eight-wide input through which it receives sub-blocks of eight mixed transform coefficients that constitute the rows or columns of the blocks of mixed transform coefficients output by the summing modules 113 or 114. When the MSCT processing module is used to implement the column-modified SCT module 111, each sub-block is one column of a block; when used to implement the row-modified SCT module 112, each sub-block is one row of a block. Each sub-block of eight transform coefficients is processed by the index-reversal module 147 where the order of the transform coefficients $TC_1$–$TC_n$ is reversed, as described above. The resulting index-reversed transform coefficients pass to cosine-sine transform core 145. The cosine-sine transform core has an eight-wide output through which it outputs a sub-block of eight DCT coefficients. When the MSCT processing module is used to implement the column-modified SCT module 111, eight successive sub-blocks output by the MSCT processing module constitute the columns of a block of DCT coefficients that will be fed to the summing module 117; when used to implement the row-modified SCT module 112, eight successive sub-blocks output by the MSCT processing module constitute the rows of a block of DCT coefficients that will be fed to the summing module 118.

The cosine-sine transform core 145 will now be described with reference to FIG. 6C. The cosine-sine transform core has an eight-wide input 151 through which it receives the eight transform coefficients subject to processing and an eight-wide output 153 through which it provides the eight processed transform coefficients. The cosine-sine transform core also includes the matrix multiplier 155. The embodiment of the cosine-sine transform module shown in FIG. 6C is shown as having eight parallel processing paths, each of which extends from one element of the eight-wide input through the matrix multiplier to the corresponding element of the eight-wide output. The processing paths are labelled 1 through 8 in the drawing. The parallel processing paths are shown merely for the convenience of description. Corresponding parallel processing paths are not essential in an actual filter.

The matrix multiplier 155 pre-multiplies the processed transform coefficients received at its input by the matrix G defined below.

Disposed symmetrically about the matrix multiplier 155 are two serial arrangements 157A and 157B. In order from the matrix multiplier, the serial arrangements are each respectively composed of the inner summing sections 159A and 159B, the outer summing sections 161A and 161B, and the re-ordering sections 163A and 163B.

$$G = \begin{pmatrix} 0 & 0 & 0 & 0 & 0 & 0 & 0 & 2 \\ 0 & 0 & 0 & 0 & -5.2264 & 0 & 2.1648 & 2 \\ 0 & 0 & 0 & 0 & 0 & -2 & 0 & 1.4142 \\ 0 & 0 & 0 & 0 & 1.0824 & 0 & 2.6132 & 2 \\ 0 & -5.2264 & 0 & 1.0824 & 0 & 0 & 0 & 0 \\ 0 & 0 & 0 & 0 & 0 & 0 & 0 & 0 \\ 0 & 2.1648 & 0 & 2.6132 & 0 & 0 & 0 & 0 \\ 2 & 2 & 1.4142 & 2 & 0 & 0 & 0 & 0 \end{pmatrix}$$

The serial arrangement 157A will now be described. The transform coefficients received via the 8-wide input 151 pass to the re-ordering section 163A where the processing paths in which some of the transform coefficients are processed are changed as shown in Table 1:

TABLE 1

| Input path  | 1 | 2 | 3 | 4 | 5 | 6 | 7 | 8 |
|---|---|---|---|---|---|---|---|---|
| Output path | 1 | 6 | 3 | 8 | 2 | 5 | 4 | 7 |

The transform coefficients pass from the re-ordering section 163A to the outer summing section 161A composed of the two-input summing modules 164A–167A located in processing paths 5–8, respectively. The summing modules 164A–167A perform the summing operations shown in Table 2. A minus sign preceding an input path number indicates that the transform coefficient in that path is subtracted from the transform coefficient in the other path. The outer summing section does not subject the transform coefficients in processing paths 1–4 to a summing operation.

TABLE 2

| Summing module | Input path 1 | Input path 2 | Output path |
|---|---|---|---|
| 164A | 5 | −8 | 5 |
| 165A | 6 | 7 | 6 |
| 166A | 7 | −6 | 7 |
| 167A | 8 | 5 | 8 |

The transform coefficients pass from the outer summing section 161A to the inner summing section 159A composed of the two-input summing modules 168A and 169A located in processing paths 3 and 4, respectively, and the summing modules 170A and 171A located in processing paths 6 and 8, respectively. The summing modules 168A–172A perform the summing operations shown in Table 3 in which a − sign preceding an input path number indicates that the transform coefficient in that path is subtracted from the transform coefficient in the other path. The inner summing section does not subject the transform coefficients in processing paths 1,2, 5 and 7 to a summing operation.

TABLE 3

| Summing module | Input path 1 | Input path 2 | Output path |
|---|---|---|---|
| 168A | 3 | −4 | 4 |
| 169A | 4 | 3 | 4 |
| 170A | 6 | −8 | 6 |
| 171A | 8 | 6 | 8 |

The processed transform coefficients then pass from the processing paths in the inner summing section 159A to the corresponding inputs of the matrix multiplier 155. The outputs of the matrix multiplier pass to the corresponding signal paths of the serial arrangement 157B. The serial arrangement 157B differs from the serial arrangement 157A in the sense of some of the summing operations performed by the inner and outer summing sections 159B and 161B. Table 4 shows only the summing modules of the serial arrangement 157B whose sense differs from those of the corresponding summing modules of the serial arrangement 157A. The sense of the summing operations performed by each of the remaining summing modules of the serial arrangement 157B is the same as that of the corresponding summing module of the serial arrangement 157A.

TABLE 4

| Summing module | Input path 1 | Input path 2 |
|---|---|---|
| 165B | 6 | −7 |
| 167B | 8 | −5 |
| 169B | 4 | −3 |
| 171B | 8 | −6 |

The re-ordering performed by the re-ordering section 163B of the serial arrangement 157B is shown in Table 5. The re-ordering reverses the re-ordering performed by the re-ordering section 163A to restore the original order of transform coefficients, i.e.,

TABLE 5

| Input path  | 1 | 2 | 3 | 4 | 5 | 6 | 7 | 8 |
|---|---|---|---|---|---|---|---|---|
| Output path | 1 | 5 | 3 | 7 | 6 | 2 | 8 | 4 |

The transform coefficients then pass from the serial arrangement 157B to the eight-wide output 153.

In a practical embodiment of the filter 40, processing may be simplified by combining the re-ordering operations performed by the index reversing module 147 and the re-ordering section 163A or 163B adjacent the index-reversing module.

Figure 7:
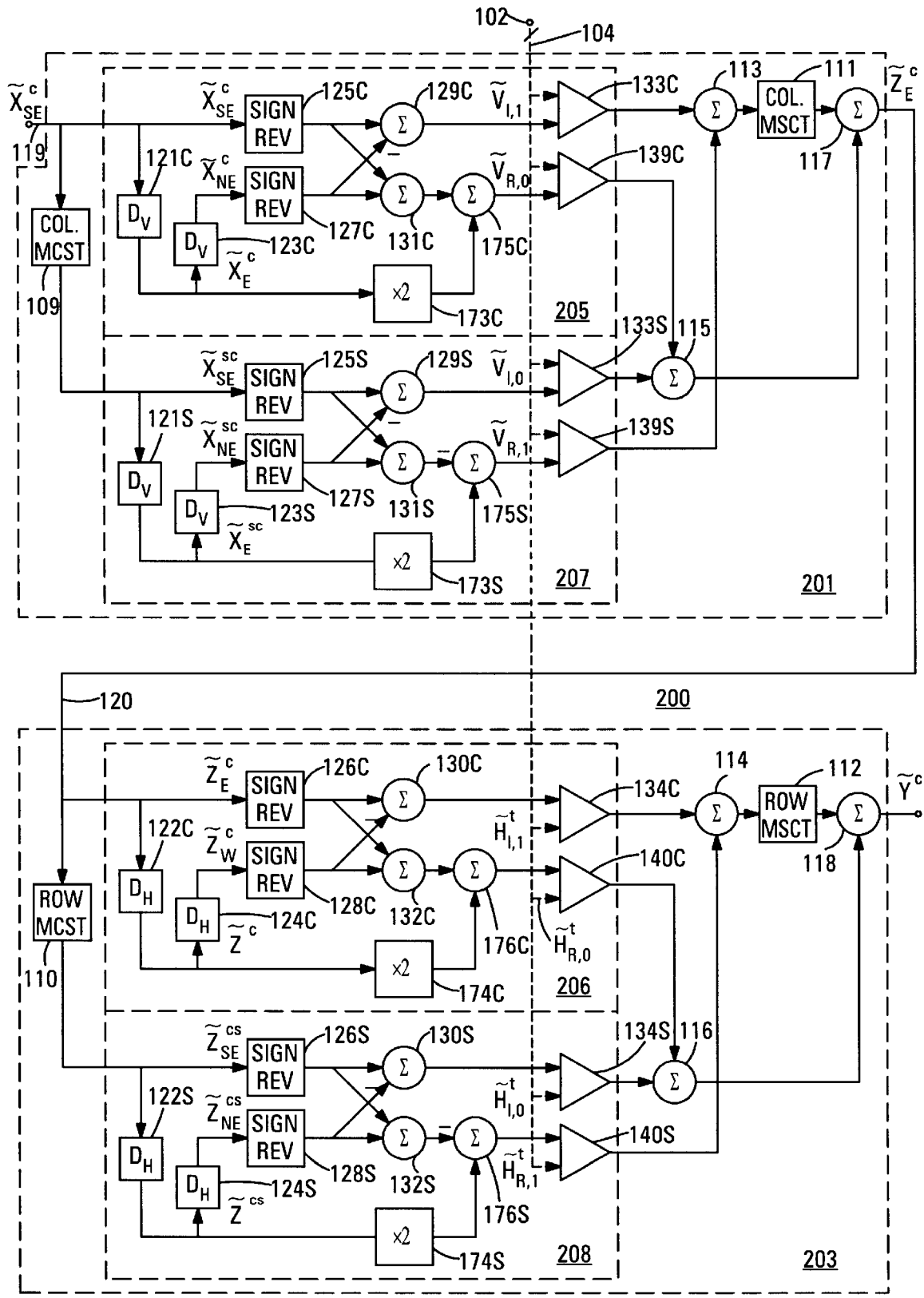
FIG. 7 is a block diagram of a second embodiment of the explicit DST-based filter according to the invention. In this embodiment, the characteristics of the filter are defined by a noncausal-symmetric kernel.

The embodiment 100 of the filter described above with reference to FIG. 5 may be significantly simplified if the filter characteristics are defined by a noncausal-symmetric kernel. In particular, the number of matrix multipliers may be halved. An embodiment 200 of such a filter is shown in FIG. 7. This embodiment is constructed using substantially the same elements as the filter shown in FIG. 5. Such elements are indicated using the same reference numerals and will not be described again. However, the elements are differently arranged to form the DCT coefficient processors 205 and 206 and the mixed coefficient processors 207 and 208, as will be described below.

As in the embodiment shown in FIG. 5, the embodiment shown in FIG. 7 is composed of the vertical processing module 201 and the horizontal processing module 203. These modules are respectively composed of the DCT coefficient processors 205 and 206, the modified cosine-sine transform modules 109 and 110, the mixed DST/DCT coefficient processor 207, the mixed DCT/DST coefficient processor 208, the summing modules 113–118 and the modified sine-cosine transform modules 111 and 112. These modules are arranged in the same structure as that described above with reference to FIG. 5. However, the summing modules 113–116 all receive only the first and fourth multiplied blocks of transform coefficients, and sum these intermediate blocks of transform coefficients to generate the first final blocks of mixed coefficients and the second final blocks of DCT coefficients.

The DCT coefficient processor 205 will now be described. Between the input line 119 and the output of the sign reversers 125C and 127C, the structure of the DCT coefficient processor 205 is the same as that of the DCT coefficient processor 105 described above with reference to FIG. 5, and so will not be described again. The summing modules 129C and 131C perform a butterfly operation between the outputs of the sign reversers. The summing operation performed by the summing module 129C subtracts the output of the sign reverser 127C from that of the sign reverser 125C to generate the first intermediate block of DCT coefficients. The summing operation performed by the summing module 131C adds the outputs of the sign reversers to generate a block of DCT coefficients that is a first precursor for the second intermediate block of DCT coefficients. The summing module 131C passes this block of DCT coefficients to one input of the summing module 175C.

The block $\tilde{X}_E^c$ of DCT coefficients generated by the delay module 121C is fed to the doubling module 173C which multiplies each DCT coefficient in the block by two to generate a block of DCT coefficients that is a second precursor for the second intermediate block of DCT coefficients. The doubling module passes this block of DCT coefficients to the other input of the summing module 175C. In a practical embodiment, the doubling module is implemented by applying a single left shift to the binary representation of each DCT coefficient in the block. In this disclosure, it will be understood that a reference to a multiplication by two encompasses such single left shift.

The summing module 175C adds the first and second precursor blocks of DCT coefficients to generate the second intermediate block of DCT coefficients.

The first intermediate block of DCT coefficients passes to the matrix multiplier 133C which pre-multiplies it by the multiplying matrix $\tilde{V}_{I,1}$, to generate the first multiplied block of mixed DST/DCT coefficients. The second intermediate block of DCT coefficients passes to the matrix multiplier 139C which pre-multiplies it by the multiplying matrix $\tilde{V}_{R,0}$ to generate the fourth multiplied block of DCT coefficients.

The structure of the mixed DST/DCT coefficient processor 207 is identical to that of the DCT coefficient processor 205 just described. However, the summing operation performed by the summing module 175S subtracts the block of mixed DST/DCT coefficients generated by the summing module 131S from the block of mixed DST/DCT coefficients generated by the doubling module 173S. Moreover, the matrix multiplier 133S pre-multiplies the first intermediate block of mixed DST/DCT coefficients by the multiplying matrix $\tilde{V}_{I,0}$ to generate the first multiplied block of DCT coefficients. Finally, the matrix multiplier 139S pre-multiplies the second intermediate block of mixed DST/DCT coefficients by the multiplying matrix $\tilde{V}_{R,1}$ to generate the fourth multiplied block of mixed DST/DCT coefficients.

The horizontal processing module 203 differs from the horizontal processing module 103 shown in FIG. 5 in the same ways, described above, that the vertical processing module 201 differs from the vertical processing module 101. The matrix multipliers 134C, 140C, 134S and 140S post multiply the first and second intermediate blocks of transform coefficients by the multiplying matrices $\tilde{H}_{I,1}^t$, $\tilde{H}_{R,0}^t$, $\tilde{H}_{I,0}^t$ and $\tilde{H}_{R,1}^t$, respectively, to generate the first multiplied block of mixed DCT/DST coefficients, the fourth multiplied block of DCT coefficients, the first multiplied block of DCT coefficients and the fourth multiplied block of mixed DCT/DST coefficients, respectively.

Figure 8:
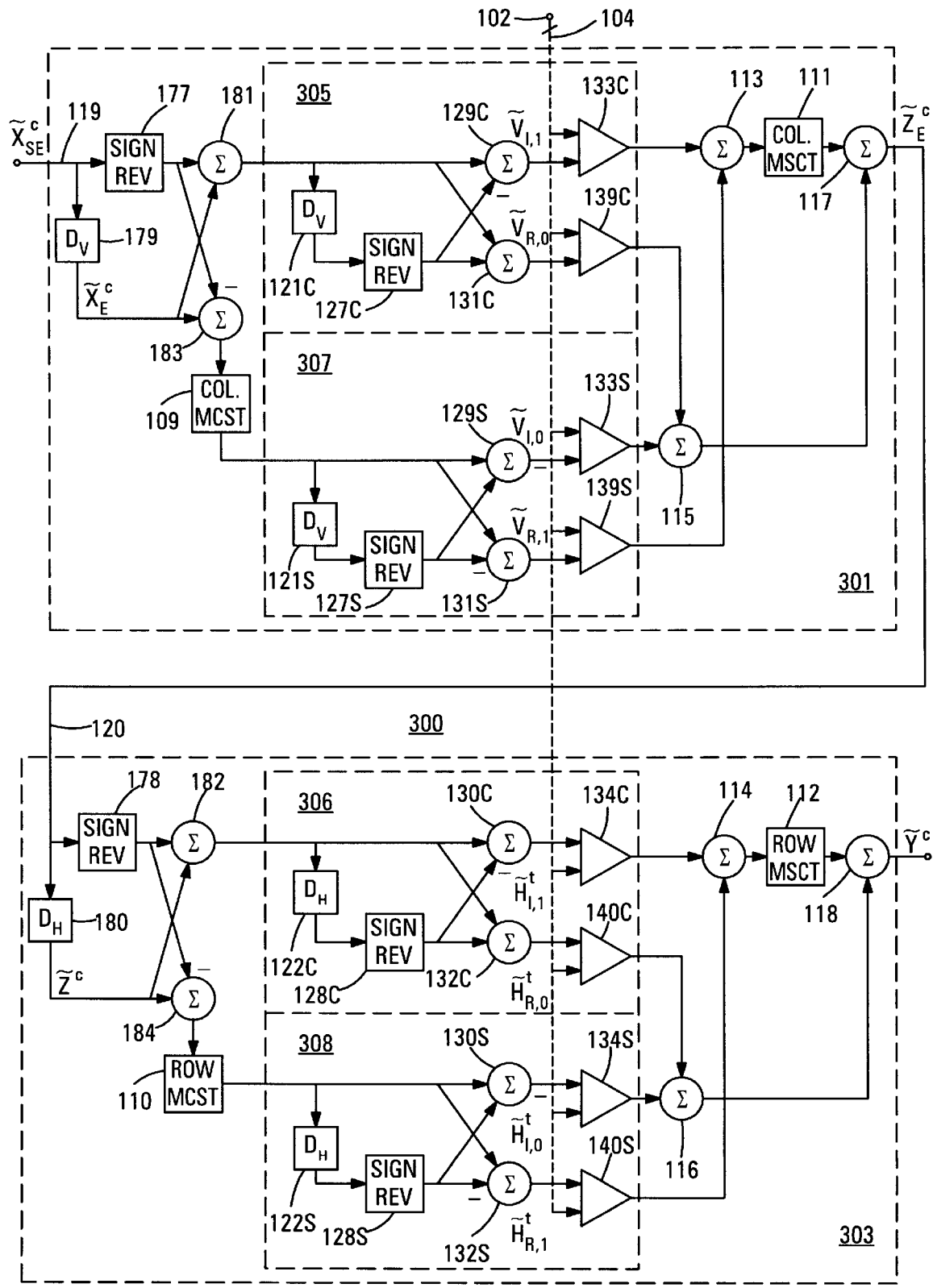
FIG. 8 is a block diagram of a version of second embodiment of the explicit DST-based filter according to the invention shown in FIG. 7 in which the number of delay modules is reduced by 25%.

When the filter characteristics are defined by a noncausal-symmetric kernel, the filter described above with reference to FIG. 7 may be simplified to reduce the number of delay modules by 25%, to halve the number of sign reversers and to eliminate the doubling modules. The delay modules 121C, 121S, 123C and 123S require a significant amount of memory to implement. An embodiment 300 of such a filter is shown in FIG. 8. This filter is constructed using substantially the same elements as the filters shown in FIGS. 5 and 7. Such elements are indicated using the same reference numerals and will not be described again. However, the elements are differently distributed between the DCT coefficient processors 305 and 306, the mixed DST/DCT coefficient processor 307, and the mixed DCT/DST coefficient processor 308 on one hand, and the parts of the vertical processing module 301 and the horizontal processing module 303 preceding the processors 305–308, as will be described below.

As in the embodiments shown in FIGS. 5 and 7, the embodiment 300 shown in FIG. 8 is composed of the vertical processing module 301 and the horizontal processing module 303. These modules are respectively composed of the DCT coefficient processors 305 and 306, the modified cosine-sine transform modules 109 and 110, the mixed DST/DCT coefficient processor 307, the mixed DCT/DST coefficient processor 308, the summing modules 113–118 and the modified sine-cosine transform modules 111 and 112. These modules are arranged in a structure similar to that described above with reference to FIG. 7. However, in the vertical processing module 301 of the embodiment shown in FIG. 8, the blocks $\tilde{X}_{SE}^c$ of DCT coefficients received via the input line 119 are pre-processed by the sign reverser 177, the delay module 179 and the summing modules 181 and 183 prior to passing to the vertical processing module and the CMCST module 109.

The sign reverser 177 is the same as the sign reverser 125C, described above, and subjects the block $\tilde{X}_{SE}^c$ of DCT coefficients to an even-row sign reversing operation. The even-row sign-reversed block of DCT coefficients output by the sign reverser passes to both of the summing modules 181 and 183.

The delay module 179 is similar to the delay module 121C, described above, and delays each block of DCT coefficients by a time $D_V$ corresponding to the time between the vertical processing module 101 receiving consecutive slices of the compressed picture signal via the input line 119. Consequently, when the vertical processing module receives the block $\tilde{X}_{SE}^c$ of DCT coefficients corresponding to the current block $\tilde{X}^c$, the block output by the delay module 179 is the block $\tilde{X}_E^c$ corresponding to the current block. The block $\tilde{X}_E^c$ output by the delay module 179 passes to both of the summing modules 181 and 183.

The summing modules 181 and 183 perform a butterfly operation on the blocks of DCT coefficients output by the sign reverser 177 and the delay module 179. The summing module 181 performs a summing operation that adds these blocks of DCT coefficients and passes the resulting block of DCT coefficients to the DCT coefficient processor 305. The summing module 183 performs a summing operation in which the column sign-reversed block of DCT coefficients output by the sign reverser 177 is subtracted from the block $\tilde{X}_E^c$ of DCT coefficients output by the delay module 179. The summing module 183 passes the resulting block of DCT coefficients to the CMCST module 109.

The horizontal processing module 303 is similarly modified relative to the horizontal processing module 203 shown in FIG. 7. The sign reverser 178 is the same as the sign reverser 126C, described above, and subjects the block $\tilde{Z}_E^c$ of DCT coefficients to an even-column sign reversing operation. The delay module 180 is similar to the delay module 122C, described above, and delays each block of DCT coefficients by a time corresponding to the time between the horizontal processing module receiving consecutive blocks of DCT coefficients via the input line 120. Consequently, when the horizontal processing module receives the block $\tilde{Z}_E^c$ of DCT coefficients corresponding to the current block $\tilde{X}^c$, the block output by the delay module 180 is the block $\tilde{Z}^c$ corresponding to the current block.

The DCT coefficient processor 305 will now be described. The block of DCT coefficients output by the summing module 181 passes via two paths to both of the summing modules 129C and 131C. One path is a direct path. A serial arrangement of the delay module 121C and the sign reverser 127C is located in the other path. The summing modules 129C and 131C perform a butterfly operation on the blocks of DCT coefficients received via the two paths. The summing operation performed by the summing module 129C subtracts the block of DCT coefficients output by the sign reverser 127C from that received from the output of the summing module 181 to generate the first intermediate block of DCT coefficients. The summing operation performed by the summing module 131C adds the block of DCT coefficients output by the sign reverser and the block of DCT coefficients received from the summing module 181 to generate the second intermediate block of DCT coefficients.

The first intermediate block of DCT coefficients passes to the matrix multiplier 133C which pre-multiplies it by the multiplying matrix $\tilde{V}_{I,1}$ to generate the first multiplied block of mixed DST/DCT coefficients. The second intermediate block of DCT coefficients passes to the matrix multiplier 139C which pre-multiplies it by the multiplying matrix $\tilde{V}_{R,0}$ to generate the fourth multiplied block of DCT coefficients.

The structure of the mixed DST/DCT coefficient processor 307 is identical to that of the DCT coefficient processor 305 just described. However, the summing operation performed by the summing module 129S adds the block of mixed DST/DCT coefficients output by the sign reverser 127S and the block of mixed DST/DCT coefficients received from the output of the CMCST module 109 and inverts the sign of the result to generate the first intermediate block of mixed DST/DCT coefficients. The summing operation performed by the summing module 131S subtracts the block of mixed DST/DCT coefficients output by the sign reverser 127S from the block of mixed DST/DCT coefficients received from the CMCST module 109 to generate the second intermediate block of mixed DST/DCT coefficients. The matrix multiplier 133S pre-multiplies the first intermediate block of mixed DST/DCT coefficients by the multiplying matrix $\tilde{V}_{I,0}$ to generate the first multiplied block of DCT coefficients fed to the summing module 115. The matrix multiplier 139S pre-multiplies the second intermediate block of mixed DST/DCT coefficients by the multiplying matrix $\tilde{V}_{R,1}$ to generate the fourth multiplied block of mixed DST/DCT coefficients fed to the summing module 113.

The DCT coefficient processor 306 and the mixed DCT/DST coefficient processor 308 of the horizontal processing module 303 are structurally similar to the corresponding elements of the vertical processing module 301 just described. In the horizontal processing module, the matrix multipliers 134C, 140C, 134S and 140S post-multiply the first and second intermediate blocks of transform coefficients by the multiplying matrices $\tilde{H}_{I,1}{}^t$, $\tilde{H}_{R,0}{}^t$, $\tilde{H}_{I,0}{}^t$ and $\tilde{H}_{R,1}{}^t$, respectively, to generate the first multiplied block of mixed DCT/DST coefficients, the fourth multiplied block of DCT coefficients, the first multiplied block of DCT coefficients and the fourth multiplied block of mixed DCT/DST coefficients, respectively.

Figure 9:
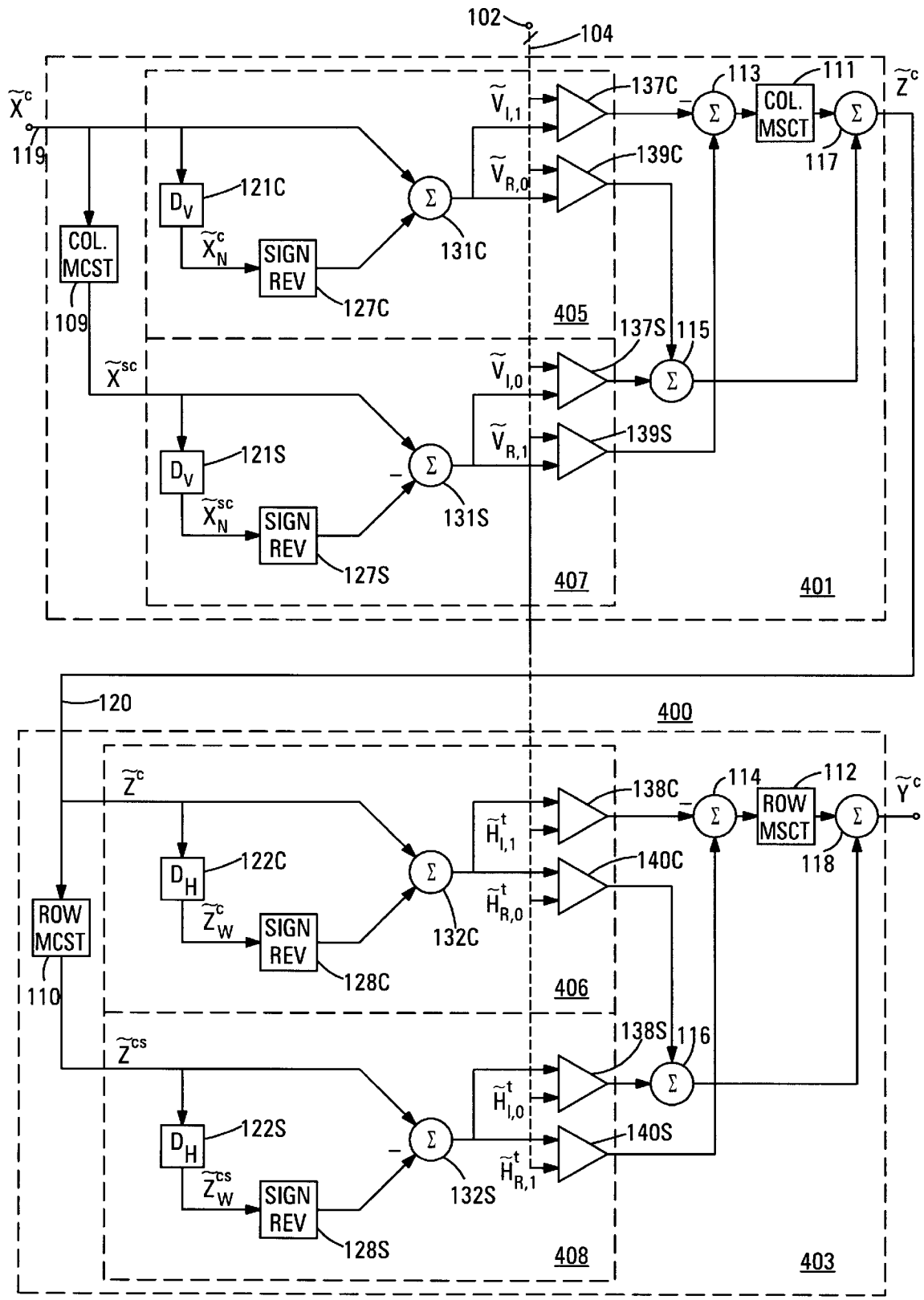
FIG. 9 is a block diagram of a third embodiment of the explicit DST-based filter according to the invention. In this embodiment, the characteristics of the filter are defined by a causal kernel.

When the filter characteristics are defined by a causal kernel, the filter described above with reference to FIG. 5 may be significantly simplified to halve the number of matrix multipliers, the number of delay modules and the number of sign-reversing modules. An embodiment 400 of such a filter is shown in FIG. 9. This filter is constructed using substantially the same elements as the filter shown in FIG. 5. Such elements are indicated using the same reference numerals and will not be described again. However, the elements are differently arranged to form the DCT coefficient processors 405 and 406, the mixed DST/DCT coefficient processor 407 and the mixed DCT/DST coefficient processor 408, as will be described below.

As in the embodiment shown in FIG. 5, the embodiment shown in FIG. 9 is composed of the vertical processing module 401 and the horizontal processing module 403. These modules are respectively composed of the DCT coefficient processors 405 and 406, the modified cosine-sine transform modules 109 and 110, the mixed DST/DCT coefficient processor 407, the mixed DCT/DST coefficient processor 408, the summing modules 113–118 and the modified sine-cosine transform modules 111 and 112. These elements are arranged in the same structure as that described above with reference to FIG. 5. However, the filter 400 operates on the each current block $\tilde{X}^c$ of the compressed picture signal. Moreover, the summing modules 113–116 all receive only the third and fourth multiplied blocks of transform coefficients. Finally, the summing modules 113 and 114 subtract the third multiplied block of transform coefficients from the fourth multiplied block of transform coefficients to generate the first final block of transform coefficients.

The vertical processing module 405 will now be described. The block $\tilde{X}^c$ of DCT coefficients received via the input line 119 passes via two paths to the inputs of the summing module 131C. One path is a direct path. A serial arrangement of the delay module 121C and the sign reverser 127C is located in the other path. The summing module 131C performs a summing operation that adds the blocks of DCT coefficients received via the two paths to generate the first intermediate block of DCT coefficients.

The first intermediate block of DCT coefficients passes to the matrix multiplier 137C which pre-multiplies it by the multiplying matrix $\tilde{V}_{I,1}$ to generate the third multiplied block of mixed DST/DCT coefficients. The first intermediate block of DCT coefficients passes to the matrix multiplier 139C which pre-multiplies it by the multiplying matrix $\tilde{V}_{R,0}$ to generate the fourth multiplied block of DCT coefficients.

The structure of the mixed DST/DCT coefficient processor 407 is identical to that of the DCT coefficient processor 405 just described. However, the summing operation performed by the summing module 131S subtracts the block of mixed DST/DCT coefficients output by the sign reverser 127S from the block of mixed DST/DCT coefficients received from the output of the CMCST module 109 to generate the first intermediate block of mixed DST/DCT coefficients. Moreover, the matrix multiplier 137S pre-multiplies the first intermediate blocks of mixed DST/DCT coefficients by the multiplying matrix $\tilde{V}_{I,0}$ to generate the third multiplied block of DCT coefficients. Finally, the matrix multiplier 139S pre-multiplies the first intermediate blocks of mixed DST/DCT coefficients by the multiplying matrix $\tilde{V}_{R,1}$ to generate the fourth multiplied block of mixed DST/DCT coefficients.

The horizontal processing module 403 differs from the horizontal processing module 103 shown in FIG. 5 in the same ways, described above, that the vertical processing module 401 differs from the vertical processing module 101. The matrix multipliers 138C, 140C, 138S and 140S post-multiply the first intermediate blocks of transform coefficients by the multiplying matrices $\tilde{H}_{I,1}{}^t$, $\tilde{H}_{R,0}{}^t$, $\tilde{H}_{I,0}{}^t$ and $\tilde{H}_{R,1}{}^t$, respectively, to generate the third multiplied block of mixed DCT/DST coefficients, the fourth multiplied block of DCT coefficients, the third multiplied block of DCT coefficients and the fourth multiplied block of mixed DCT/DST coefficients, respectively.

Figure 10:
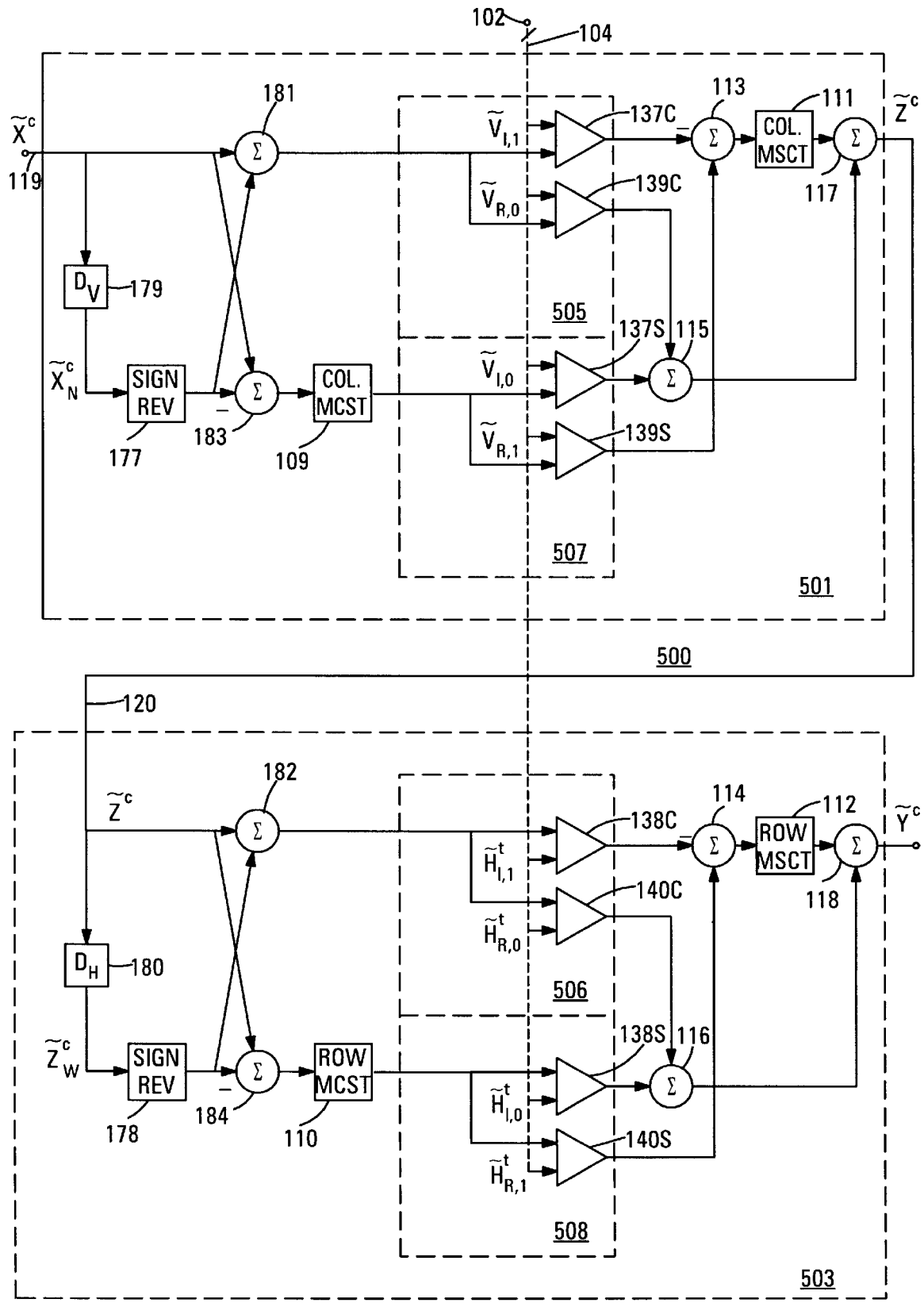
FIG. 10 is a block diagram of a version of the third embodiment of the explicit DST-based filter according to the invention shown in FIG. 9 in which the number of delay modules is reduced by 25%.

The filter described above with reference to FIG. 9, in which the filter characteristics are defined by a causal kernel, may be simplified to reduce the number of delay modules by 25%. An embodiment 500 of such a filter is shown in FIG. 10. This filter is constructed using substantially the same elements as the embodiments shown in FIGS. 8 and 9. Such elements are indicated using the same reference numerals and will not be described again.

As in the embodiments described above, the embodiment 500 shown in FIG. 10 is composed of the vertical processing module 501 and the horizontal processing module 503. These modules are respectively composed of the DCT coefficient processors 505 and 506, the modified cosine-sine transform modules 109 and 110, the mixed DST/DCT coefficient processor 507, the mixed DCT/DST coefficient processor 508, the summing modules 113–118 and the modified sine-cosine transform modules 111 and 112. These modules are arranged in a structure similar to that described above with reference to FIG. 9. However, in the vertical processing module 501 of the embodiment shown in FIG. 10, the blocks $\tilde{X}^c$ of DCT coefficients received via the input line 119 are pre-processed by the sign reverser 177, the delay module 179 and the summing modules 181 and 183 prior to passing to the vertical processing module and the CMCST module 109.

The block $\tilde{X}^c$ of DCT coefficients received via the input line 119 passes via one path to a first input of each of the summing modules 181 and 183 and also passes via another path to a second input of each of these summing modules. The one path is direct; a serial arrangement of the delay module 179 and the sign reverser 177 is located in the other path. The delay module 179 delays each block $\tilde{X}^c$ of DCT coefficients by a time $D_V$ corresponding to the time between the vertical processing module receiving consecutive slices of the DCT coefficients via the input line 119. Consequently, when the vertical processing module receives the block $\tilde{X}^c$ of DCT coefficients, the block output by the delay module 179 is the block $\tilde{X}_N{}^c$ corresponding to the current block. The block $\tilde{X}_N{}^c$ output by the delay module 179 passes to the sign reverser 177, which subjects the block $\tilde{X}_N{}^c$ of DCT coefficients to an even-row sign reversing operation. The block of DCT coefficients output by the sign reverser passes to the inputs of the summing modules 181 and 183.

The summing modules 181 and 183 perform a butterfly operation on the block of DCT coefficients received via the input line 119 and that output by the sign reverser 177. The summing module 181 performs a summing operation that adds these blocks of DCT coefficients and passes the resulting first intermediate block of DCT coefficients to the DCT coefficient processor 505. The summing module 183 performs a summing operation that subtracts the block of DCT coefficients output by the sign reverser 177 from the block $\tilde{X}^c$ of DCT coefficients received via the input path 119. The summing module 183 passes the resulting block of DCT coefficients to the CMCST module 109.

The horizontal processing module 503 is similarly modified relative to the horizontal processing module 403 shown in FIG. 9. The delay module 180 delays each block of DCT coefficients by a time $D_H$ corresponding to the time between the horizontal processing module receiving consecutive blocks of DCT coefficients via the input line 120. Consequently, when the horizontal processing module receives the block $\tilde{Z}^c$ of DCT coefficients corresponding to the current block $\tilde{X}^c$, the block output by the delay module 180 is the block $\tilde{Z}_W{}^c$ corresponding to the current block. The sign reverser 178 subjects the block $\tilde{Z}^c$ of DCT coefficients to an even-row sign reversing operation.

The DCT coefficient processor 505 will now be described. The first intermediate block of DCT coefficients output by the summing module 181 passes to the matrix multipliers 137C and 139C. The matrix multiplier 137C pre-multiplies the first intermediate block of DCT coefficients by the multiplying matrix $\tilde{V}_{I,1}$ to generate the third multiplied block of mixed DST/DCT coefficients. The matrix multiplier 139C pre-multiplies the first intermediate block of DCT coefficients by the multiplying matrix $\tilde{V}_{R,0}$ to generate the fourth multiplied block of DCT coefficients.

The structure of the mixed DST/DCT coefficient processor 507 is identical to that of the DCT coefficient processor 505 just described. The matrix multiplier 137S pre-multiplies the first intermediate block of mixed DST/DCT coefficients by the multiplying matrix $\tilde{V}_{I,0}$ to generate the third multiplied block of DCT coefficients. The matrix multiplier 139S pre-multiplies the first intermediate block of mixed DST/DCT coefficients by the multiplying matrix $\tilde{V}_{R,1}$ to generate the fourth multiplied block of mixed DST/DCT coefficients.

The DCT coefficient processor 506 and the mixed DCT/DST coefficient processor 508 of the horizontal processing module 503 are structurally similar to the corresponding elements of the vertical processing module 501 just described. In the horizontal processing module, the matrix multipliers 138C, 140C, 138S and 140S post multiply the first intermediate blocks of transform coefficients by the multiplying matrices $\tilde{H}_{I,1}{}^t$, $\tilde{H}_{R,0}{}^t$, $\tilde{H}_{I,0}{}^t$ and $\tilde{H}_{R,1}{}^t$, respectively to generate the third multiplied block of mixed DCT/DST coefficients, the fourth multiplied block of DCT coefficients, the third multiplied block of DCT coefficients and the fourth multiplied block of mixed DST/DCT coefficients, respectively.

An embodiment of the multiplying matrix generating module 41 will now be described with reference to FIG. 11. This embodiment of the multiplying matrix generating module is capable of generating the multiplying matrices required by any of the embodiments of the filter shown in FIGS. 5 and 7 through 10. The example shown generates multiplying matrices for use in filters in which the blocks of DCT coefficients constituting the compressed picture signal are composed of 8×8 DCT coefficients. However, the example can easily be adapted to generate multiplying matrices for use in filters that operate with differently-sized blocks of DCT coefficients.

The multiplying matrix generating module 41 receives the filter kernel from the filter definition module 43. The filter is defined by separable components, so that the vertical characteristics of the filter are defined independently of the horizontal characteristics. This enables the vertical and horizontal multiplying matrices to be generated independently of one another, and allows the same processing structure to be used with different input kernels to generate both the vertical multiplying matrices $\tilde{V}_{I,1}$, $\tilde{V}_{R,0}$, $\tilde{V}_{I,0}$ and $\tilde{V}_{R,1}$ and the horizontal multiplying matrices $\tilde{H}_{I,1}$, $\tilde{H}_{R,0}$, $\tilde{H}_{I,0}$ and $\tilde{H}_{R,1}$. Additional processing is then required to transpose the horizontal multiplying matrices to the transposed form required by some of the matrix multipliers in the horizontal processing module. When the filter characteristics are defined by a general kernel, the processing structure that will be described below with reference to FIG. 11 is re-used a further two times with two additional elements of the filter kernel so that both the positive and negative versions of the multiplying matrices required by the matrix multipliers of the embodiment shown in FIG. 5 are generated. The order in which the multiplying matrices is generated is unimportant. The processing structure as it is used to generate the multiplying matrices supplied to the vertical processing module will be described on the understanding that the same processing structure is also used to generate the multiplying matrices supplied to the horizontal processing module.

The filter definition module 43 feeds to the multiplying matrix generating module 41 a 2N-point vector that exactly represents the filter kernel that defines the characteristics of the filter in the vertical direction, where N is the number of pixels in each picture block to which a block of DCT coefficients corresponds. When the picture blocks are blocks of 8×8 pixels, the 2N-point vector is a 16-point vector. When the filter kernel is noncausal-symmetric, the vector is of the form:

$$\tfrac{1}{2}(v_0/2, v_1, v_2, \ldots, v_{N-1}, v_N, 0, 0, \ldots, 0).$$

When the filter kernel is causal-symmetric, the vector is of the form:

$$\tfrac{1}{2}(v_0, v_1, v_2, \ldots, v_{N-1}, v_N, 0, 0, \ldots, 0).$$

When the filter kernel is general, the vector defining the multiplying matrices with the + superscript is of the same form as the vector defining the causal-symmetric kernel, i.e.:

$$\tfrac{1}{2}(v_0/2, v_1, v_2, \ldots, v_{N-1}, v_N, 0, 0, \ldots, 0).$$

The vector defining the multiplying matrices with the − superscript is of the form:

$$\tfrac{1}{2}(v_0/2, v_{-1}, v_{-2}, \ldots, v_{-(N-1)}, v_{-N}, 0, 0, \ldots, 0)$$

The 2N-point vector is received by the DFT module 600 which subjects the vector to a 2N-point discrete Fourier transform. The processing performed by the DFT module generates two 2N-point vectors $\{a(k)\}$, where $k=0, \ldots, 2N$. One of the vectors is composed of 2N real values corresponding to the real part of the DFT and is output from the port REAL. The other of the vectors is composed of 2N real values corresponding to the imaginary part of the DFT and is output from the port IMAG. The vector output by the port REAL is fed to the processing structures 609 and 619.

The processing structure 609 is composed of a serial arrangement of the selector 601, the diagonalizing module 602 and the matrix multipliers 604 and 605. When the multiplying matrix generating module 41 is used to generate the multiplying matrices for the horizontal processing module and the transposed versions of the horizontal multiplying matrices are required, the transpose module 606 additionally forms part of the processing structure 609.

In the processing structure 609, the selector 601 forms an N-point vector composed of points 0 through N of the 2N-point vector received from the DFT module, and forwards the N-point vector to the diagonalizing module 602. The diagonalizing module forms an N×N matrix $V_{R,0}$ whose diagonal elements are equal to the respective points of the N-point vector received from the selector 601, and whose remaining elements are all set to zero. The matrix $V_{R,0}$ generated by the diagonalizing module 602 passes to the matrix multipliers 604 where the matrix $V_{R,0}$ is pre-multiplied by the diagonal matrix $D^{-1}$. The result of the matrix multiplication performed by the matrix multiplier 604 passes to the matrix multiplier 605 where it is post multiplied by the diagonal matrix $D^{-1}$ to generate the multiplying matrix $\tilde{V}_{R,0}$. The diagonal matrix $D^{-1}$ is the inverse matrix of the diagonal matrix D. When N=8, for example, the diagonal matrix D has the following diagonal elements:

(0.3536, 0.2549, 0.2706, 0.3007, 0.3536, 0.4500, 0.6533, 1.2814).

The diagonal matrix $D^{-1}$ is a diagonal matrix in which each diagonal element is the inverse $1/a_i$ of the corresponding diagonal element $a_i$ of the diagonal matrix D. The matrix multiplier 605 forwards the multiplying matrix $\tilde{V}_{R,0}$ to the bus 607 for forwarding to the multiplying matrix input 102 of the filter 40.

The processing structure 619 is structurally identical to the processing structure 609 and generates the multiplying matrix $\tilde{V}_{R,1}$. In the processing structure 619, the selector 611 forms an eight-point vector composed of points 1 through 8 of the 16-point vector received from the REAL output of the DFT module. The diagonalizing module 612 forms the N×N kernel matrix $V_{R,1}$ whose diagonal elements are equal to the respective points of the N-point vector received from the selector 611 and whose remaining elements are all set to zero.

The kernel matrix $V_{R,1}$ generated by the diagonalizing module 612 passes to the matrix multiplier 614 which pre-multiplies the matrix by the matrix $\tilde{D}$. The result passes to the matrix multiplier 615 where it is post-multiplied by the matrix $\tilde{D}$. The diagonal matrix $\tilde{D}$ is a diagonal matrix having the same elements as the matrix D but in reverse order. The matrix multiplier 615 forwards the multiplying matrix $\tilde{V}_{R,1}$ to the bus 607 for forwarding to the multiplying matrix input 102 of the filter.

The 2N-point vector output from the port IMAG of the DFT module 600 is fed to the two processing structures 629 and 639, both of which are similar to the processing structure 609. However, each includes an additional matrix multiplier disposed between the diagonalizing module and the matrix multiplier, so that each processing structure is composed of a serial arrangement of a selector, a diagonalizing module and three matrix multipliers.

In the processing structure 629, the selector 621 forms an eight-point vector composed of the points 0 through N−1 of the 2N-point vector received from the port IMAG of the DFT module 600. The diagonalizing module 622 is identical to the diagonalizing module 602. Located between the diagonalizing module 622 and the matrix multiplier 624 is the matrix multiplier 623 which multiplies the matrix generated by the diagonalizing module 623 by the matrix Θ to generate the kernel matrix $V_{1,0}$. The matrix Θ is an N×N matrix filled with zeroes except for the −1 diagonal, which is filled with ones. The −1 diagonal is composed of the N−1 elements immediately under the N elements of the main diagonal, i.e.:

$$\Theta = \begin{pmatrix} 0 & 0 & 0 & \cdots & 0 & 0 & 0 \\ 1 & 0 & 0 & \cdots & 0 & 0 & 0 \\ 0 & 1 & 0 & \cdots & 0 & 0 & 0 \\ \vdots & \vdots & \vdots & \cdots & \vdots & \vdots & \vdots \\ 0 & 0 & 0 & \cdots & 0 & 0 & 0 \\ 0 & 0 & 0 & \cdots & 1 & 0 & 0 \\ 0 & 0 & 0 & \cdots & 0 & 1 & 0 \end{pmatrix}$$

Finally, the matrix multipliers 624 and 625 respectively pre- multiply the kernel matrix $V_{I,0}$ generated by the matrix multiplier 623 by the diagonal matrix $D^{-1}$ and post-multiply the result by the diagonal matrix $\tilde{D}$ to generate the multiplying matrix $\tilde{V}_{I,0}$.

In the processing structure 639, the selector 631 forms an eight-point vector composed of the points 1 through N of the 2N-point vector received from the port IMAG of the DFT module 600. The diagonalizing module 632 is identical to the diagonalizing module 602. The matrix multiplier 633 multiplies the matrix generated by the diagonalizing module 632 by the matrix $\Theta^t$, the transpose of the matrix $\Theta$, to generate the kernel matrix $V_{I,1}$. Finally, the matrix multipliers 634 and 635 respectively pre-multiply the kernel matrix $V_{I,1}$, generated by the matrix multiplier 633 by the diagonal matrix $\tilde{D}$ and post-multiply the result by the diagonal matrix $D^{-1}$ to generate the multiplying matrix $\tilde{V}_{I,1}$.

The above-described processing structure is then re-used to generate the multiplying matrices for the horizontal processing module from a 2N-point vector defining the characteristics of the filter in the horizontal direction. When the horizontal processing module requires transposed versions of the multiplying matrices, the transpose modules 606, 616, 626 and 636 are added to the processing paths 609, 619, 629 and 639, respectively. The multiplying matrix generated by the final matrix multiplier in each processing path, e.g., the final matrix multiplier 605 in processing path 609, passes from the final matrix multiplier to the respective transpose module, where it is transposed. In this case, the transpose module places the multiplying matrix on the bus 607 in lieu of the multiplying matrix generated by the final matrix multiplier.

Figure 11:
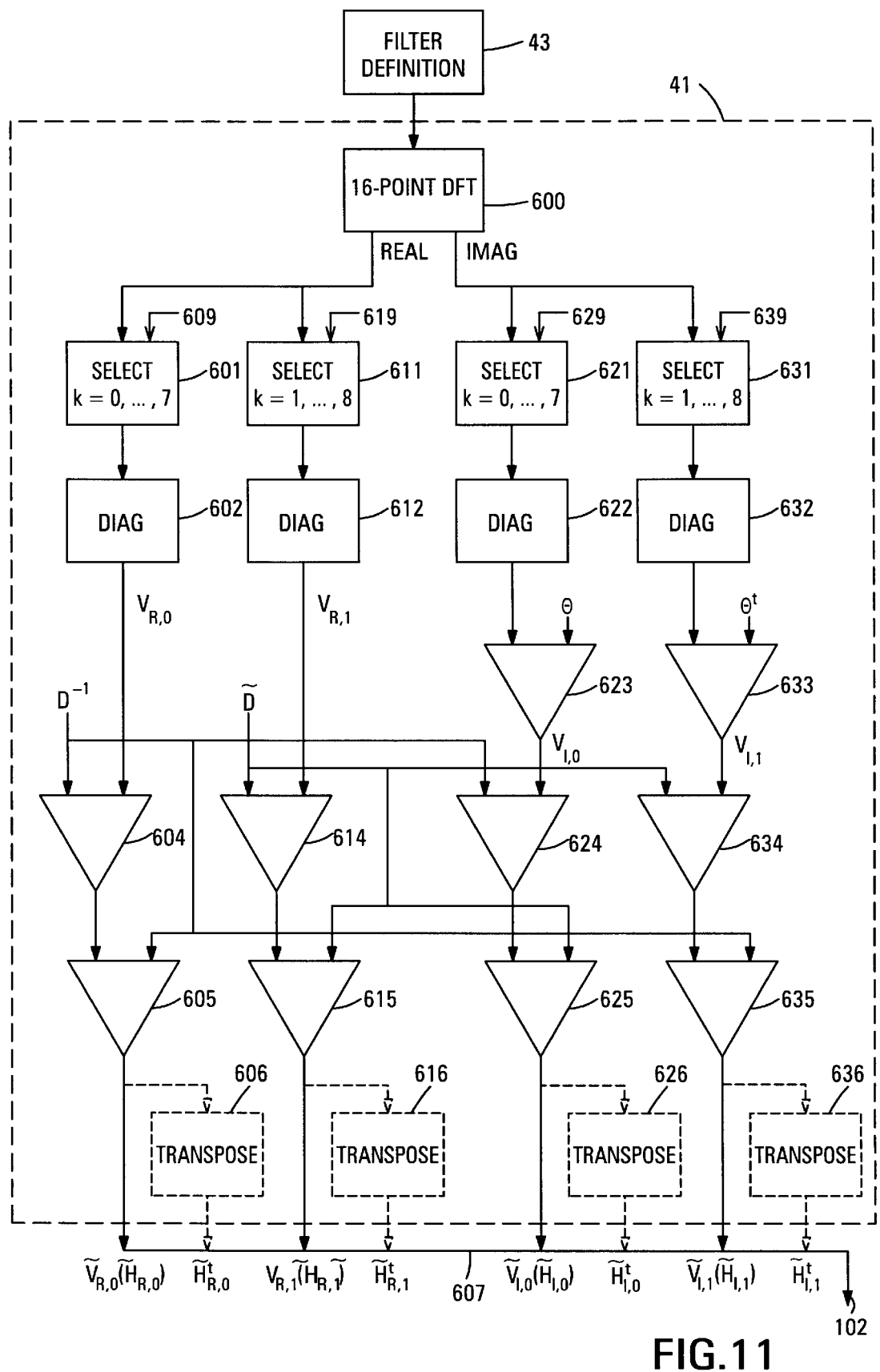
FIG. 11 is a block diagram showing an example of an embodiment of a multiplying matrix generating module according to the invention.

When the embodiment of the filter 40 is the embodiment 100 shown in FIG. 5, the processing structure shown in FIG. 11 is used twice to generate the eight multiplying matrices for the vertical processing module 101 and twice to generate the eight multiplying matrices for the horizontal processing module 103. The processing structure is used as just described above to generate the multiplying matrices $V_{R,0}{}^+$, $V_{R,1}{}^+$, $V_{I,0}{}^+$ and $V_{I,1}{}^+$ from the above-described vertical filter kernel for the + superscript multiplying matrices. To generate the multiplying matrices $V_{R,0}{}^-$, $V_{R,1}{}^-$, $V_{I,0}{}^-$ and $V_{I,1}{}^-$, the processing structure is re-used with the vertical filter kernel for the − superscript multiplying matrices.

To generate the multiplying matrices $\tilde{H}_{R,0}{}^+$, $\tilde{H}_{R,1}{}^+$, $(\tilde{H}_{I,0}{}^+)^t$ and $(\tilde{H}_{I,1}{}^+)^t$ for the horizontal processing module, the processing structure is re-used as just described with the horizontal filter kernel for the + superscript multiplying matrices. In addition, the transpose modules 626 and 636, respectively, are used to transpose the multiplying matrices $\tilde{H}_{I,0}{}^+$ and $\tilde{H}_{I,1}{}^+$ generated in the processing paths 629 and 639. To generate the multiplying matrices $\tilde{H}_{R,0}{}^-$, $\tilde{H}_{R,1}{}^-$, $(\tilde{H}_{I,0}{}^-)^t$ and $(\tilde{H}_{I,1}{}^-)^t$ for the horizontal processing module, the processing structure is re-used as just described with the horizontal filter kernel for the − superscript multiplying matrices. In addition, the transpose modules 626 and 636, respectively, are used to transpose the multiplying matrices $\tilde{H}_{I,0}{}^-$ and $\tilde{H}_{I,1}{}^-$ generated in the processing paths 629 and 639.

In a preferred embodiment, the explicit DST-based filter 40 that operates in the embodiment of the image/video filter shown in FIG. 3 is implemented in a computer using a PA-RISC reduced instruction set microprocessor made by the Hewlett-Packard Company. The computational complexity required to implement the filter 40 using such a computer will now be described in terms of the number of additions and the number of multiplications required. On average, each multiplication performed using the PA-RISC processor is equivalent to performing three additions. However, multiplications and divisions by powers of two are not counted as multiplications since such multiplications and divisions can be accomplished by left shifts or right shifts, respectively, equal in number to the power of two that is the multiplier or the divisor. In this case, the number of operations counted is the number of left or right shifts performed.

Two alternatives will be considered. In the first alternative, at least one of the nine input blocks $\tilde{X}_i{}^c$, $i \in \{SE, S, SW, E, 0, W, NE, N, NW\}$ that are subject to the filtering operation performed by the implicit DST-based filter 40 to generate the output block $Y^c$ is not "sparse." In the second alternative, all of the nine input blocks are sparse. A block of DCT coefficients is defined in this disclosure as being "sparse" if its non-zero coefficients are confined to its upper-left 4×4 quadrant. This corresponds to the spectrum of the spatial information represented by the block of DCT coefficients consisting of low-frequency components only. When a block of DCT coefficients is sparse, it satisfies the following equation:

$$X^c = U X^c U$$

where $$U \triangleq \text{diag}\{1, 1, 1, 1, 0, 0, 0, 0\}.$$

If all the blocks $\tilde{X}_i{}^c$, $i \in \{SE, S, SW, E, 0, W, NE, N, NW\}$ subject to processing by the explicit DST-based filter to generate the block $Y^c$ are sparse, substituting for $\tilde{X}^c$ in equations (35)–(38) set forth below causes the multiplying matrices $\tilde{V}_{R,0}$, $\tilde{V}_{R,1}$, $\tilde{V}_{I,0}$ and $\tilde{V}_{I,1}$ to be pre-multiplied by U and the multiplying matrices $\tilde{H}_{R,0}$, $\tilde{H}_{R,1}$, $\tilde{H}_{I,0}$ and $\tilde{H}_{I,1}$ to be post-multiplied by U. The effect of this is that the latter four columns of the V matrices and the latter four rows of the H matrices are all filled with zeros. This reduces the number of multiplication operations involved in each matrix multiplication operation since the matrix multiplication operation involves multiplication by only the first four rows and the first four columns of the multiplying matrices when all the blocks are sparse. Information on whether the current input block and the neighboring blocks of DCT coefficients are sparse is included as run-length information in the compressed picture signal and can therefore be obtained from the decoder module 38.

The number of PA-RISC operations required by the different embodiments of the filter 40 described herein to process each block $\tilde{X}^c$ of DCT coefficients is indicated in Table 6 according to the type of kernel defining the filter. The kernel definitions are general (Gen, FIG. 5), Symmetric (Symm, FIGS. 7 and 8), Causal (FIGS. 9 and 10) and Causal-Symmetric (CS). Also shown are the computational resources required by the conventional approach, in which the blocks of DCT coefficients are inversely transformed to the spatial domain, filtered in the spatial domain and transformed back to the DCT domain. Comparative figures are given for different sizes of the kernel defining the filter characteristics. In this, for non-causal filters (general and symmetric), a "small" spatial filter is a 3×3 filter, a "medium" filter is a 9×9 filter and a "large" filter is a 17×17 filter. For causal filters (causal and causal-symmetric), a "small" spatial filter is a 3×3 filter, a "medium" filter is a 5×5 filter and a "large" filter is a 9×9 filter. In addition, figures are given for the pipeline approach disclosed by Lee and Lee and the butterfly approach disclosed by Merhav and Bhaskharan.

TABLE 6

| Filter type | Non-sparse | | | | Sparse | | | |
|---|---|---|---|---|---|---|---|---|
| | Gen | Symm | Causal | CS | Gen | Symm | Causal | CS |
| Explicit DST | 6336 | 4192 | 3936 | 2816 | 3664 | 2468 | 2324 | 1576 |
| Spatial, small | 2816 | 2432 | 2816 | 2432 | 2816 | 2432 | 2816 | 2432 |
| Spatial, med | 5888 | 4352 | 3840 | 3072 | 5888 | 4352 | 3840 | 3072 |
| Spatial, large | 9600 | 6912 | 5888 | 4352 | 9600 | 6912 | 5888 | 4352 |
| pipeline | 12160 | 10112 | 8064 | 6528 | 4544 | 3776 | 3008 | 2432 |
| butterfly | | 4992 | | | | 1824 | | |

It can be seen that the explicit DST-based filter according to the invention is considerably more efficient when the filter characteristics are defined by a causal-symmetric filter (CS) than when the filter characteristics are defined by a noncausal-symmetric kernel. However, causal-symmetric kernels are rarely encountered in picture processing applications. Nevertheless, the efficiency advantages of the causal-symmetric kernel can be obtained by using a causal-symmetric kernel derived from a given noncausal-symmetric kernel by applying a 4-pixel shift, in each dimension, to the spatial coefficients of a noncausal-symmetric kernel. This requires that the filter kernel be no longer than nine taps in each dimension. Converting a noncausal-symmetric kernel to a causal-symmetric kernel results in a 4-pixel shift in the filtered picture relative to the original picture. However, such a shift is acceptable in many applications, especially those involving human visualization. Alternatively, the shift can be compensated for in subsequent processing.

In the above description, it has been assumed that the picture signal subject to filtering by the explicit DST-based filter according to the invention is already in the compressed state. However, this is not critical. The picture signal subject to filtering may be a conventional spatial-domain signal. In this case, the explicit DST-based filter according to the invention is preceded by a suitable compression module and is followed by a complementary expansion module. Suitable compression modules and expansion modules are known in the art and will not be described here.

The filters according to the invention have been described with respect to examples in which the filter kernel is separable into vertical and horizontal components. The embodiments shown can readily be adapted to operate with two-dimensional filter kernels that are non-separable. In addition, the embodiments shown can readily be adapted to operated with three-dimensional filter kernels.

Figure 12A:
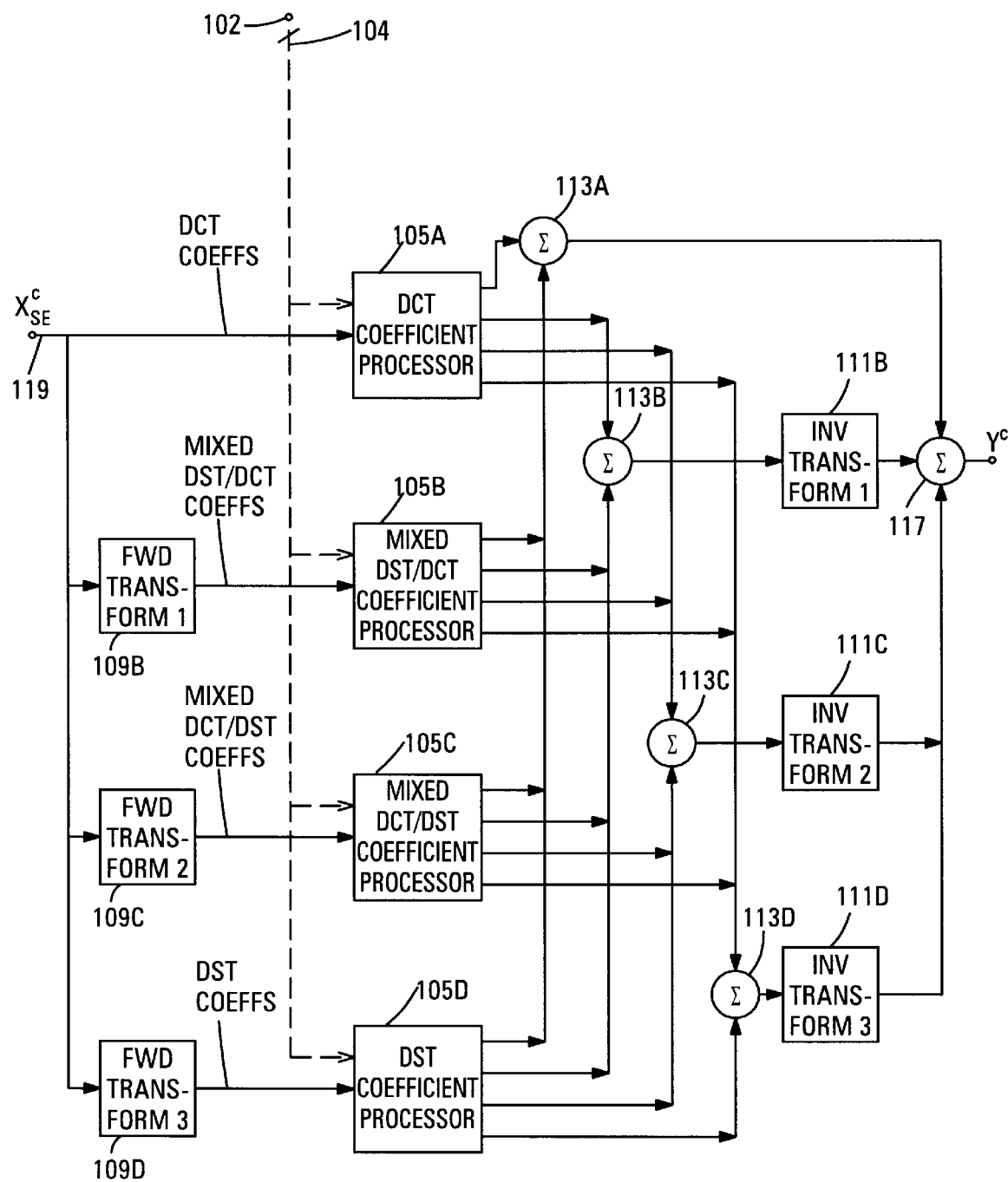
FIG. 12A is a block diagram of an embodiment of a two-dimensional explicit DST-based filter according to the invention in which the filter characteristics are defined by a non-separable kernel.
Figure 12B:
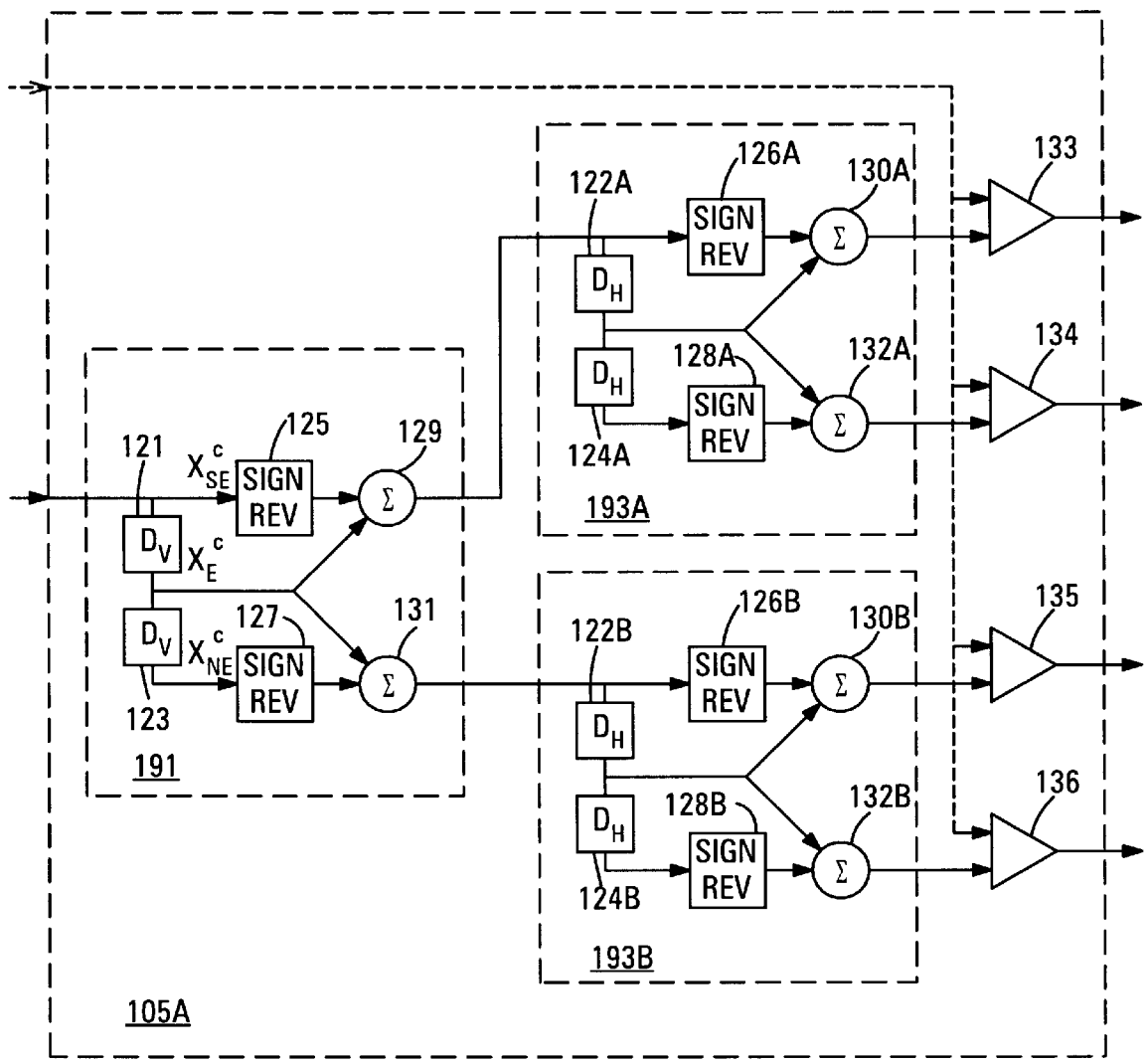
FIG. 12B is a block diagram of the transform coefficient processing modules of the embodiment of the two-dimensional explicit DST-based filter according to the invention shown in FIG. 12A.

An example of an embodiment adapted to operate with two-dimensional filter kernels that are non-separable is shown in FIGS. 12A and 12B. Turning first to FIG. 12A, the block $X_{SE}^c$ of DCT coefficients corresponding to the current block $\tilde{X}^c$ of DCT coefficients of the picture signal is received via the input 119 and is distributed to the DCT coefficient processing module 105A, and the forward transform modules 109B, 109C and 109D. The forward transform modules 109B, 109C and 109D subject the block $X_{SE}^c$ of DCT coefficients to a trigonometric transform to generate a corresponding block $X_{SE}^{sc}$ of mixed DST/DCT coefficients, a corresponding block $X_{SE}^{cs}$ of mixed DCT/DST coefficients, and a corresponding block $X_{SE}^s$ of DST coefficients, respectively. These blocks of transform coefficients are respectively fed to the mixed DST/DCT processing module 105B, the mixed DCT/DST processing module 105C, and the DST processing module 105D. In each of these modules, the blocks of transform coefficients are subject to butterflying operations and element-by-element multiplication in which they are multiplied by diagonal matrices. Each processing module generates an output composed a block of four types of transform coefficients, i.e., a block of DCT coefficients, a block of mixed DST/DCT coefficients, a block of mixed DCT/DST coefficients and a block of DST coefficients.

A first summing arrangement, composed of the summing modules 113A, 113B, 113C and 113D, each of which sums transform coefficients of a different type, sums the transform coefficients generated by the processing modules 105A, 105B, 105C and 105D. The block of mixed DST/DCT coefficients generated by the summing module 113B is fed to the inverse transform module 111B. The inverse transform module 113B subjects the block of mixed DST/DCT coefficients to a trigonometric transform that is the inverse of the trigonometric transform performed by the forward transform module 109B to generate a corresponding block of DCT coefficients. The inverse transform modules 111C and 111D apply corresponding inverse transforms to the blocks of mixed DCT/DCT coefficients and DST coefficients output by the processing modules 105C and 105D, respectively, to generate corresponding blocks of DCT coefficients.

The second summing arrangement, composed of the summing module 117, sums the blocks of DCT coefficients output by the summing module 1 13A and by the inverse transform modules 111B, 111C and 111D to generate the output block $Y^c$ of DCT coefficients.

FIG. 12B shows the structure of the DCT coefficient processing module 105A. The transform coefficient processing modules 105B, 105C and 105D have the same structure and so will not be described. Elements that correspond to the embodiment shown in FIG. 5 are indicated by the same numerical part of the reference numeral and will not be described in detail.

The block $X_{SE}^c$ of DCT coefficients corresponding to the current block $\tilde{X}^c$ of DCT coefficients is received by the vertical butterflying module 191. The structure of the vertical butterflying module is identical to the butterflying portion of the DCT coefficient processor 105 shown in FIG. 5. The sign-reversing modules 125 and 127 subject the blocks $X_{SE}^c$ and $X_{SE}^N$ of DCT coefficients to an even-row sign reversing operation, as described above with reference to FIG. 5.

The two blocks of DCT coefficients corresponding to the block $X_{SE}{}^c$ of DCT coefficients generated by the vertical butterflying module 191 each pass to a different one of the horizontal butterflying modules 193A and 193B. These modules have identical structures that are identical to that of the butterflying portion of the DCT coefficient processor 106 shown in FIG. 5. The sign-reversing modules 130A, 130B, 132A and 132B subject the blocks of DCT coefficients received by the horizontal butterflying modules to an even-column sign reversing operation, as described above with reference to FIG. 5.

The four blocks of DCT coefficients corresponding to the block $X_{SE}{}^c$ of DCT coefficients generated by the horizontal butterflying modules 193A and 193B each pass to a different one of the four matrix multipliers 133–136. Each matrix multiplier multiplies the respective block of DCT coefficients by a different diagonal matrix derived from the filter kernel to generate a respective one of the four outputs of the DCT coefficient processing module 101A.

The mathematical operations on which the processing performed by the embodiments of the explicit DST-based filter shown in FIGS. 5, 7, 8, 9, 10, 12A and 12B is based will now be described.

The 8-point one-dimensional type II discrete cosine transform transforms the vector $\{x(n)\}_{n=0}^{7}$ in the spatial domain to a vector of spectral components $\{X^c(k)\}_{k=0}^{7}$ in the frequency domain according to the equation:

$$X^c(k) = \frac{\gamma(k)}{2} \sum_{n=0}^{7} x(n) \cos\left(\frac{2n+1}{16} \cdot k\pi\right) \quad (1)$$

where $\gamma(0)=1/\sqrt{2}$ and $\gamma(k)=1$ otherwise.

The inverse transform is given by:

$$x(n) = \sum_{k=0}^{6} \frac{\gamma(k)}{2} X^c(k) \cos\left(\frac{2n+1}{16} \cdot k\pi\right) \quad (2)$$

To rewrite the above in matrix form, define the column vectors $x = \{x(n)\}_{n=0}^{7}$ and $X^c = \{X^c(k)\}_{k=0}^{7}$ and define the 8-point DCT-II matrix
$C = \{c(k, n)\}_{k,n=0}^{7}$, where:

$$c(k, n) = \frac{\gamma(k)}{2} \cos\left(\frac{2n+1}{16} \cdot k\pi\right) \quad (3)$$

Then:

$$X^c = Cx \quad (4)$$

and, similarly:

$$x = C^{-1}X^c = C^t X^c \quad (5)$$

where the superscript t denotes matrix transposition. The second equality follows from the unitarily of C.

Similar to the DCT, the eight-point, one-dimensional, type-II discrete sine transform (DST) can be represented in the following matricial form:

$$X^s = Sx \quad (6)$$

where $S = \{(s(k,n)\}_{k,n=1}^{8}$ is the eight-point DST-II matrix defined by:

$$s(k, n) = \frac{\sigma(k)}{2} \sin\left(\frac{2n-1}{16} \cdot k\pi\right) \quad (7)$$

where $\sigma(8)=1/\sqrt{2}$ and $\sigma(k)=1$ otherwise.

The transpose of S is $S^t$.

Different 8×8 two-dimensional transforms of the 8×8, two-dimensional block $$x \triangleq \{(x(n, m)\}_{n,m}^{8}$$

can be obtained by pre-multiplying and post-multiplying the block x by the above DCT and DST matrices as follows:

$$X^c \triangleq CxC^t \quad (8)$$

$$X^{sc} \triangleq SxC^t \quad (9)$$

$$X^{cs} \triangleq CxS^t \quad (10)$$

$$X^s \triangleq SxS^t \quad (11)$$

Equations (8) and (11) correspond to the two-dimensional DCT and the two-dimensional DST, respectively. The transforms represented by equations (9) and (10) are mixed DST/DCT and DCT/DST transforms, respectively.

A picture signal that has been compressed according to the JPEG or MPEG standard includes two-dimensional 8×8 blocks of DCT coefficients. In other words, the picture signal includes a sequence of 8×8 matrices $X_1{}^c$, $X_2{}^c$, . . . of DCT coefficients corresponding to the 8×8 blocks $x_1$, $x_2$, . . . of pixel values in the spatial domain that constitute the original, non-compressed picture signal I(i, j). The explicit DST-based filter according to the invention generates a sequence of 8×8 matrices $Y_1{}^c$, $Y_2{}^c$, . . . of DCT coefficients corresponding to the 8×8 blocks $y_1$, $y_2$, . . . of pixel values in the spatial domain that constitute the filtered version J(i, j) of the original, non-compressed picture signal I(i, j) according to:

$$J(i, j) = \sum_{i'} \sum_{j'} f(i', j') I(i - i', j - j') \quad (12)$$

in which $\{f(i, j)\}$ is the kernel defining the impulse response of the filter, i and j are integers taking on values in ranges that correspond to the size of the picture, and the range of summation over i' and j' is according to the support of the kernel $\{f(i, j)\}$.

In the examples described in this disclosure, the filter kernel $\{f(i, j)\}$ is separable so that it can be factorized as follows:

$$f(i, j) = v_i h_j \quad (13)$$

for some one-dimensional sequences $\{v_i\}$ and $\{h_j\}$.

The supports of $\{v_i\}$ and $\{h_j\}$ are $M^- \leq i \leq M^+$ and $N^- \leq i \leq N^+$, respectively, so that f(i, j)=0 outside a $(M^+ - M^- + 1)$ by $(N^+ - N^- + 1)$ rectangle.

Incorporating the separability definition into equation (12) gives:

$$J(i, j) = \sum_{i'=M^-}^{M^+} v_{i'} \sum_{j'=N^-}^{N^+} h_{j'} I(i - i', j - j') \quad (14)$$

Thus, a one-dimensional convolution can be performed on each row using the vertical filter component $\{v_i\}$, and then another one-dimensional convolution can be performed using the horizontal filter component $\{h_j\}$. The order in which the convolutions are performed can be reversed without changing the result.

$$y = V \cdot \begin{pmatrix} x_{NW} & x_N & x_{NE} \\ x_W & x & x_E \\ x_{SW} & x_S & x_{SE} \end{pmatrix} \cdot H^t \quad (15)$$

where H and V are 8×24 matrices of the form:

$$V = \begin{pmatrix} v_8 & v_7 & \ldots & v_1 & v_0 & v_{-1} & \ldots & v_{-7} & v_{-8} & 0 & \ldots & 0 \\ 0 & v_8 & v_7 & \ldots & v_1 & v_0 & v_{-1} & \ldots & v_{-7} & v_{-8} & 0 & \ldots & 0 \\ \vdots & & & & & & & & & & & \\ 0 & \ldots & 0 & v_8 & v_7 & \ldots & v_1 & v_0 & v_{-1} & \ldots & v_{-7} & v_{-8} \end{pmatrix} \quad (16)$$

$$H = \begin{pmatrix} h_8 & h_7 & \ldots & h_1 & h_0 & h_{-1} & \ldots & h_{-7} & h_{-8} & 0 & \ldots & 0 \\ 0 & h_8 & h_7 & \ldots & h_1 & h_0 & h_{-1} & \ldots & h_{-7} & h_{-8} & 0 & \ldots & 0 \\ \vdots & & & & & & & & & & & \\ 0 & \ldots & 0 & h_8 & h_7 & \ldots & h_1 & h_0 & h_{-1} & \ldots & h_{-7} & h_{-8} \end{pmatrix} \quad (17)$$

The filter kernel is said to be symmetric when $v_i = v_{-i}$ and $h_j = h_{-j}$ for all values of i and j. The filter kernel is said to be causal when $v_{-i} = 0$ and $h_{-j} = 0$ for all positive values of i and j.

The explicit DST-based filter according to the invention performs the above filtering operation on the compressed picture signal $X_1^c, X_2^c, \ldots$ directly without requiring that the compressed picture signal be expanded back to the spatial domain, that convolution be performed in the spatial domain, and that the filtered picture signal be re-compressed.

When the blocks of DCT coefficients constituting the compressed picture signal are 8×8 blocks, the implicit DST-based filter according to the invention operates with a filter size that is always smaller than 17×17 so that every block $Y^c$ of DCT coefficients, corresponding to the block y in the spatial domain, constituting the filtered picture signal $\{J(i, j)\}$ depends at most only on the corresponding current block $X^c$ of DCT coefficients, corresponding to the current block x of the original, uncompressed picture signal, and the eight neighboring blocks of DCT coefficients immediately surrounding the current block $X^c$, as shown in FIG. 4. These blocks of DCT coefficients are labelled according to their compass-wise direction relative to the current block $X^c$, also as shown in FIG. 4. For example, the block of the previous slice in the same position as the current block in the current slice is to the north of the current block, so is labelled with the subscript N, i.e., $X_N^c$. A similar convention is used to label the blocks x in the spatial domain. Thus, the block in the spatial domain corresponding to the block $X_N^c$ of DCT coefficients is labelled $x_N$. The explicit DST-based filter according to the invention filters the compressed picture signal by successively generating a block $Y^c$ of DCT coefficients by processing the DCT coefficients in the current block $X^c$ and, in some of the embodiments, in the neighboring blocks $X_N^c, X_{NE}^c, X_E^c, X_{SE}^c, X_S^c, X_{SW}^c, X_W^c$ and $X_{NW}^c$, and, in the remaining embodiments, in the neighboring blocks $X_N^c, X_W^c$ and $X_{NW}^c$.

The equivalent in the spatial domain of the filtering operation performed by the explicit DST-based filter according to the invention can be expressed in the following block matrix form:

The filters generate the block $Y_{\_}^c$ of DCT coefficients from the blocks $X^c$ and the eight surrounding blocks of DCT coefficients.

The explicit DST-based filters according to the invention are based on the convolution multiplication properties (CMPs) of discrete trigonometrical transforms disclosed by S. A. Martucci in the above-mentioned Symmetric Convolution and the Discrete Sine and Cosine Transforms, 42 IEEE TRANS. SIG. PROC. 1038–1051 (1994 May). Martucci's CMPs relate to symmetric convolution, and require appropriate zero padding in the convolution domain to provide a linear convolution. The inventors have modified Martucci's CMPs to provide linear convolution without requiring zero padding. Martucci's CMPs relate to the eight types of DCTs and eight types of DSTs known in the literature. These types of DCTs and DSTs are indexed by a number in the range of 1 to 4 together with the letter "e," indicating "even" or "o," indicating "odd." For example, the type of DCT used in the JPEG and MPEG signal compression standards, and that is used to generate the blocks of DCT coefficients filtered by the filters described in this disclosure, is a DCT of type 2e. Additionally, the DST used in the filters described in this disclosure is a DST of type 2e. The sixteen DCTs and DSTs are called discrete trigonometrical transforms. The CMPs described by Martucci relate to all the different types of symmetric convolutions between signals instead of relating to cyclic or circular convolution, or to linear convolution, which is the form of convolution desired here.

Each of Martucci's CMPs indicates that a certain type of symmetric convolution operation can be performed between two signals by transforming each signal by a certain trigonometric transform, performing an element-by-element multiplication of the transformed elements, and performing an inverse transformation of the coefficients resulting from the element-by-element multiplication using a certain inverse trigonometric transform. This can be expressed mathematically as follows:

$$x(n) *_{sc} g(n) = T_c^{-1}\{T_a\{x(n)\} \times T_b\{g(n)\}\} \quad (18)$$

where x(n) and g(n) are the two signals, $*_{sc}$ denotes a symmetric-convolution operation, $T_a$ and $T_b$ are two trigonometric functions $T_c^{-1}$ is an inverse trigonometric function, and×denotes element-by-element multiplication. Equation (18) holds up to a delay term $n_0$, which in null for most of the CMPs, including those on which the filters disclosed herein are based.

Equation (18) can be rewritten in matrix format as follows:

$$A_g x = \overline{T}_c^{-1} \operatorname{diag}(\overline{T}_b g) \overline{T}_a x \quad (19)$$

where $A_g$ is an operator matrix that performs the symmetric convolution operation by the signal g, diag(·) denotes the diagonal operator that produces a diagonal matrix with the main diagonal filled with the elements of the input vector, $\overline{T}_a$, $\overline{T}_b$, $\overline{T}_c^{-1}$ and are operator matrices that perform the trigonometric transforms $T_a$, $T_b$ and $T_c^{-1}$, respectively.

Since equation (19) must hold for any value of x, x can be removed from both sides of the equation.

The explicit DST-based filters disclosed herein are based on the specific CMPs set forth in lines 4–7 of table VI of Martucci's paper.

Martucci's four CMPs are rewritten in matrix form as follows. An arbitrary vector of real numbers is represented by $\{g_i\}$, i=0, 1, . . . , 8, and the 16-point DFT of the zero-padded extension $(g_0, \ldots, g_g, 0, \ldots, 0)$ of $\{g_i\}$ is represented by $\{G_R(k)+j \cdot G_I(k)\}$, k=0, 1, . . . , 15. The matrices $G_1$, $G_2$, $\Phi$ and $\Theta$ are defined as follows:

$$G_1 \triangleq \begin{pmatrix} g_8 & g_7 & g_6 & g_5 & g_4 & g_3 & g_2 & g_1 \\ 0 & g_8 & g_7 & g_6 & g_5 & g_4 & g_3 & g_2 \\ 0 & 0 & g_8 & g_7 & g_6 & g_5 & g_4 & g_3 \\ 0 & 0 & 0 & g_8 & g_7 & g_6 & g_5 & g_4 \\ 0 & 0 & 0 & 0 & g_8 & g_7 & g_6 & g_5 \\ 0 & 0 & 0 & 0 & 0 & g_8 & g_7 & g_6 \\ 0 & 0 & 0 & 0 & 0 & 0 & g_8 & g_7 \\ 0 & 0 & 0 & 0 & 0 & 0 & 0 & g_8 \end{pmatrix}, \quad (20)$$

$$\Phi \triangleq \begin{pmatrix} 0 & 0 & 0 & 0 & 0 & 0 & 0 & 1 \\ 0 & 0 & 0 & 0 & 0 & 0 & 1 & 0 \\ 0 & 0 & 0 & 0 & 0 & 1 & 0 & 0 \\ 0 & 0 & 0 & 0 & 1 & 0 & 0 & 0 \\ 0 & 0 & 0 & 0 & 0 & 0 & 0 & 0 \\ 0 & 0 & 1 & 0 & 0 & 0 & 0 & 0 \\ 0 & 1 & 0 & 0 & 0 & 0 & 0 & 0 \\ 1 & 0 & 0 & 0 & 0 & 0 & 0 & 0 \end{pmatrix}$$

$$G_2 \triangleq \begin{pmatrix} g_0 & 0 & 0 & 0 & 0 & 0 & 0 & 0 \\ g_1 & g_0 & 0 & 0 & 0 & 0 & 0 & 0 \\ g_2 & g_1 & g_0 & 0 & 0 & 0 & 0 & 0 \\ g_3 & g_2 & g_1 & g_0 & 0 & 0 & 0 & 0 \\ g_4 & g_3 & g_2 & g_1 & g_0 & 0 & 0 & 0 \\ g_5 & g_4 & g_3 & g_2 & g_1 & g_0 & 0 & 0 \\ g_6 & g_5 & g_4 & g_3 & g_2 & g_1 & g_0 & 0 \\ g_7 & g_6 & g_5 & g_4 & g_3 & g_2 & g_1 & g_0 \end{pmatrix},$$

$$\Theta \triangleq \begin{pmatrix} 0 & 0 & 0 & 0 & 0 & 0 & 0 & 0 \\ 1 & 0 & 0 & 0 & 0 & 0 & 0 & 0 \\ 0 & 1 & 0 & 0 & 0 & 0 & 0 & 0 \\ 0 & 0 & 1 & 0 & 0 & 0 & 0 & 0 \\ 0 & 0 & 0 & 1 & 0 & 0 & 0 & 0 \\ 0 & 0 & 0 & 0 & 1 & 0 & 0 & 0 \\ 0 & 0 & 0 & 0 & 0 & 1 & 0 & 0 \\ 0 & 0 & 0 & 0 & 0 & 0 & 1 & 0 \end{pmatrix}$$

Using the above definitions, the four CMPs can be rewritten in matrix form as follows:

$$\frac{G_2 + G_2^t}{2} + \frac{G_1 + G_1^t}{2} \Phi = C^t \cdot \operatorname{diag}\{G_R(0), \ldots, G_R(7)\} \cdot C \quad (21)$$

$$\frac{G_2 + G_2^t}{2} - \frac{G_1 + G_1^t}{2} \Phi = S^t \cdot \operatorname{diag}\{G_R(1), \ldots, G_R(8)\} \cdot S \quad (22)$$

$$\frac{G_2 - G_2^t}{2} - \frac{G_1 - G_1^t}{2} \Phi = C^t \cdot \operatorname{diag}\{G_I(0), \ldots, G_I(7)\} \cdot \Theta \cdot S \quad (23)$$

$$\frac{G_2 - G_2^t}{2} + \frac{G_1 - G_1^t}{2} \Phi = -S^t \cdot \operatorname{diag}\{G_I(1), \ldots, G_I(8)\} \cdot \Theta^t \cdot C \quad (24)$$

Comparing equations (21)–(24) with the general form given in equation (19) shows that the right sides of equations (21)–(24) correspond to symmetric convolution matrices decomposed into triangular matrices. The forward transforms $T_a$ and the inverse transforms $T_c^{-1}$ are all DCTs or DSTs of type 2e, represented by the matrices C and S, respectively. The forward transforms $T_b$ are DCTs and DSTs of type 1e, which are equivalent to the real and imaginary parts, respectively, of the DFT of the zero-padded input vector. The matrix $\Theta$ compensates for the intrinsic one-element delay cause by the DST of type 1e.

The diagonal vector $\Phi$ is defined as follows:

$$\Phi \triangleq C\Phi C^t = S\Phi S^t = \operatorname{diag}\{(-1)^k\}_{k=0}^{7} \quad (25)$$

Combining equations (21)–(24) and using the relations $C\Phi = \Phi C$ and $S\Phi = \Phi S$ gives the followin expresions for $G_1$ and $G_2$:

$$G_2 = \frac{1}{2}(C^t \cdot \operatorname{diag}\{G_R(0), \ldots, G_R(7)\} \cdot C + \quad (26)$$
$$S^t \cdot \operatorname{diag}\{G_R(1), \ldots, G_R(8)\} \cdot S +$$
$$C^t \cdot \operatorname{diag}\{G_I(0), \ldots, G_I(7)\} \Theta \cdot S -$$
$$S^t \cdot \operatorname{diag}\{G_I(1), \ldots, G_I(8)\} \Theta^t \cdot C)$$

$$G_1 = \frac{1}{2}(C^t \cdot \operatorname{diag}\{G_R(0), \ldots, G_R(7)\} \Phi \cdot C - \quad (27)$$
$$S^t \cdot \operatorname{diag}\{G_R(1), \ldots, G_R(8)\} \Phi \cdot S -$$
$$C^t \cdot \operatorname{diag}\{G_I(0), \ldots, G_I(7)\} \Theta \Phi \cdot S -$$
$$S^t \cdot \operatorname{diag}\{G_I(1), \ldots, G_I(8)\} \Theta^t \Phi \cdot C)$$

The kernel matrix that defines the filter is then decomposed into triangular matrices. First, the matrix V, defined in equation (16), is rewritten in the form $[V_1^+, V_2^+ + V_2^-, V_1^-]$, where $V_1^+$, $V_2^+$, $V_2^-$ and $V_1^-$ are defined as follows:

$$V_1^+ = \begin{pmatrix} v_8 & v_7 & v_6 & v_5 & v_4 & v_3 & v_2 & v_1 \\ 0 & v_8 & v_7 & v_6 & v_5 & v_4 & v_3 & v_2 \\ 0 & 0 & v_8 & v_7 & v_6 & v_5 & v_4 & v_3 \\ 0 & 0 & 0 & v_8 & v_7 & v_6 & v_5 & v_4 \\ 0 & 0 & 0 & 0 & v_8 & v_7 & v_6 & v_5 \\ 0 & 0 & 0 & 0 & 0 & v_8 & v_7 & v_6 \\ 0 & 0 & 0 & 0 & 0 & 0 & v_8 & v_7 \\ 0 & 0 & 0 & 0 & 0 & 0 & 0 & v_8 \end{pmatrix} \quad (28)$$

-continued $$V_2^+ = \begin{pmatrix} \alpha \cdot v_0 & 0 & 0 & 0 & 0 & 0 & 0 & 0 \\ v_1 & \alpha \cdot v_0 & 0 & 0 & 0 & 0 & 0 & 0 \\ v_2 & v_1 & \alpha \cdot v_0 & 0 & 0 & 0 & 0 & 0 \\ v_3 & v_2 & v_1 & \alpha \cdot v_0 & 0 & 0 & 0 & 0 \\ v_4 & v_3 & v_2 & v_1 & \alpha \cdot v_0 & 0 & 0 & 0 \\ v_5 & v_4 & v_3 & v_2 & v_1 & \alpha \cdot v_0 & 0 & 0 \\ v_6 & v_5 & v_4 & v_3 & v_2 & v_1 & \alpha \cdot v_0 & 0 \\ v_7 & v_6 & v_5 & v_4 & v_3 & v_2 & v_1 & \alpha \cdot v_0 \end{pmatrix} \quad (29)$$

$$V_2^- = \begin{pmatrix} \beta \cdot v_8 & v_{-2} & v_{-2} & v_{-3} & v_{-4} & v_{-5} & v_{-6} & v_{-7} \\ 0 & \beta \cdot v_0 & v_{-1} & v_{-2} & v_{-3} & v_{-4} & v_{-5} & v_{-6} \\ 0 & 0 & \beta \cdot v_0 & v_{-1} & v_{-2} & v_{-3} & v_{-4} & v_{-5} \\ 0 & 0 & 0 & \beta \cdot v_0 & v_{-1} & v_{-2} & v_{-3} & v_{-4} \\ 0 & 0 & 0 & 0 & \beta \cdot v_0 & v_{-1} & v_{-2} & v_{-3} \\ 0 & 0 & 0 & 0 & 0 & \beta \cdot v_0 & v_{-1} & v_{-6} \\ 0 & 0 & 0 & 0 & 0 & 0 & \beta \cdot v_0 & v_{-1} \\ 0 & 0 & 0 & 0 & 0 & 0 & 0 & \beta \cdot v_0 \end{pmatrix} \quad (30)$$

$$V_1^- = \begin{pmatrix} v_{-8} & 0 & 0 & 0 & 0 & 0 & 0 & 0 \\ v_{-7} & v_{-8} & 0 & 0 & 0 & 0 & 0 & 0 \\ v_{-6} & v_{-7} & v_{-8} & 0 & 0 & 0 & 0 & 0 \\ v_{-5} & v_{-6} & v_{-7} & v_{-8} & 0 & 0 & 0 & 0 \\ v_{-4} & v_{-5} & v_{-6} & v_{-7} & v_{-8} & 0 & 0 & 0 \\ v_{-3} & v_{-4} & v_{-5} & v_{-6} & v_{-7} & v_{-8} & 0 & 0 \\ v_{-2} & v_{-3} & v_{-4} & v_{-5} & v_{-6} & v_{-7} & v_{-8} & 0 \\ v_{-1} & v_{-2} & v_{-3} & v_{-4} & v_{-5} & v_{-6} & v_{-7} & v_{-8} \end{pmatrix} \quad (31)$$

In these matrices, $\alpha$ is an arbitrary real number and $\beta \triangleq 1-\alpha$. In the embodiment of the filter with the general kernel shown in FIG. 5, the choice of $\alpha$ has no effect on computational efficiency. In other cases, the choice of $\alpha$ is important, for reasons that will be described below.

The kernel matrix H that defines the filter characteristics in the vertical direction is then similarly decomposed into the triangular matrices $H_1^+$, $H_2^+$, $H_2^-$ and $H_1^-$.

The filtering equation (15) is next rewritten in terms of the triangular matrices $V_i^r$ and $H_i^r$, $i=1, 2$; $r \in \{+,-\}$ to give:

$$y = z_W(H_1^+)^t + z\{(H_2^+)^t + (H_2^-)^t\} + z_E(H_1^-)^t \quad (32)$$

where:

$$z_W \triangleq V_1^+ x_{NW} + (V_2^+ + V_2^-)x_W + V_1^- x_{SW} \quad (33)$$

$$z \triangleq V_1^+ x_N + (V_2^+ + V_2^-)x + V_1^- x_S \quad (34)$$

$$z_E \triangleq V_1^+ x_{NE} + (V_2^+ + V_2^-)x_E + V_1^- x_{SW} \quad (35)$$

If $\{g_i\}_i^8 = 1$ is given by:

$$g_i = \begin{cases} \alpha \cdot v_0, & i=0 \\ v_i, & i=1,\ldots,8 \end{cases} \quad (36)$$

then:

$$G_1 = V_1^+ \text{ and } G_2 = V_2^+. \quad (37)$$

Similarly, if:

$$g_i = \begin{cases} \beta \cdot v_0, & i=0 \\ v_{-i}, & i=1,\ldots,8 \end{cases} \quad (38)$$

then:

$$G_1 = (V_1^-)^t \text{ and } G_2 = (V_2^-)^t. \quad (39)$$

The relationship between the horizontal triangular matrices and $G_1$ and $G_2$ is similarly generated.

The 16-point DFT of the zero-padded extension of ($\alpha \cdot v_0$, $v_1, \ldots, v_8$) is defined as:

$$\{V_R^+(k) + j \cdot V_I^+(k)\}, k=0, \ldots, 15.$$

and the 16-point DFT of the zero-padded extension of ($\beta \cdot v_0$, $v_{-1}, \ldots, v_{-8}$) is defined as:

$$\{V_R^-(k) + j \cdot V_I^-(k)\}, k=0, \ldots, 15$$

Since the elements of V are real, $V_I^+(0) = V_I^+(8) = V_I^-(0) = V_I^-(8) = 0$.

Similar definitions exist for the H-type matrices.

The triangular matrices of the filtering equation are substituted with the CMP triangular-matrix expressions to provide spatial domain filtering expressions. For example, using equations (26), (27), (37) and (39) in equation 35 gives:

$$\begin{aligned} z_E = C^t \Big[ & V_{R,0}^+(Cx_E + \Phi Cx_{NE}) + V_{I,0}^+(Sx_E + \Phi Sx_{NE}) + \\ & V_{R,0}^-(Cx_E + \Phi Cx_{SE}) - V_{I,0}^-(Sx_E - \Phi Sx_{SE}) \Big] + \\ S^t \Big[ & V_{R,1}^+(Sx_E - \Phi Sx_{NE}) - V_{I,1}^+(Cx_E + \Phi Cx_{NE}) + \\ & V_{R,1}^-(Sx_E - \Phi Sx_{SE}) + V_{I,1}^-(Cx_E + \Phi Cx_{SE}) \Big] \end{aligned} \quad (40)$$

where:

$$V_{R,0}^+ \triangleq \frac{1}{2} \cdot \text{diag}\{V_R^+(0), \ldots, V_R^+(7)\} \quad (41)$$

$$V_{R,1}^+ \triangleq \frac{1}{2} \cdot \text{diag}\{V_R^+(1), \ldots, V_R^+(8)\} \quad (42)$$

$$V_{I,0}^+ \triangleq \frac{1}{2} \cdot \text{diag}\{V_I^+(0), \ldots, V_I^+(7)\} \cdot \Theta \quad (43)$$

$$V_{I,1}^+ \triangleq \frac{1}{2} \cdot \text{diag}\{V_I^+(1), \ldots, V_I^+(8)\} \cdot \Theta^t \quad (44)$$

and corresponding quantities in which all "+" superscripts are replaced with "−" superscripts are also defined.

Equivalent expressions for z and $z_W$ are generated by substituting $x_N$, x, $x_S$ and $x_{NW}$, $x_W$, $X_{SW}$ for $x_{NE}$, $x_E$, $x_{SE}$ in equation (40).

Equations (26) and (27) and the H-matrix versions of equation (37) and (39) are then used in equation (32) to give:

$$\begin{aligned} y = \Big[ & (zC^t + z_W C^t \Phi)H_{R,0}^+ + (zS^t - z_W S^t \Phi)(H_{I,0}^+)^t + \\ & (zC^t + z_E C^t \Phi)H_{R,0}^- - (zS^t - z_E S^t \Phi)(H_{I,0}^-)^t \Big] C + \\ \Big[ & (zS^t - z_W S^t \Phi)H_{R,1}^+ - (zC^t + z_W C^t \Phi)(H_{I,1}^+)^t + \end{aligned} \quad (45)$$

-continued $$(zS^t + z_E S^t \Phi)H_{\bar{R},1}^- + (zC^t + z_E C^t \Phi)(H_{\bar{I},1}^-)^t \Big] S$$

The spatial domain expressions obtained above are then transformed into the DCT domain. This is done by pre-multiplying both sides of equation (40) by C and post multiplying both sides of equation (40) by $C^t$, and by using the distributive property of matrix multiplication to obtain:

$$Z_E^c = V_{R,0}^+(X_E^c + \Phi X_{NE}^c) + V_{I,0}^+(X_E^{sc} - \Phi X_{NE}^{sc}) + \qquad (46)$$

$$V_{R,0}^-(X_E^c + \Phi X_{SE}^c) - V_{I,0}^-(X_E^{sc} - \Phi X_{SE}^{sc}) +$$

$$T^t\Big[V_{R,1}^+(X_E^{sc} - \Phi X_{NE}^{sc}) - V_{I,1}^+(X_E^c + \Phi X_{NE}^c) +$$

$$V_{R,1}^-(X_E^{sc} - \Phi X_{SE}^{sc}) + V_{I,1}^-(X_E^c + \Phi X_{SE}^c)\Big]$$

In this, $$T \stackrel{\Delta}{=} SC^t$$

indicates the 1-D DCT-to-DST domain transform (CST) operator matrix, and $T^t$ indicates the 1-D DST-to-DCT domain transform (SCT) operator matrix.

Expressions for $Z^c$ and $Z_W^c$ are additionally obtained by substituting $X_N^c$, $X^c$, $X_S^c$ and $X_{NW}^c$, $X_W^c$, $X_{SW}^c$ for $X_{NE}^c$, $X_E^c$, $X_{SE}^c$ in equation (46).

Finally, equation (45) is transformed into the DCT domain as follows:

$$Y^c = (Z^c + Z_W^c \Phi)H_{R,0}^+ + (Z^{cs} + Z_W^{cs}\Phi)(H_{I,0}^+)^t + \qquad (47)$$

$$(Z^c + Z_E^c \Phi)H_{\bar{R},0}^- - (Z^{cs} + Z_E^{cs}\Phi)(H_{\bar{I},0}^-)^t +$$

$$\Big[(Z^{cs} + Z_W^{cs}\Phi)H_{R,0}^+ - (Z^c + Z_W^c\Phi)(H_{I,1}^+)^t +$$

$$(Z^{cs} - Z_E^{cs}\Phi)H_{\bar{R},1}^- + (Z^c + Z_E^c\Phi)(H_{\bar{I},1}^-)^t\Big]T$$

The horizontal and vertical processing modules of the filters described in this disclosure implement equations (46) and (47), respectively. These filters are efficient because all of the V-matrices in equation (46) and all of the H-matrices in equation (47) are diagonal matrices. Moreover, multiplication by $\Phi$ requires no computational resources. Additional savings in computational resources are made by feeding the input picture signal to the filter in raster-scan order, i.e., left to right and top to bottom. When this is done, $Z^c$ is identical to $Z_E^c$ of the previously-processed block of DCT coefficients, and $Z_W^c$ is identical to $Z_E^c$ of the block of DCT coefficients processed two blocks ago. Therefore, it is only necessary to calculate $Z_E^c$ for every input block of DCT coefficients, and to save it for use in processing the next two blocks of DCT coefficients. The blocks $Z_E^{cs}$ of mixed DCT/DST coefficients must similarly be saved for use as $Z^{cs}$ and $Z_W^{cs}$ when the next two blocks of DCT coefficients are processed.

In the filters described in this disclosure, unlike the DCT coefficients $X_i^c$, the mixed DST/DCT coefficients $X_i^{sc}=TX_i^c$ and the mixed DCT/DST coefficients $Z_i^{cs}=Z_i^c T^t$ do not form part of the input picture signal, and must be calculated from the input picture signal. This requires a way of performing a fast, efficient cosine-sine transform. Such a cosine-sine transform will be described below.

Martucci's CMPs are uniquely defined by the trigonometric transformations $T_a$ and $T_b$ defined in equation (18)

above. Martucci's article shows additional sets of three or four CMPs in tables VI and VII. The sets are separated by double lines in Martucci's tables. The sets of three CMPs can be complemented by duplicating one of the CMPs in the set followed by operand switching to generate a fourth CMP for the set. The method described above for adapting Martucci's for type 2e DCTs can applied to the remaining sets of four CMPs disclosed by Martucci to derive processing structures for them. Such processing structures can be used, for example, when the compressed picture signal has been compressed using a Type 1e DCT, for example. As noted above, the embodiments of the filters disclosed herein are for filtering compressed picture signals that have been compressed using a type 2e DCT.

The mathematical basis of the processing structure used to implement fast, efficient CSTs and SCTs will now be described. The CSTs and SCTs respectively multiply the blocks of transform coefficients by the matrices T and $T^t$. To minimize the computational resources required to perform this multiplication, these matrices need to be factorized so that the multiplication operation can be performed by determining the products of sparse matrices.

The DST matrix is related to the DCT matrix as follows:

$$S = \Phi C \Phi \qquad (48)$$

in which $\Phi$ and $\Phi$ are respectively defined by definitions (18) and (25).

The fastest algorithm for factorizing C is that derived by Y. Arai, T. Agui and M. Nakajima, *A Fast DCT-SQ Scheme for Images*, TRANS. OF THE IEICE, E 71(11), 1095, (1988 November) in which C is represented as follows:

$$C = DPB_1 B_2 MA_1 A_1 A_3$$

in which D is the above-defined diagonal matrix:

$$D = \text{diag}\{0.3536, 0.2549, 0.2706, 0.3007, 0.3536, 0.4500, 0.6533, 1.2814\} \qquad (49)$$

P is a permutation matrix given by:

$$P = \begin{pmatrix} 1 & 0 & 0 & 0 & 0 & 0 & 0 & 0 \\ 0 & 0 & 0 & 0 & 0 & 1 & 0 & 0 \\ 0 & 0 & 1 & 0 & 0 & 0 & 0 & 0 \\ 0 & 0 & 0 & 0 & 0 & 0 & 0 & 1 \\ 0 & 1 & 0 & 0 & 0 & 0 & 0 & 0 \\ 0 & 0 & 0 & 1 & 0 & 0 & 0 & 0 \\ 0 & 0 & 0 & 1 & 0 & 0 & 0 & 0 \\ 0 & 0 & 0 & 0 & 0 & 0 & 1 & 0 \end{pmatrix}$$

and the remaining matrices are defined as follows:

$$B_1 = \begin{pmatrix} 1 & 0 & 0 & 0 & 0 & 0 & 0 & 0 \\ 0 & 1 & 0 & 0 & 0 & 0 & 0 & 0 \\ 0 & 0 & 1 & 0 & 0 & 0 & 0 & 0 \\ 0 & 0 & 0 & 1 & 0 & 0 & 0 & 0 \\ 0 & 0 & 0 & 0 & 1 & 0 & 0 & 1 \\ 0 & 0 & 0 & 0 & 0 & 1 & 1 & 0 \\ 0 & 0 & 0 & 0 & 0 & 1 & -1 & 0 \\ 0 & 0 & 0 & 0 & -1 & 0 & 0 & 1 \end{pmatrix},$$

$$B_2 = \begin{pmatrix} 1 & 0 & 0 & 0 & 0 & 0 & 0 & 0 \\ 0 & 1 & 0 & 0 & 0 & 0 & 0 & 0 \\ 0 & 0 & 1 & 1 & 0 & 0 & 0 & 0 \\ 0 & 0 & -1 & 1 & 0 & 0 & 0 & 0 \\ 0 & 0 & 0 & 0 & 1 & 0 & 0 & 0 \\ 0 & 0 & 0 & 0 & 0 & 1 & 0 & 1 \\ 0 & 0 & 0 & 0 & 0 & 0 & 1 & 0 \\ 0 & 0 & 0 & 0 & 0 & -1 & 0 & 1 \end{pmatrix}$$

$$M = \begin{pmatrix} 1 & 0 & 0 & 0 & 0 & 0 & 0 & 0 \\ 0 & 1 & 0 & 0 & 0 & 0 & 0 & 0 \\ 0 & 0 & 0.7071 & 0 & 0 & 0 & 0 & 0 \\ 0 & 0 & 0 & 1 & 0 & 0 & 0 & 0 \\ 0 & 0 & 0 & 0 & -0.9239 & 0 & -0.3827 & 0 \\ 0 & 0 & 0 & 0 & 0 & 0.7071 & 0 & 0 \\ 0 & 0 & 0 & 0 & -0.3827 & 0 & 0.9239 & 0 \\ 0 & 0 & 0 & 0 & 0 & 0 & 0 & 1 \end{pmatrix}$$

$$A_1 = \begin{pmatrix} 1 & 0 & 0 & 0 & 0 & 0 & 0 & 0 \\ 0 & -1 & 0 & 0 & 0 & 0 & 0 & 0 \\ 0 & 0 & 1 & 1 & 0 & 0 & 0 & 0 \\ 0 & 0 & 0 & 1 & 0 & 0 & 0 & 0 \\ 0 & 0 & 0 & 0 & 1 & 0 & 0 & 0 \\ 0 & 0 & 0 & 0 & 0 & 1 & 0 & 0 \\ 0 & 0 & 0 & 0 & 0 & 0 & 1 & 0 \\ 0 & 0 & 0 & 0 & 0 & 0 & 0 & 1 \end{pmatrix},$$

$$A_2 = \begin{pmatrix} 1 & 0 & 0 & 1 & 0 & 0 & 0 & 0 \\ 0 & 1 & 1 & 0 & 0 & 0 & 0 & 0 \\ 0 & 1 & -1 & 0 & 0 & 0 & 0 & 0 \\ 1 & 0 & 0 & -1 & 0 & 0 & 0 & 0 \\ 0 & 0 & 0 & 0 & -1 & -1 & 0 & 0 \\ 0 & 0 & 0 & 0 & 1 & 1 & 0 \\ 0 & 0 & 0 & 0 & 0 & 1 & 1 \\ 0 & 0 & 0 & 0 & 0 & 0 & 1 \end{pmatrix}$$

$$A_3 = \begin{pmatrix} 1 & 0 & 0 & 0 & 0 & 0 & 0 & 1 \\ 0 & 1 & 0 & 0 & 0 & 0 & 1 & 0 \\ 0 & 0 & 1 & 0 & 0 & 1 & 0 & 0 \\ 0 & 0 & 0 & 1 & 1 & 0 & 0 & 0 \\ 0 & 0 & 0 & 1 & -1 & 0 & 0 & 0 \\ 0 & 0 & 1 & 0 & 0 & -1 & 0 & 0 \\ 0 & 1 & 0 & 0 & 0 & 0 & -1 & 0 \\ 1 & 0 & 0 & 0 & 0 & 0 & 0 & -1 \end{pmatrix}$$

Thus, T, the DCT to DST domain transform operator (CST) matrix, is given by:

$$T = SC^t \quad (50)$$
$$= \Phi C \Phi C^t$$
$$= \Phi D P B_1 B_2 M A_1 A_2 A_3 \Phi A_3^t A_2^t A_1^t M^t B_2^t B_1^t P^t D^t$$

The matrix G is defined as:

$$G \triangleq M A_1 A_2 A_3 \Phi A_3^t A_2^t A_1^t M^t \quad (51)$$

and is a fairly sparse matrix in which:

$$G = \begin{pmatrix} 0 & 0 & 0 & 0 & 0 & 0 & 0 & 2 \\ 0 & 0 & 0 & 0 & -5.2264 & 0 & 2.1648 & 2 \\ 0 & 0 & 0 & 0 & 0 & -2 & 0 & 1.4142 \\ 0 & 0 & 0 & 0 & 1.0824 & 0 & 2.6132 & 2 \\ 0 & -5.2264 & 0 & 1.0824 & 0 & 0 & 0 & 0 \\ 0 & 0 & -2 & 0 & 0 & 0 & 0 & 0 \\ 0 & 2.1648 & 0 & 2.6132 & 0 & 0 & 0 & 0 \\ 2 & 2 & 1.4142 & 2 & 0 & 0 & 0 & 0 \end{pmatrix}$$

Using part of the interrelations between the elements of G, multiplication by the vector G can be implemented by performing eight multiplications and 12 additions.

Finally, T, the DCT to DST domain transform operator (CST) matrix is given by:

$$T = D\tilde{T}D \quad (52)$$

where:

$$\tilde{T} \triangleq \Phi P B_1 B_2 G B_2^t B_1^t P^t \quad (53)$$

In this, $$\tilde{D} \triangleq \Phi D \Phi$$

is a diagonal matrix having the same elements as D. Multiplication by $\tilde{T}$ requires 8 multiplications and 28 additions. Multiplication by the matrices D and $\tilde{D}$ can be avoided by absorbing these matrices into the quantizing and dequantizing tables of the JPEG or MPEG compression and expansion processing and into the kernel matrices $\hat{V}_{p,q}^r$, $p \in \{R,I\}$, $q \in \{0,1\}$, $r \in \{+,-\}$.

The column-wise SCT, corresponding to $T^t$, is calculated as follows:

$$T^t = D\tilde{T}^t\tilde{D} = D(\Phi \tilde{T}^t \Phi)\tilde{D} \quad (54)$$

This requires the same number of operations as calculating T.

In the general embodiment of the explicit DST-based filter described above with reference to FIG. 5, the basic filtering method described above with reference to equations (44)–(46) is modified by absorbing the matrices D and $\tilde{D}$ into the dequantizing and quantizing tables used in the decoder 38 and the encoder 44 shown in FIG. 3, and into the multiplying matrices used by the filter 40. Such multiplying matrices may be generated by the multiplying matrix generating module 41. This saves having to multiply each block of transform coefficients by these matrices.

The modification is implemented by pre-multiplying and post-multiplying both sides of equation (56) by the matrix $D^{-1}$ and by pre- and post-multiplying both sides of equation (54) by the matrices $D^{-1}$ and D, respectively. In addition, the terms $DD^{-1}$ or $\tilde{D}^{-1}\tilde{D}$ are inserted into these equations. The resulting filtering scheme will now be described.

The dequantizing table $Q^d$ is altered as follows to generate the modified dequantizing table $Q_m^d$ used in the decoder 38 shown in FIG. 3:

$$Q_m{}^d \leftarrow D \cdot Q^d \cdot D \qquad (55)$$

As a result of this, the vertical processing module 101 of the embodiment of the filter 40 shown in FIG. 5 processes the blocks $\tilde{X}_r{}^c = DX_r{}^c D$, $r \in \{NW, W, SW, N, 0, S, NE, E, SE\}$, of DCT coefficients instead of the blocks $X_r{}^c$.

In the vertical processing module 101, the CMCST module 109 derives the block $\tilde{X}_{SE}{}^{sc}$ of modified DST coefficients from the block $\tilde{X}_{SE}{}^c$ of DCT coefficients using:

$$\tilde{X}_{SE}{}^{sc} = \tilde{T} \tilde{X}_{SE}{}^c \qquad (56)$$

The delay modules 121S and 123S delay the block $\tilde{X}_{SE}{}^{sc}$ of modified DST coefficients for use as $\tilde{X}_p{}^{sc}$, $p \in \{NW, W, SW, N, 0, S, NE, E, SE\}$ in processing performed by the mixed DCT/DST processor 107 of the filter 40.

The vertical processing module 101 calculates the block $\tilde{Z}_E{}^c$ of DCT coefficients from the block $\tilde{X}_{SE}{}^c$ and its neighboring blocks of DCT coefficients and from the block $\tilde{X}_{SE}{}^{sc}$ and its neighboring blocks of mixed DST/DCT coefficients using the relationship:

$$\tilde{Z}_E^c = \tilde{V}_{R,0}^+ (\tilde{X}_E^c + \Phi \tilde{X}_{NE}^c) + \tilde{V}_{I,0}^+ (\tilde{X}_E^{sc} + \Phi \tilde{X}_{NE}^{sc}) + \\ \tilde{V}_{R,0}^- (\tilde{X}_E^c + \Phi \tilde{X}_{SE}^c) - \tilde{V}_{I,0}^- (\tilde{X}_E^{sc} + \Phi \tilde{X}_{SE}^{sc}) + \\ \tilde{T}^t [\tilde{V}_{R,1}^+ (\tilde{X}_E^{sc} - \Phi \tilde{X}_{NE}^{sc}) - \tilde{V}_{I,1}^+ (\tilde{X}_E^c - \Phi \tilde{X}_{NE}^c) + \\ \tilde{V}_{R,1}^- (\tilde{X}_E^{sc} - \Phi \tilde{X}_{SE}^{sc}) + \tilde{V}_{I,1}^- (\tilde{X}_E^c - \Phi \tilde{X}_{SE}^c)] \qquad (57)$$

In this:

$$\tilde{V}_{R,0}^+ \triangleq D^{-1} V_{R,0}^+ D^{-1} \quad \tilde{V}_{I,0}^+ \triangleq D^{-1} V_{I,0}^+ \tilde{D} \qquad (58)$$

$$\tilde{V}_{R,0}^- \triangleq D^{-1} V_{R,0}^- D^{-1} \quad \tilde{V}_{I,0}^- \triangleq D^{-1} V_{I,0}^- \tilde{D} \qquad (59)$$

$$\tilde{V}_{R,1}^+ \triangleq \tilde{D} V_{R,1}^+ \tilde{D} \quad \tilde{V}_{I,1}^+ \triangleq \tilde{D} V_{I,1}^+ D^{-1} \qquad (60)$$

$$\tilde{V}_{R,1}^- \triangleq \tilde{D} V_{R,1}^- \tilde{D} \quad \tilde{V}_{I,1}^- \triangleq \tilde{D} V_{I,1}^- D^{-1} \qquad (61)$$

Each block $\tilde{Z}_E{}^c$ of DCT coefficients generated by the vertical processing module 101 passes to the vertical processing module 103 where the delay modules 122C and 124C each delay it by a time corresponding to the time between the vertical processing module generating consecutive blocks $\tilde{Z}_E{}^c$. This converts the block $\tilde{Z}_E{}^c$ into the blocks $\tilde{Z}^c$ and $\tilde{Z}_W{}^c$ of DCT coefficients required by the horizontal processing module.

In the horizontal processing module 131, the RMCST module 109 derives the block $\tilde{Z}_E{}^{sc}$ of modified DST coefficients from the block $\tilde{Z}_E{}^c$ of DCT coefficients using the relationship:

$$\tilde{Z}_E{}^{cs} = \tilde{Z}_E{}^c \tilde{T}^t \qquad (62)$$

The horizontal processing module 103 calculates the block $\tilde{Y}^c$ of DCT coefficients from the block $\tilde{Z}_E{}^c$ and its neighboring blocks of DCT coefficients and from the block $\tilde{Z}_E{}^{cs}$ and its neighboring blocks of modified DST coefficients using the relationship:

$$\tilde{Y}^c = (\tilde{Z}^c + \tilde{Z}_W^c \Phi) \tilde{H}_{R,0}^+ + (\tilde{Z}^{cs} + \tilde{Z}_W^{cs} \Phi)(\tilde{H}_{I,0}^+)^t + \qquad (63)$$

-continued
$$(\tilde{Z}^c + \tilde{Z}_E^c \Phi) \tilde{H}_{R,0}^- - (\tilde{Z}^{cs} + \tilde{Z}_E^{cs} \Phi)(\tilde{H}_{I,0}^-)^t + \\ [(\tilde{Z}^{cs} - \tilde{Z}_W^{cs} \Phi) \tilde{H}_{R,1}^+ - (\tilde{Z}^c + \tilde{Z}_W^c \Phi)(\tilde{H}_{I,1}^+)^t + \\ (\tilde{Z}^{cs} - \tilde{Z}_E^{cs} \Phi) \tilde{H}_{R,1}^- + (\tilde{Z}^c - \tilde{Z}_E^c \Phi)(\tilde{H}_{I,1}^-)^t] T$$

in which:

$$\tilde{H}_{R,0}^+ \triangleq D^{-1} H_{R,0}^+ D^{-1} \quad \tilde{H}_{I,0}^+ \triangleq \tilde{D} H_{I,0}^+ D^{-1} \qquad (64)$$

$$\tilde{H}_{R,0}^- \triangleq D^{-1} H_{R,0}^- D^{-1} \quad \tilde{H}_{I,0}^- \triangleq \tilde{D} H_{I,0}^- D^{-1} \qquad (65)$$

$$\tilde{H}_{R,1}^+ \triangleq \tilde{D} H_{R,1}^+ \tilde{D} \quad \tilde{H}_{I,1}^+ \triangleq D^{-1} H_{I,1}^+ \tilde{D} \qquad (66)$$

$$\tilde{H}_{R,1}^- \triangleq \tilde{D} H_{R,1}^- \tilde{D} \quad \tilde{H}_{I,1}^- \triangleq D^{-1} H_{I,1}^- \tilde{D} \qquad (67)$$

The block $\tilde{Y}^c$ generated by the horizontal processing module 103 is related to the desired output block $Y^c$ of DCT coefficients by $Y^c = D\tilde{Y}^c D$. To generate the desired output block, the encoder 44 requantizes the DCT coefficients in the block $Y^c$ using the modified quantizing table $Q_m{}^q$. The modified quantizing table is obtained by modifying the quantizing table $Q^q$ in the complementary way to way in which the dequantizing table used in the decoder 38 is modified, i.e., $$Q_m{}^q \leftarrow D^{-1} \cdot Q^q \cdot D^{-1} \qquad (68)$$

The general embodiment of the filter 40 shown in FIG. 5 can be significantly simplified when the filter kernel is symmetric, as in the embodiment shown in FIG. 7. When the filter kernel is symmetric, $h_{-n} = h_n$ and $v_{-n} = v_n$, $n = 1, \ldots, 8$. Setting $\alpha = \beta = \frac{1}{2}$ in equations (29) and (30) gives $\tilde{V}_{p,q}^+ = \tilde{V}_{p,q}^-$ and $\tilde{H}_{p,q}^+ = \tilde{H}_{p,q}^-$ for $p \in \{R, I\}$ and $q \in \{0, 1\}$.

By defining $\hat{V}_{p,q} \triangleq \tilde{V}_{p,q}^+$ and $\hat{H}_{p,q} \triangleq \tilde{H}_{p,q}^+$, the vertical processing module 201 and the horizontal processing module 203 of the embodiment shown in FIG. 7 calculate $\tilde{Z}_E{}^c$ and $\tilde{Y}^c$ using the following modified versions of equations (63) and (57), respectively:

$$\tilde{Z}_E^c = \hat{V}_{R,0}[2\tilde{X}_{NE}^c + \Phi(\tilde{X}_{NE}^c + \tilde{X}_{SE}^c)] + \hat{V}_{I,0} \Phi(\tilde{X}_{NE}^{sc} - \tilde{X}_{SE}^{sc}) + \tilde{T}^t \{\hat{V}_{R,1}[2\tilde{X}_{SE}^{sc} - \Phi(\tilde{X}_{NE}^{sc} + \tilde{X}_{SE}^{sc})] + \hat{V}_{I,1} \Phi(\tilde{X}_{NE}^c - \tilde{X}_{SE}^c)\} \qquad (69)$$

and $$\tilde{Y}^c = [2\tilde{Z}^c + (\tilde{Z}_W^c + \tilde{Z}_E^c)\Phi] \hat{H}_{R,0} + (\tilde{Z}_W^{cs} - \tilde{Z}_E^{cs})\Phi(\hat{H}_{I,0})^t + \{[2\tilde{Z}^{cs} - (\tilde{Z}_W^{cs} + \tilde{Z}_E^{cs})\Phi] \hat{H}_{R,1} + (\tilde{Z}_W^c - \tilde{Z}_E^c)\Phi(\hat{H}_{I,1})^t\} \tilde{T} \qquad (70)$$

The embodiment of the filter shown in FIG. 7 may easily be adapted to operate with an anti-symmetric filter kernel in which $h_{-n} = -h_n$ and $v_{-n} = -v_n$, $n = 1, \ldots, 8$, $h_0 = v_0 = 0$. Such a filter has the same structure as that shown in FIG. 7, but the polarity of summing operations performed by some of the summing modules is reversed.

The general embodiment of the filter 40 shown in FIG. 5 can be further simplified when the filter kernel is causal, or anti-causal, as in the embodiment shown in FIG. 9. When the filter kernel is causal, $h_n = v_n = 0$ for, $n < 0$. Setting $\alpha = 1$, $\beta = 0$ in equations (29) and (30) gives:

$$\tilde{V}_{p,q}^- = \tilde{H}_{p,q}^- = 0 \text{ for } p \in \{R, I\} \text{ and } q \in \{0, 1\} \qquad (71)$$

in which 0 is the 8×8 null matrix.

The horizontal processing module 103 of the embodiment shown in FIG. 9 calculates $\tilde{Y}^c$ using the following modified versions of equation (63):

$$\tilde{Y}^c = (\tilde{Z}^c + \tilde{Z}_W{}^c\Phi)\tilde{H}_{R,0}{}^+ + (\tilde{Z}^{cs} - Z_W{}^{cs}\Phi)(\tilde{H}_{I,0}{}^+)^t + \{(\tilde{Z}_W{}^{cs} + \tilde{Z}_E{}^{cs}\Phi)\tilde{H}_{R,1}{}^+ + (\tilde{Z}_W{}^c - \tilde{Z}_E{}^c\Phi)(\tilde{H}_{I,1}{}^+)^t\}\tilde{T} \quad (72)$$

In this, $\tilde{Z}_E{}^c$ does not need to be generated because the horizontal processing module only requires $\tilde{Z}^c$ and $\tilde{Z}_W{}^c$. Accordingly, this embodiment only uses a single delay module 122C and 122S in the DCT coefficient processor 406 and the DST processing module 408, respectively. The vertical processing module 401 generates the block $\tilde{Z}^c$ of DCT coefficients using equation (57) into which equation (71) is incorporated, and in which $\tilde{X}_N{}^c \tilde{X}^c$ and $\tilde{X}_S{}^c$ are substituted for $\tilde{X}_{NE}{}^c \tilde{X}_E{}^c$ and $\tilde{X}_{SE}{}^c$. This gives:

$$\tilde{Z}^c = \tilde{V}_{R,0}{}^+(\tilde{X}^c + \Phi\tilde{X}_N{}^c) + \tilde{V}_{I,0}{}^+(\tilde{X}^c + \Phi\tilde{X}_N{}^{sc}) + \tilde{T}[\tilde{V}_{R,1}{}^+(\tilde{X}^{sc} - \Phi\tilde{X}_N{}^{sc}) - \tilde{V}_{I,1}{}^+(\tilde{X}^c - \Phi\tilde{X}_N{}^c)] \quad (73)$$

If the filter kernel is an anti-causal filter kernel in which $h_n = v_n = 0$ for $n > 0$, a similar processing structure is used, and the $V^-$ multiplying matrices are used instead of the $V^+$ multiplying matrices.

Greatest simplification of the general filter shown in FIG. 5 is obtained when the filter characteristics are defined by a four pixel-delayed causal kernel. In this, symmetry and causality reduce complexity. A k-pixel delayed causal symmetric filter is defined as a causal filter $\{h_n\}_{n=0}^k$ in which $h_n = h_{2k-n}$ for $0 \leq n \leq 2k$. A causal symmetric filter is a delayed version of a non-causal filter that is symmetric about the origin.

In the causal-symmetric filter in which k=4, in addition to the simplification provided by causality for $\alpha = 1$:

$$V_R{}^+(k) = H_R{}^+(k) = 0 \quad k=1, 3, 5, 7 \quad (74)$$

$$V_I{}^+(k) = H_I{}^+(k) = 0 \quad k=0, 2, 4, 6, 8 \quad (75)$$

As a result, the matrices $\tilde{V}p,q^+$ and $\tilde{H}p,q^+$, $p \in \{R,I\}$, $q \in \{0,1\}$ have only four non-zero elements each.

Although this disclosure describes illustrative embodiments of the invention in detail, it is to be understood that the invention is not limited to the precise embodiments described, and that various modifications may be practiced within the scope of the invention defined by the appended claims.

We claim:

1. An explicit DST-based filter for filtering an information signal composed of input blocks of discrete cosine transform (DCT) coefficients to generate a filtered information signal composed of blocks of DCT coefficients, the filter having characteristics defined by a linear convolution kernel and comprising:

a trigonometric transform module that applies a trigonometric transform to blocks of DCT coefficients related to the input blocks of DCT coefficients to generate corresponding input blocks of transform coefficients of a second type, the input blocks of transform coefficients of the second type being blocks of one of (a) mixed DST/DCT coefficients, (b) mixed DCT/DST coefficients and (c) DST coefficients;

a first transform coefficient processor including matrix multipliers that generate at least one multiplied block of DCT coefficients and at least one multiplied block of transform coefficients of the second type by multiplying, by diagonal multiplying matrices, intermediate blocks of DCT coefficients derived from the input blocks of DCT coefficients;

a second transform coefficient processor including matrix multipliers that generate at least one multiplied block of transform coefficients of the second type and at least one multiplied block of DCT coefficients by multiplying, by diagonal multiplying matrices, intermediate blocks of transform coefficients of the second type derived from the input blocks of transform coefficients of the second type;

a first summing arrangement that sums the multiplied blocks of DCT coefficients generated by both the first and second transform coefficient processors to generate a first final block of DCT coefficients, and that sums the multiplied blocks of transform coefficients of the second type generated by both the first and second transform coefficient processors to generate a first final block of transform coefficients of the second type;

an inverse trigonometric transform module that applies an inverse trigonometric transform to the first final block of transform coefficients of the second type to generate a second final block of DCT coefficients, the inverse trigonometric transform being the inverse of the trigonometric transform applied by the trigonometric transform module; and a second summing arrangement that sums the first and second final blocks of DCT coefficients to generate a block of DCT coefficients constituting a block of the filtered information signal.

2. The filter of claim 1, in which:

the first transform coefficient processor includes a delay module that delays the input blocks of DCT coefficients to generate neighboring blocks of DCT transform coefficients; and the second transform coefficient processor includes a delay module that delays the input blocks of transform coefficients of the second type to generate neighboring blocks of the transform coefficients of the second type.

3. The filter of claim 1, in which:

the multiplying matrices include:

real-type multiplying matrices derived from a real component of a discrete Fourier transform of a vector representing a filter kernel, and imaginary-type multiplying matrices derived from an imaginary component of the discrete Fourier transform of the vector representing the filter kernel;

the first transform coefficient processor generates the at least one multiplied block of DCT coefficients by multiplying by one of the real-type multiplying matrices and generates the at least one multiplied block of transform coefficients of the second type by multiplying by one of the imaginary-type multiplying matrices; and the second transform coefficient processor generates the at least one multiplied block of transform coefficients of the second type by multiplying by one of the imaginary-type multiplying matrices and generates the at least one multiplied block of DCT coefficients by multiplying by one of the real-type multiplying matrices.

4. The filter of claim 1, in which:

the first transform coefficient processor additionally includes a processing arrangement that derives the intermediate blocks of DCT coefficients from the input blocks of DCT coefficients, the processing arrangement comprising:

a serial arrangement of a delay module and an even-element sign reversing module, the serial arrangement receiving the input blocks of DCT coefficients, and a summing module that receives each of the input blocks of DCT coefficients directly and via the serial arrangement and sums them to generate the intermediate blocks of DCT coefficients; and the trigonometric transform module applies the trigonometric transform to the input blocks of DCT coefficients.

5. The filter of claim 4, in which the second transform coefficient processor additionally includes a processing arrangement similar to the processing arrangement of the first transform coefficient processor and that derives the intermediate blocks of transform coefficients of the second type from the blocks of transform coefficients of the second type output by the trigonometric transform module.

6. The filter of claim 1, in which:

the first transform coefficient processor additionally includes a processing arrangement that drives the intermediate blocks of DCT coefficients from the input blocks of DCT coefficients, the processing arrangement comprising:

a first serial arrangement including a first sign reverser and a first summing module, the first serial arrangement having an input connected to receive the input blocks of DCT coefficients and an output connected to deliver first ones of the intermediate blocks of DCT coefficients to one of the matrix multipliers, a second serial arrangement including a first delay module, a second delay module, a second sign reverser, a second summing module and a third summing module, the second summing module additionally being interconnected with the first summing module in a butterfly arrangement, the second serial arrangement having an input connected to receive the input blocks of DCT coefficients and an output connected to deliver second ones of the intermediate blocks of DCT coefficients to another of the matrix multipliers, and a doubling module connected to a node between the first and second delay modules and providing doubled blocks of DCT coefficients to the third summing module; and the trigonometric transform module applies the trigonometric transform to the input blocks of DCT coefficients.

7. The filter of claim 6, in which the second transform coefficient processor additionally includes a processing arrangement similar to the processing arrangement of the first transform coefficient processor, and that derives the intermediate blocks of transform coefficients of the second type from the input blocks of transform coefficients of the second type output by the trigonometric transform module.

8. The filter of claim 1, in which:

the first transform coefficient processor additionally includes a processing arrangement that derives the intermediate blocks of DCT coefficients from the input blocks of DCT coefficients, the processing arrangement comprising:

a first serial arrangement including a first sign reverser and a first summing module, the first serial arrangement having an input connected to receive the input blocks of DCT coefficients and an output connected to deliver first ones of the intermediate blocks of DCT coefficients to a first pair of the matrix multipliers, a second serial arrangement including a first delay module, a second delay module, a second sign reverser and a second summing module, the second serial arrangement having an input connected to receive the input blocks of DCT coefficients and an output connected to deliver second ones of the intermediate blocks of DCT coefficients to a second pair of the matrix multipliers, and a path connecting a node between the first and second delay modules to the first summing module and to the second summing module; and the trigonometric transform module applies the trigonometric transform to the input blocks of DCT coefficients.

9. The filter of claim 8, in which, in each of the pairs of matrix multipliers, one of the matrix multipliers multiplies the intermediate blocks of DCT coefficients by a real-type multiplying matrix and the other of the matrix multipliers multiplies the intermediate blocks of DCT coefficients by an imaginary-type multiplying matrix, the real-type and imaginary-type multiplying matrices being derived from a real component and an imaginary component, respectively, of a discrete Fourier transform of a vector representing a filter kernel.

10. The filter of claim 8, in which the second transform coefficient processor additionally includes a processing arrangement similar to the processing arrangement of the first transform coefficient processor, and that derives the intermediate blocks of transform coefficients of the second type from the input blocks of transform coefficients of the second type output by the trigonometric transform module.

11. The filter of claim 1, in which the filter additionally comprises a preprocessor preceding the first transform coefficient processor and the trigonometric transform module, the preprocessor including:

a serial arrangement of a delay module and an even-element sign reversing module; and first and second summing modules in a butterfly arrangement, the first of the summing modules having an output connected to deliver the intermediate blocks of DCT coefficients to the matrix multipliers of the first transform coefficient processor, the second of the summing modules having an output connected to deliver the blocks of DCT coefficients related to the input blocks of DCT coefficients to the trigonometric transform module, the summing modules having inputs respectively connected to receive the input blocks of DCT coefficients directly and via the serial arrangement.

12. The filter of claim 11, in which, in the second transform coefficient processor, the intermediate blocks of transform coefficients multiplied by the matrix multipliers are the input blocks of transform coefficients of the second type output by the trigonometric transform module.

13. The filter of claim 1, in which:

the filter additionally comprises a preprocessor preceding the first transform coefficient processor and the trigonometric transform module, the preprocessor including:

a first serial arrangement of an even-element sign reverser and a first summing module, the first serial arrangement having an input connected to receive the input blocks of DCT coefficients and an output connected to deliver pre-processed blocks of DCT coefficients to the first transform coefficient processor, and a second serial arrangement of a delay module and a second summing module, the second summing module being additionally interconnected with the first summing module in a butterfly arrangement, the second serial arrangement having an input connected to receive the input blocks of DCT coefficients and an output connected to deliver the blocks of DCT coefficients related to the input blocks of DCT coefficients to the trigonometric transform module;

the first transform coefficient processor additionally includes a processing arrangement that derives the intermediate blocks of DCT coefficients from the pre-processed blocks of DCT coefficients, the processing arrangement comprising:
a serial arrangement of a delay module and an even element sign reversing module, and
two summing modules in a butterfly arrangement, one of the summing modules having an output connected to deliver first ones of the intermediate blocks of DCT coefficients to one of the matrix multipliers, the other of the summing modules having an output connected to deliver second ones of the intermediate blocks of DCT coefficients to another of the matrix multipliers, the summing modules being connected to receive the pre-processed blocks of DCT coefficients from the first summing module directly and via the serial arrangement.

14. The filter of claim 13, in which the second transform coefficient processor additionally includes a processing arrangement similar to the processing arrangement of the first transform coefficient processor, and that derives the intermediate blocks of transform coefficients of the second type from the input blocks of transform coefficients of the second type output by the trigonometric transform module.

15. A two-dimensional explicit DST-based filter having characteristics defined by a linear convolution kernel having a horizontal component and a vertical component, the filter comprising:
a first filter according to claim 1, in which:
the matrix multipliers pre-multiply the intermediate blocks of DCT coefficients derived from the input blocks of DCT coefficients by diagonal multiplying matrices derived from the vertical component of the convolution kernel,
the trigonometric transform module applies a column-modified cosine-sine transform to generate blocks of mixed DST/DCT coefficients as the input blocks of transform coefficients of the second type, and
the inverse trigonometric transform module applies a column-modified sine-cosine transform to a block of mixed DST/DCT coefficients as the first final block of transform coefficients of the second type; and
concatenated with the first filter, a second filter according to claim 1, in which:
the matrix multipliers post-multiply the intermediate blocks of DCT coefficients derived from the blocks of DCT coefficients output by the first filter by diagonal multiplying matrices derived from the horizontal component of the convolution kernel,
the trigonometric transform module applies a row-modified cosine-sine transform to generate blocks of mixed DCT/DST coefficients as the input blocks of transform coefficients of the second type, and
the inverse trigonometric transform module applies a row-modified sine-cosine transform to a block of mixed DCT/DST coefficients as the first final block of transform coefficients of the second type.

16. The filter of claim 1, additionally comprising a diagonal multiplying matrix generator, including:
a discrete Fourier transform module that performs a discrete Fourier transform on a vector that exactly represents the linear convolution kernel to generate a set of real transform coefficients and a set of imaginary transform coefficients;
a selection element that selects subsets of the set of real transform coefficients to generate a first vector and a second vector, and that selects subsets of the set of imaginary transform coefficients to generate a third vector and a fourth vector;
a matrix generator that generates first through fourth matrices having the first through fourth vectors, respectively, as diagonal elements thereof, and outputs the first and second matrices as a first pair of multiplication matrices for use by the first transform coefficient processor; and
matrix multipliers that multiply the third and fourth matrices by a matrix $\Theta$ and a transpose of the matrix $\Theta$ to generate fifth and sixth matrices, respectively, and output the fifth and sixth matrices as a second pair of multiplication matrices for use by the second transform coefficient processor.

17. The filter of claim 1, in which:
the filter characteristics are defined by a non-separable two-dimensional linear convolution kernel;
the trigonometric transform module and the inverse trigonometric transform modules are, respectively, a first trigonometric transform module and a first inverse trigonometric transform module that apply a trigonometric transform of a first type and an inverse trigonometric transform of the first type;
the matrix multipliers of the first transform coefficient processor generate a multiplied block of DCT coefficients, a multiplied block of transform coefficients of the second type and a multiplied block of transform coefficients of a third type by multiplying, by diagonal multiplying matrices, intermediate blocks of DCT coefficients derived from the input blocks of DCT coefficients;
the matrix multipliers of the second transform coefficient processor generate a multiplied block of DCT coefficients, a multiplied block of transform coefficients of the second type, and a multiplied block of transform coefficients of the third type by multiplying, by diagonal multiplying matrices, intermediate blocks of transform coefficients of the second type derived from the input blocks of transform coefficients of the second type;
the filter additionally comprises:
a second trigonometric transform module that applies a trigonometric transform of a second type to the input blocks of DCT coefficients to generate corresponding input blocks of transform coefficients of the third type, the input blocks of transform coefficients of the third type being blocks of one of (a) mixed DST/DCT coefficients, (b) mixed DCT/DST coefficients and (c) DST coefficients, and
a third transform coefficient processor including matrix multipliers that generate a multiplied block of DCT coefficients, a multiplied block of transform coefficients of the second type, and a multiplied block of transform coefficients of the third type by multiplying, by diagonal multiplying matrices, intermediate blocks of transform coefficients of the third type derived from the input blocks of transform coefficients of the third type;
the first summing arrangement sums the multiplied blocks of DCT coefficients generated by the first, second and third transform coefficient processors to generate a first final block of DCT coefficients, sums the multiplied blocks of transform coefficients of the second type generated by the first, second and third transform coefficient processors to generate a first final block of transform coefficients of the second type, and sums the multiplied blocks of transform coefficients of the third type generated by the first, second and third transform coefficient processors to generate a first final block of transform coefficients of the third type;

the filter additionally comprises a second inverse trigonometric transform module that applies an inverse trigonometric transform of the second type to the first final block of transform coefficients of the third type to generate a third final block of DCT coefficients; and the second summing arrangement sums the first, second and third final blocks of DCT coefficients to generate a block of DCT coefficients constituting a block of the filtered information signal.

18. The filter of claim 17, in which the first transform coefficient processor additionally includes a processing arrangement that derives the intermediate blocks of DCT coefficients from the input blocks of DCT coefficients, the processing arrangement comprising:

a vertical butterflying arrangement including an input and two outputs, the input being connected to receive blocks of transform coefficients corresponding to the input blocks of DCT coefficients, the two outputs each providing a block of processed transform coefficients; and two horizontal butterflying arrangements similar to the vertical butterflying arrangement, the input of each being connected to a different one of the outputs of the vertical butterflying arrangement, the outputs of each being connected to deliver the intermediate blocks of DCT coefficients to a different one of the matrix multipliers.

19. The filter of claim 18, in which:

the butterflying arrangements each comprise:
  a first serial arrangement including a first even-element sign reverser and a first summing module, the first serial arrangement having an input connected to the input of the butterflying arrangement and an output connected to one of the outputs of the butterflying arrangement,
  a second serial arrangement including a first delay module, a second delay module, a second even-element sign reverser and a second summing module, the second serial arrangement having an input and an output connected to the input and the output, respectively, of the butterflying arrangement, and
  a path connecting a node between the first and second delay modules to the first summing module and to the second summing module;

in the vertical butterflying arrangement, the delay elements each have a delay corresponding to a line period of the information signal and the even elements are even rows; and in the horizontal butterflying arrangements, the delay elements have a delay corresponding to a pixel period of the information signal and the even elements are even columns.

20. The filter of claim 1, in which:

the input blocks of DCT coefficients are quantized according to a quantizing table; and the filter additionally comprises:
  a dequantizing table modifying module that pre- and post-multiplies the quantizing table by a diagonal matrix D to generate a modified dequantizing table, and
  a de-quantizer that de-quantizes the input blocks of DCT coefficients using the modified dequantizing table to generate corresponding blocks of modified DCT coefficients and that provides the blocks of modified DCT coefficients in lieu of the input blocks of DCT coefficients.

21. The filter of claim 20, additionally comprising:

a quantizing table modifying module that pre- and post-multiplies the quantizing table by a diagonal matrix $D^{-1}$ to generate a modified quantizing table; and a quantizer that receives the block of DCT coefficients from the second summing arrangement, quantizes the block of DCT coefficients using the modified quantizing table to generate a block of quantized DCT coefficients, and provides the block of quantized DCT coefficients as the block of the filtered information signal in lieu of the block of DCT coefficients from the second summing arrangement.

22. The filter of claim 20, in which, when the input blocks of DCT coefficients are composed of 8×8 DCT coefficients, the diagonal matrix D has the following diagonal elements: (0.3536, 0.2549, 0.2706, 0.3007, 0.3536, 0.4500, 0.6533, 1.2814).

23. The filter of claim 20, additionally comprising a diagonal multiplying matrix generator, including:

a discrete Fourier transform module that performs a discrete Fourier transform on a vector that exactly represents the linear convolution kernel to generate a set of real transform coefficients and a set of imaginary transform coefficients;

a selection element that selects subsets of the set of real transform coefficients to generate a first vector and a second vector, and that selects subsets of the set of imaginary transform coefficients to generate a third vector and a fourth vector;

a matrix generator that generates first through fourth matrices having the first through fourth vectors, respectively, as diagonal elements thereof;

matrix multipliers that multiply the third and fourth matrices by a matrix $\Theta$ and a transpose of the matrix $\Theta$ to generate fifth and sixth matrices, respectively; and matrix multipliers that pre- and post-multiply the first, second, fifth and sixth matrices by at least one of the diagonal matrices $D^{-1}$ and $\tilde{D}$ to generate a first pair of multiplication matrices for use by the first transform coefficient processor and a second pair of multiplication matrices for use by the second transform coefficient processor.

24. A processing arrangement for applying a modified cosine-sine or sine-cosine transform to the transform coefficients in a sub-block of a block of transform coefficients, the sub-block coinciding with one row or one column of the block, the processing arrangement comprising a serial arrangement of an order reversing module and a transform engine, the transform engine including:

a preprocessing section that comprises a serial arrangement of:
  a re-ordering portion in which the order of ones of the transform coefficients in the sub-block is changed,
  an outer summing portion including pairs of first summing modules that perform butterfly operations between pairs of the transform coefficients in the sub-block of transform coefficients output by the re-ordering portion, and an inner summing portion including pairs of second summing modules that perform butterfly operations between pairs of the transform coefficients in the sub-block of transform coefficients output by the outer summing portion;

a matrix multiplier that multiplies the transform coefficients in the sub-block of transform coefficients output by the preprocessing section by a relatively sparse matrix.

25. The processing arrangement of claim 24, additionally comprising a post-processing section that comprises a serial arrangement of an inner summing portion, an outer summing portion and a re-ordering section, the re-ordering section of the post-processing section reversing the re-ordering imposed by the re-ordering portion of the pre-processing section.

26. The processing arrangement of claim 25, in which the processing arrangement comprises a re-ordering module in lieu of the order-reversing module and the re-ordering portion of one of (a) the pre-processing section adjacent the re-ordering module, and (b) the post-processing adjacent the re-ordering module.

27. A computer-readable medium encoded with a computer program that instructs a computer to perform an explicit DST-based filtering operation in response to a linear convolution kernel, the filtering operation comprising:

forwardly trigonometrically transforming blocks of DCT coefficients related to input blocks of DCT coefficients constituting an input information signal to generate corresponding input blocks of transform coefficients of a second type, the input blocks of transform coefficients of the second type being blocks of one of (a) mixed DST/DCT coefficients, (b) mixed DCT/DST coefficients and (c) DST coefficients;

matrix multiplying, by first diagonal multiplying matrices, intermediate blocks of DCT coefficients derived to the input blocks of DCT coefficients to generate at least one multiplied block of DCT coefficients and at least one multiplied block of transform coefficients of a second type;

matrix multiplying, by second diagonal multiplying matrices, intermediate blocks of transform coefficients of the second type derived from the input blocks of transform coefficients of the second type to generate at least one multiplied block of DCT coefficients and at least one multiplied block of transform coefficients of the second type;

summing the multiplied blocks of DCT coefficients to generate a first final block of DCT coefficients;

summing the multiplied blocks of transform coefficients of the second type to generate a first final block of transform coefficients of the second type;

inversely trigonometrically transforming the first final block of transform coefficients of the second type to generate a second final block of DCT coefficients; and summing the first and second final blocks of DCT coefficients to generate a block of DCT coefficients constituting one block of a filtered output information signal.

28. The computer-readable medium of claim 27, in which:

the first and second multiplying matrices include:

real-type multiplying matrices derived from a real component of a discrete Fourier transform of a vector representing a filter kernel, and imaginary-type multiplying matrices derived from an imaginary component of the discrete Fourier transform of the vector representing the filter kernel;

matrix multiplying by the first diagonal multiplying matrices generates the at least one multiplied block of DCT coefficients by multiplying by one of the real-type multiplying matrices and generates the at least one block of transform coefficients of the second type by multiplying by one of the imaginary-type multiplying matrices; and matrix multiplying by the second diagonal multiplying matrices generates the at least one of the multiplied blocks of transform coefficients of the second type by multiplying by one of the imaginary-type multiplying matrices and generates the at least one multiplied block of the DCT coefficients by multiplying by one of the real-type multiplying matrices.

29. The computer-readable medium of claim 27, in which the filtering operation additionally comprises deriving the intermediate blocks of DCT coefficients from the input blocks of DCT coefficients, the deriving including:

delaying each of the input blocks of DCT coefficients to generate respective delayed input blocks;

subjecting the delayed input blocks to an even-element sign-reversing operation to generate sign-reversed blocks; and summing the input blocks of DCT coefficients with the respective sign-reversed blocks to generate the intermediate blocks of DCT coefficients.

30. The computer-readable medium of claim 27, in which the filtering operation additionally comprises deriving the intermediate blocks of DCT coefficients from the input blocks of DCT coefficients, the deriving including:

subjecting the input blocks of DCT coefficients to a first even-element sign-reversing operation to generate respective first sign-reversed blocks;

first delaying the input blocks of DCT coefficients to generate respective first delayed blocks;

second delaying the first-delayed blocks to generate respective second-delayed blocks;

doubling the second-delayed blocks to generate respective doubled blocks;

performing a butterfly operation between the first-delayed blocks and the second-delayed blocks to generate respective first ones of the intermediate blocks of DCT coefficients, and to generate butterflied blocks; and summing the butterflied blocks and the doubled blocks to generate respective second ones of the intermediate blocks of DCT coefficients.

31. The computer-readable medium of claim 27, in which the filtering operation additionally comprises deriving the intermediate blocks of DCT coefficients from the input blocks of DCT coefficients, the deriving including:

subjecting the input blocks of DCT coefficients to a first even-element sign-reversing operation to generate respective first sign-reversed blocks;

first delaying the input blocks of DCT coefficients to generate respective first delayed blocks;

summing the first sign-reversed blocks and the respective first delayed blocks to generate respective first ones of the intermediate blocks of DCT coefficients;

second delaying the first-delayed blocks to generate respective second-delayed blocks;

subjecting the second-delayed blocks to a second even-element sign-reversing operation to generate respective second sign-reversed blocks; and summing the second sign-reversed blocks and the respective second delayed blocks to generate respective second ones of the intermediate blocks of DCT coefficients.

32. The computer-readable medium of claim 27, in which:
the filtering operation additionally comprises:
    delaying the input blocks of DCT coefficients to generate respective delayed blocks,
    subjecting the delayed blocks to an even-element sign-reversing operation to generate respective sign-reversed blocks, and
    performing a butterfly operation between the delayed blocks and the respective sign-reversed blocks to generate the intermediate blocks of DCT coefficients and to generate respective pre-processed blocks of DCT coefficients; and
the blocks of DCT coefficients forwardly trigonometrically transformed are the pre-processed blocks of DCT coefficients generated by the butterfly operation.

33. The computer-readable medium of claim 27, in which:
the filtering operation additionally comprises:
    first delaying the input blocks of DCT coefficients to generate respective first-delayed blocks,
    subjecting the first-delayed blocks to a first even-element sign-reversing operation to generate respective first sign-reversed blocks,
    performing a first butterfly operation between the first-delayed blocks and the respective first sign-reversed blocks to generate respective first pre-processed blocks of DCT coefficients and to generate respective second pre-processed blocks of DCT,
    second delaying the first pre-processed blocks to generate respective second-delayed blocks,
    subjecting the second-delayed blocks to a second even-element sign-reversing operation to generate respective second sign-reversed blocks, and
    performing a second butterfly operation between the first pre-processed blocks and the respective second sign-reversed blocks to generate respective first ones of intermediate blocks of DCT coefficients and respective second ones of the intermediate blocks of DCT coefficients; and
the blocks of DCT coefficients forwardly trigonometrically transformed are the second pre-processed blocks of DCT coefficients generated by the first butterfly operation.

34. The computer-readable medium of claim 27, in which the filtering operation additionally comprises:
    performing a discrete Fourier transform on a vector that exactly represents the linear convolution kernel to generate a set of real transform coefficients and a set of imaginary transform coefficients;
    selecting subsets of the set of real transform coefficients to generate a first vector and a second vector, and selecting subsets of the set of imaginary transform coefficients to generate a third vector and a fourth vector;
    generating first through fourth matrices having the first through fourth vectors, respectively, as diagonal elements thereof;
    multiplying the third and fourth matrices by a matrix $\Theta$ and a transpose of the matrix $\Theta$ to generate fifth and sixth matrices, respectively; and
    providing the first and second matrices as the first multiplication matrices and providing the fifth and sixth matrices as the second multiplication matrices.

35. The computer-readable medium of claim 27, in which:
the filter characteristics are defined by a non-separable two-dimensional linear convolution kernel;
matrix multiplication by the first diagonal matrix multipliers generates at least one multiplied block of DCT coefficients, the at least one multiplied block of transform coefficients of the second type and at least one multiplied block of transform coefficients of a third type;
matrix multiplication by the second diagonal matrix multipliers generates at least one multiplied block of DCT coefficients, the at least one multiplied block of transform coefficients of the second type and at least one multiplied block of transform coefficients of a third type;
the blocks of DCT coefficients are forwardly trigonometrically transformed and the blocks of transform coefficients of the second type are inversely trigonometrically transformed using a forward trigonometrical transform and an inverse trigonometrical transform of a first type;
the filter operation additionally comprises:
    forwardly trigonometrically transforming the blocks of DCT coefficients related to the input blocks of DCT coefficients constituting the input information signal using a trigonometric transform of a second type to generate corresponding input blocks of transform coefficients of a third type, the input blocks of transform coefficients of the third type being blocks of one of (a) mixed DST/DCT coefficients, (b) mixed DCT/DST coefficients and (c) DST coefficients,
    matrix multiplying, by third diagonal multiplying matrices, blocks of transform coefficients of the third type derived from the input blocks of transform coefficients of the third type to generate at least one multiplied block of DCT coefficients, at least one multiplied block of transform coefficients of the second type, and at least one multiplied block of transform coefficients of the third type, and
    summing the multiplied blocks of transform coefficients of the third type to generate a first final block of transform coefficients of the third type;
    inversely trigonometrically transforming the first final block of transform coefficients of the third type to generate a third final block of DCT coefficients; and
summing the first and second final blocks of DCT coefficients additionally sums the third final block of DCT coefficients to generate the block of DCT coefficients constituting one block of the filtered output information signal.

36. The computer-readable medium of claim 27, in which:
the input blocks of DCT coefficients are quantized according to a quantizing table;
the filter operation additionally comprises:
    pre- and post-multiplying the quantizing table by a diagonal matrix D to generate a modified dequantizing table, and
    de-quantizing the input blocks of DCT coefficients using the modified dequantizing table to generate corresponding blocks of modified DCT coefficients; and
in lieu of the input blocks of DCT coefficients, the blocks of modified DCT coefficients are forwardly trigonometrically transformed and blocks of DCT coefficients related to the blocks of modified DCT coefficients are subject to matrix multiplication by the first matrix multipliers.

37. The computer-readable medium of claim 27, in which (a) forwardly trigonometrically transforming and (b) inversely trigonometrically transforming each include processing the transform coefficients in a sub-block of a block of transform coefficients, the block of transform coefficients being one of (a) one of the input blocks of DCT coefficients, and (b) the first final block of transform coefficients of the second type, respectively, the sub-block coinciding with one row or one column of the block of transform coefficients, the transform coefficients in the sub-block having an order, the processing comprising performing one of (a) a transforming operation and an order-reversing operation, and (b) an order-reversing operation and a transforming operation, respectively, the transforming operation including:

changing the order of ones of the transform coefficients in a first sub-block to provide a re-ordered sub-block, the first sub-block being a sub-block of one of (a) the block of transform coefficients, and (b) a block of transform generated by the order-reversing operation, respectively;

performing first butterfly operations between pairs of the transform coefficients in the re-ordered sub-block to generate a first butterflied sub-block, and performing second butterfly operations between pairs of the transform coefficients in the first butterflied sub-block to generate a second butterflied sub-block;

matrix multiplying the transform coefficients in the second butterflied sub-block by a relatively sparse matrix.

\* \* \* \* \*